US012371295B2

(12) United States Patent
Kubo et al.

(10) Patent No.: US 12,371,295 B2
(45) Date of Patent: Jul. 29, 2025

(54) SHEET PROCESSING APPARATUS AND IMAGE FORMING SYSTEM

(71) Applicant: CANON FINETECH NISCA INC., Saitama (JP)

(72) Inventors: Mamoru Kubo, Yamanashi (JP); Toshiyuki Katsumata, Yamanashi (JP); Takuma Kobayashi, Yamanashi (JP); Yusuke Mitsui, Yamanashi (JP); Koji Kanda, Yamanashi (JP)

(73) Assignee: Canon Finetech Nisca Inc., Saitama (JP)

( * ) Notice: Subject to any disclaimer, the term of this patent is extended or adjusted under 35 U.S.C. 154(b) by 10 days.

(21) Appl. No.: 18/354,049

(22) Filed: Jul. 18, 2023

(65) Prior Publication Data

US 2024/0025693 A1 Jan. 25, 2024

(30) Foreign Application Priority Data

Jul. 25, 2022 (JP) ................................. 2022-117884
Jul. 10, 2023 (JP) ................................. 2023-113319

(51) Int. Cl.
*B65H 37/04* (2006.01)
*B65H 31/02* (2006.01)
*G03G 15/00* (2006.01)

(52) U.S. Cl.
CPC ............. *B65H 37/04* (2013.01); *B65H 31/02* (2013.01); *G03G 15/6544* (2013.01);
(Continued)

(58) Field of Classification Search
CPC ........... G03G 15/6544; G03G 15/6541; B65H 37/04; B65H 31/02; B65H 31/34;
(Continued)

(56) References Cited

U.S. PATENT DOCUMENTS 7,624,976 B2 * 12/2009 Koie ......................... B42C 1/12
270/58.12
7,654,511 B2 2/2010 Nagata et al.
(Continued)

FOREIGN PATENT DOCUMENTS

JP 2006-248685 A 9/2006
JP 2014-061964 A 4/2014

OTHER PUBLICATIONS

U.S. Appl. No. 18/354,036, filed Jul. 18, 2023 (First Named Inventor: Toshiyuki Katsumata).
(Continued)

*Primary Examiner* — Leslie A Nicholson, III
(74) *Attorney, Agent, or Firm* — Venable LLP

(57) ABSTRACT

In a case where a binding unit performs a binding process at the corner portion on a first end side in a width direction of the sheet in the second posture, an abutment operation of conveying the sheet and abutting the downstream end edge of the sheet in a conveyance direction against the abutment portion, and a shift operation of moving the sheet to a position where the sheet does not contact a back side surface of the binding unit when the binding unit is in the second posture, on a second end side in the width direction with respect to a position of the sheet conveyed to the placement portion are performed. Then a movable turning unit turns the binding unit from a first posture to the second posture, and the binding process is performed by the binding unit in the second posture.

8 Claims, 36 Drawing Sheets

(52) U.S. Cl.
CPC ................ *B65H 2301/4213* (2013.01); *B65H 2301/51611* (2013.01); *B65H 2701/1311* (2013.01); *B65H 2801/27* (2013.01)

(58) Field of Classification Search
CPC .... B65H 2701/1311; B65H 2301/4213; B65H 2301/4222; B65H 2301/5161; B65H 2301/51611; B65H 2301/442; B65H 2301/4421; B65H 2801/27
USPC .......... 270/58.08, 58.11, 58.12, 58.17, 58.27
See application file for complete search history.

(56) References Cited

U.S. PATENT DOCUMENTS

| | | | | |
|---|---|---|---|---|
| 9,908,736 B2 * | 3/2018 | Abe | ........................ | B65H 31/26 |
| 10,308,060 B2 * | 6/2019 | Aoyagi | .................. | B65H 31/02 |
| 10,926,970 B2 * | 2/2021 | Tanoue | ..................... | B31F 5/02 |
| 2024/0017956 A1 * | 1/2024 | Sakakibara | ............ | B65H 31/02 |

OTHER PUBLICATIONS

U.S. Appl. No. 18/354,734, filed Jul. 19, 2023 (First Named Inventor: Mamoru Kubo).

* cited by examiner

SHEET PROCESSING APPARATUS AND IMAGE FORMING SYSTEM

BACKGROUND OF THE INVENTION

Field of the Invention

The present invention relates to a sheet processing apparatus that performs a binding process on sheets, and an image forming system including the sheet processing apparatus.

Description of the Related Art

A sheet processing apparatus includes a binding unit such as a staple unit that performs a binding process on sheets, and performs the binding process at a predetermined position of the sheets by moving a staple unit with respect to the sheets placed on a placement portion. JP 2006-248685 A discloses a configuration in which a sheet is moved in a direction opposite to a moving direction of a staple unit in a case where side stitching for performing a binding process in a direction along a width direction of the sheet is performed by moving the sheet to a predetermined position.

The staple unit includes a staple head (a first portion) from which staple needles can protrude, and an anvil member (a second portion) that is disposed to face the staple head and nips a sheet between the anvil member and the staple head to perform a binding process on the sheet. In such a staple unit, for example, there is a back side surface such as a surface constituting a frame of the staple unit or a partial surface of a cartridge for holding the staple needle on the back side of a position where the binding process is performed by the staple head and the anvil member, and the staple head, the anvil member, and the back side surface form a substantially U-shape when the staple unit is viewed from the side.

Here, there is a case where a corner portion of the sheet is subjected to oblique binding in which the binding process is performed in a direction inclined with respect to the width direction of the sheet using the above-described staple unit. In this case, the posture of the staple unit becomes a second posture inclined with respect to a first posture in the side stitching. In recent years, there has been a demand for compactness of an apparatus. In particular, in a sheet processing apparatus (so-called inner finisher) installed in an internal space of an image forming apparatus, an installation space is limited. For this reason, when the staple unit performs the oblique binding on the sheet having a maximum size, the sheet conveyed to the position where the binding process is performed comes into contact with a part of the back side surface of the staple unit in the second posture, and there is a possibility that the oblique binding cannot be performed on the corner portion of the sheet.

SUMMARY OF THE INVENTION

The present invention provides a sheet processing apparatus and an image forming system capable of performing oblique binding with respect to a corner portion of a sheet with a compact configuration.

According to a first aspect of the present invention, A sheet processing apparatus includes a first conveyance portion configured to convey a sheet in a first conveyance direction, a placement portion configured to place the sheet conveyed in the first conveyance direction by the first conveyance portion, a second conveyance portion configured to convey the sheet on the placement portion conveyed by the first conveyance portion in a second conveyance direction opposite to the first conveyance direction, an abutment portion against which a downstream end edge in the second conveyance direction of the sheet conveyed in the second conveyance direction by the second conveyance portion abuts, a shift unit configured to move the sheet conveyed by the first conveyance portion in a width direction of the sheet intersecting the first conveyance direction, by moving the sheet placed on the placement portion in the width direction in a state of being in contact with an edge along the first conveyance direction, a binding unit configured to perform a binding process on the sheet of which the downstream end edge in the second conveyance direction is abutted against the abutment portion and which is moved in the width direction by the shift unit, and, a movable turning unit configured to move the binding unit in the width direction and further turns the binding unit to a first posture and a second posture inclined with respect to the first posture. The binding unit includes a first portion, a second portion that is disposed to face the first portion and nips the sheet between the first portion and the second portion to perform the binding process on the sheet, and a back side surface disposed on a downstream side in the second conveyance direction with respect to a position where the binding process is performed on the sheet by the first portion and the second portion in a case where the binding unit is in the first posture. The first posture is a posture in which the binding unit performs the binding process in a direction along the width direction on a downstream edge portion of the sheet in the second conveyance direction. The second posture is a posture in which the binding unit performs the binding process in a direction inclined with respect to the width direction on a corner portion on a first end side in the width direction of the downstream edge portion of the sheet in the second conveyance direction. In a case where the binding unit performs the binding process at the corner portion on the first end side in the width direction of the sheet in the second posture, an abutment operation of conveying the sheet in the second conveyance direction by the second conveyance portion and abutting the downstream end edge of the sheet in the second conveyance direction against the abutment portion, and a shift operation of moving the sheet by the shift unit to a position where the sheet does not contact the back side surface when the binding unit is in the second posture and where the sheet is on a second end side in the width direction with respect to a position of the sheet conveyed to the placement portion by the first conveyance portion are performed, and then the movable turning unit turns the binding unit from the first posture to the second posture, and the binding process is performed by the binding unit in the second posture.

According to a second aspect of the present invention, a sheet processing apparatus includes a first conveyance portion configured to convey a sheet in a first conveyance direction, a placement portion configured to place the sheet conveyed in the first conveyance direction by the first conveyance portion, a second conveyance portion configured to convey the sheet on the placement portion conveyed by the first conveyance portion in a second conveyance direction opposite to the first conveyance direction, an abutment portion against which a downstream end edge in the second conveyance direction of the sheet conveyed in the second conveyance direction by the second conveyance portion abuts, a shift unit configured to move the sheet conveyed by the first conveyance portion in a width direction of the sheet intersecting the first conveyance direction, by moving the sheet placed on the placement portion in the width direction in a state of being in contact with an edge along the first conveyance direction, a binding unit configured to perform a binding process on the sheet of which the downstream end edge in the second conveyance direction is abutted against the abutment portion and which is moved in the width direction by the shift unit, and, a movable turning unit configured to move the binding unit in the width direction and further turns the binding unit to a first posture and a second posture inclined with respect to the first posture. The binding unit includes a first portion, a second portion that is disposed to face the first portion and nips the sheet between the first portion and the second portion to perform the binding process on the sheet, and a back side surface disposed on a downstream side in the second conveyance direction with respect to a position where the binding process is performed on the sheet by the first portion and the second portion in a case where the binding unit is in the first posture. The first posture is a posture in which the binding unit performs the binding process in a direction along the width direction on a downstream edge portion of the sheet in the second conveyance direction. The second posture is a posture in which the binding unit performs the binding process in a direction inclined with respect to the width direction on a corner portion on a first end side in the width direction of the downstream edge portion of the sheet in the second conveyance direction. In a case where the binding unit performs the binding process at the corner portion on the first end side in the width direction of the sheet in the second posture, a shift operation of moving the sheet to a position where the sheet dose not contact the back side surface when the binding unit is in the second posture and where the sheet is on a second end side in the width direction with respect to a position of the sheet conveyed to the placement portion by the first conveyance portion, and a movable turning operation of turning the binding unit by the movable turning unit from the first posture to the second posture are performed, and then the second conveyance portion performs an abutment operation of conveying the sheet in the second conveyance direction and abutting the downstream end edge of the sheet in the second conveyance direction against the abutting portion, and then the binding unit performs the binding process in the second posture.

According to a third aspect of the present invention, an image forming system includes an image forming apparatus including an image forming unit that forms an image on a sheet, and a sheet processing apparatus that performs a binding process on the sheet on which the image is formed by the image forming unit. The sheet processing apparatus includes a first conveyance portion configured to convey a sheet in a first conveyance direction, a placement portion configured to place the sheet conveyed in the first conveyance direction by the first conveyance portion, a second conveyance portion configured to convey the sheet on the placement portion conveyed by the first conveyance portion in a second conveyance direction opposite to the first conveyance direction, an abutment portion against which a downstream end edge in the second conveyance direction of the sheet conveyed in the second conveyance direction by the second conveyance portion abuts, a shift unit configured to move the sheet conveyed by the first conveyance portion in a width direction of the sheet intersecting the first conveyance direction, by moving the sheet placed on the placement portion in the width direction in a state of being in contact with an edge along the first conveyance direction, a binding unit configured to perform the binding process on the sheet of which the downstream end edge in the second conveyance direction is abutted against the abutment portion and which is moved in the width direction by the shift unit, and, a movable turning unit configured to move the binding unit in the width direction and further turns the binding unit to a first posture and a second posture inclined with respect to the first posture. The binding unit includes a first portion, a second portion that is disposed to face the first portion and nips the sheet between the first portion and the second portion to perform the binding process on the sheet, and a back side surface disposed on a downstream side in the second conveyance direction with respect to a position where the binding process is performed on the sheet by the first portion and the second portion in a case where the binding unit is in the first posture. The first posture is a posture in which the binding unit performs the binding process in a direction along the width direction on a downstream edge portion of the sheet in the second conveyance direction. The second posture is a posture in which the binding unit performs the binding process in a direction inclined with respect to the width direction on a corner portion on a first end side in the width direction of the downstream edge portion of the sheet in the second conveyance direction. In a case where the binding unit performs the binding process at the corner portion on the first end side in the width direction of the sheet in the second posture, an abutment operation of conveying the sheet in the second conveyance direction by the second conveyance portion and abutting the downstream end edge of the sheet in the second conveyance direction against the abutment portion, and a shift operation of moving the sheet by the shift unit to a position where the sheet does not contact the back side surface when the binding unit is in the second posture and where the sheet is on a second end side in the width direction with respect to a position of the sheet conveyed to the placement portion by the first conveyance portion are performed, and then the movable turning unit turns the binding unit from the first posture to the second posture, and the binding process is performed by the binding unit in the second posture.

According to a fourth aspect of the present invention, an image forming system includes an image forming apparatus including an image forming unit that forms an image on a sheet, and a sheet processing apparatus that performs a binding process on the sheet on which the image is formed by the image forming unit. The sheet processing apparatus includes a first conveyance portion configured to convey a sheet in a first conveyance direction, a placement portion configured to place the sheet conveyed in the first conveyance direction by the first conveyance portion, a second conveyance portion configured to convey the sheet on the placement portion by the first conveyance portion in a second conveyance direction opposite to the first conveyance direction, an abutment portion against which a downstream end edge in the second conveyance direction of the sheet conveyed in the second conveyance direction by the second conveyance portion abuts, a shift unit configured to move the sheet conveyed by the first conveyance portion in a width direction of the sheet intersecting the first conveyance direction, by moving the sheet placed on the placement portion in the width direction in a state of being in contact with an edge along the first conveyance direction, a binding unit configured to perform the binding process on the sheet of which the downstream end edge in the second conveyance direction is abutted against the abutment portion and which is moved in the width direction by the shift unit, and, a movable turning unit configured to move the binding unit in the width direction and further turns the binding unit to a first posture and a second posture inclined with respect to the first posture. The binding unit includes a first portion, a second portion that is disposed to face the first portion and nips the sheet between the first portion and the second portion to perform the binding process on the sheet, and a back side surface disposed on a downstream side in the second conveyance direction with respect to a position where the binding process is performed on the sheet by the first portion and the second portion in a case where the binding unit is in the first posture. The first posture is a posture in which the binding unit performs the binding process in a direction along the width direction on a downstream edge portion of the sheet in the second conveyance direction. The second posture is a posture in which the binding unit performs the binding process in a direction inclined with respect to the width direction on a corner portion on a first end side in the width direction of the downstream edge portion of the sheet in the second conveyance direction. In a case where the binding unit performs the binding process at the corner portion on the first end side in the width direction of the sheet in the second posture, a shift operation of moving the sheet by the shift unit to a position where the sheet dose not contact the back side surface when the binding unit is in the second posture and where the sheet is on a second end side in the width direction with respect to ae position of the sheet conveyed to the placement portion by the first conveyance portion, and a movable turning operation of turning the binding unit by the movable turning unit from the first posture to the second posture are performed, and then the second conveyance portion performs an abutment operation of conveying the sheet in the second conveyance direction, and abutting the downstream end edge of the sheet in the second conveyance direction against the abutting portion, and then the binding unit performs the binding process in the second posture.

Further features of the present invention will become apparent from the following description of exemplary embodiments with reference to the attached drawings.

DESCRIPTION OF THE EMBODIMENTS

An embodiment will be described with reference to FIGS. 1 to 25 and 36. First, a schematic configuration of an image forming system according to the present embodiment will be described with reference to FIG. 1. Note that, in the following description, a front side (F side) is a side on which the user operates the apparatus, that is, a front side of the apparatus, and is, for example, a side on which an operation unit such as a button or an operation panel for operating the image forming system is provided. A rear side (R side) is a side opposite to the front side in the width direction of the sheet to be described below, that is, a back side of the apparatus.

Image Forming System

Figure 1:
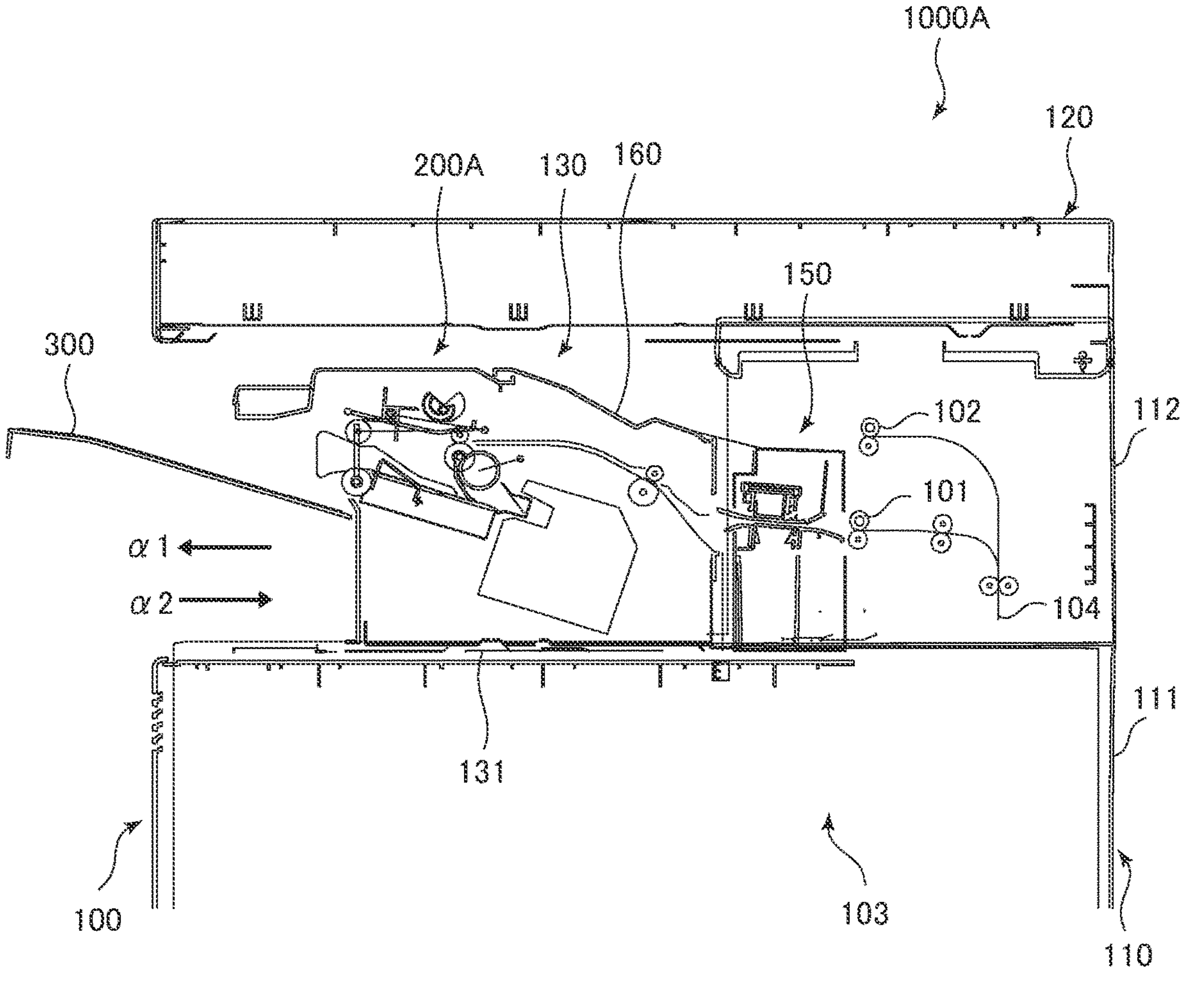
FIG. 1 is a schematic configuration cross-sectional view of an image forming system according to an embodiment.

FIG. 1 is a cross-sectional view illustrating the schematic configuration of the image forming system according to the present embodiment. An image forming system 1000A includes an image forming apparatus 100, a punch unit 150, and a sheet processing apparatus 200A. The image forming apparatus 100 is a copying machine, a printer, a facsimile, a multifunction peripheral having a plurality of functions thereof, or the like, and forms an image on a sheet such as a sheet of paper or a plastic sheet. In the present embodiment, an electrophotographic system printer is used, and a sheet on which a toner image is formed is discharged from a first discharge portion 101 or a second discharge portion 102. The image forming apparatus 100 may be an inkjet type image forming apparatus.

In the image forming apparatus of the present embodiment, although not illustrated in detail, a toner image is formed on a sheet in the image forming unit 103. Briefly, a surface of a photosensitive drum is charged and exposed to form an electrostatic latent image on the photosensitive drum. Then, the electrostatic latent image is developed with a developer by a developing unit to form a toner image. The toner image formed on the photosensitive drum is transferred to a sheet, and further heated and pressed by a fixing unit to be fixed to the sheet. The sheet on which the toner image is fixed is sent to the first discharge portion 101 or the second discharge portion 102 through a conveyance path 104.

The image forming apparatus 100 of the present embodiment includes an image forming apparatus body 110 including the image forming unit 103, the conveyance path 104, the first discharge portion 101, and the second discharge portion 102, and an image reading unit 120 disposed above the image forming apparatus body 110. The image reading unit 120 reads an image on a document and sends a read image signal to the image forming apparatus body 110. The image forming apparatus body 110 includes a first casing unit 111 in which the image forming unit 103 is disposed, and a second casing unit 112 in which a part of the conveyance path 104, the first discharge portion 101, and the second discharge portion 102 are disposed, and the second casing unit 112 is provided above the first casing unit 111. The image reading unit 120 is provided above the second casing unit 112. In addition, an operation panel (not illustrated) is provided in the second casing unit, and an instruction (printing condition, mode setting, and the like) from the user can be input to the image forming apparatus 100, the punch unit 150, and the sheet processing apparatus 200A.

In the present embodiment, with such a configuration, an in-body space 130 surrounded by the first casing unit 111, the second casing unit 112, and the image reading unit 120 is provided. Then, the sheet is discharged from the first discharge portion 101 or the second discharge portion 102 into the in-body space 130. The punch unit 150, the sheet processing apparatus 200A, and the like are detachable from the in-body space 130. In the present embodiment, the image forming system 1000A is configured by attaching the punch unit 150 and the sheet processing apparatus 200A, but any one of the punch unit 150 and the sheet processing apparatus 200A or another apparatus that performs sheet processing may be attached.

The punch unit 150 is connected to the first discharge portion 101, and can receive a sheet discharged from the first discharge portion 101 and perform punch processing on the sheet. The sheet processing apparatus 200A is connected to a sheet discharge portion of the punch unit 150 and receives the sheet discharged from the punch unit 150. As will be described in detail below, predetermined processing such as stapling can be performed on the sheet. It is possible to deliver the sheet to the sheet processing apparatus 200A without performing punch processing by the punch unit 150, and it is also possible to discharge the sheet without performing predetermined processing in the sheet processing apparatus 200A. The sheet discharged from the second discharge portion 102 is discharged to a sheet placement surface 160 above the punch unit 150 and the sheet processing apparatus 200A.

In the in-body space 130, a rail 131 is disposed along a left-right direction in FIG. 1, and the punch unit 150 and the sheet processing apparatus 200A are detachable in directions of arrows α1 and α2 along the rail 131. The punch unit 150 may be omitted, and the sheet processing apparatus 200A may be directly connected to the first discharge portion 101. Further, by making the punch unit 150 and the sheet processing apparatus 200A detachable in this manner, sheet jam processing can be performed.

For example, when the sheet is jammed in the first discharge portion 101, the punch unit 150 and the sheet processing apparatus 200A are pulled out in the direction of the arrow α1 to expose the first discharge portion 101. When the sheet is jammed in the punch unit 150, only the sheet processing apparatus 200A is pulled out in the direction of the arrow α1 to expose the punch unit 150. When the punch unit 150 and the sheet processing apparatus 200A are attached to the image forming apparatus 100, the punch unit 150 and the sheet processing apparatus 200A are pushed in the direction of the arrow α2. As described above, in the present embodiment, since the sheet processing apparatus 200A is disposed in the in-body space 130 of the image forming apparatus 100, it is required to reduce the size of the sheet processing apparatus 200A.

Sheet Processing Apparatus

Figure 2:
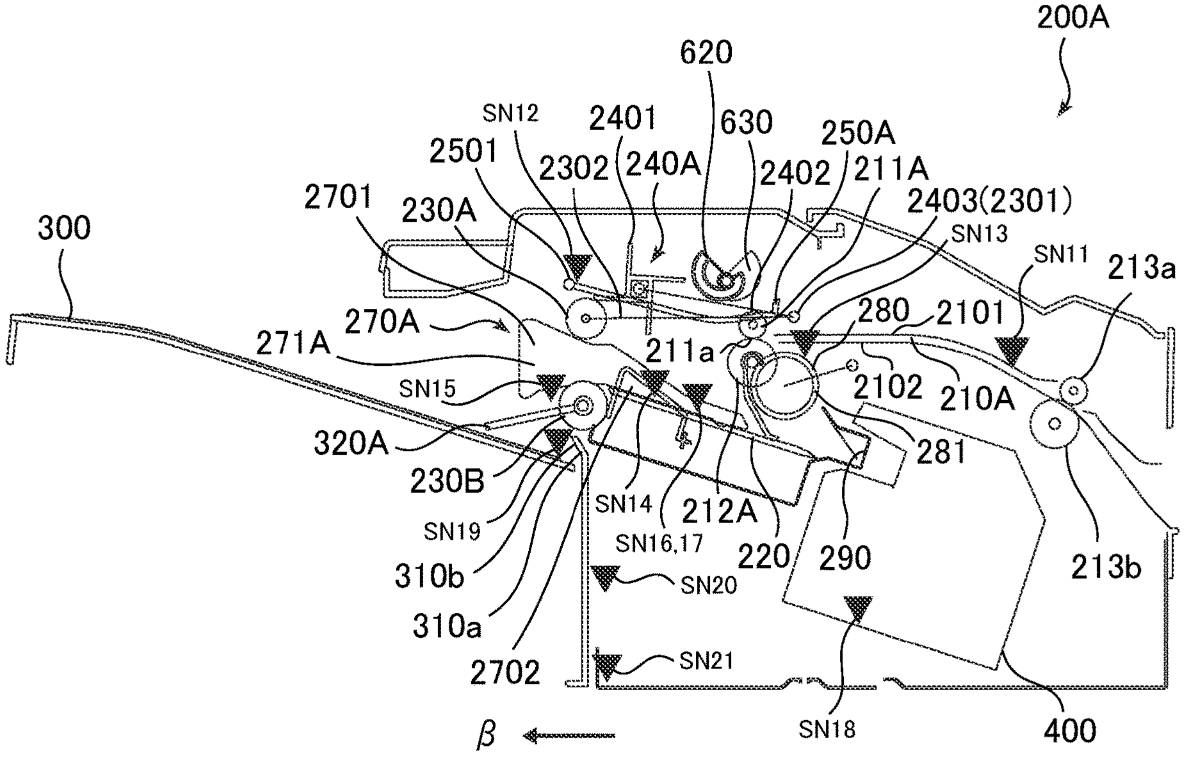
FIG. 2 is a schematic configuration cross-sectional view of a sheet processing apparatus according to the embodiment.

A configuration of a sheet processing apparatus 200A of the present embodiment will be described with reference to FIG. 2. The sheet processing apparatus 200A includes a conveyance path 210A, pre-processing rollers 211A and 212A serving as a first conveyance portion, a processing tray 220 serving as a placement portion, an upper discharge roller (i.e., nip member) 230A and a lower discharge roller 230B serving as a pair of discharge rotary members (i.e., discharge portions), a reversing paddle 240A serving as a second conveyance portion, a trailing edge dropping member 250A serving as a sheet dropping portion, an alignment unit 270A serving as a shift unit, a return member 280, a trailing edge regulation member 290 serving as an abutment portion, a stacking tray 300 serving as a stacking portion, a sheet pressing paddle 320A, and the like. The sheet received from the image forming apparatus 100 or the punch unit 150 is conveyed to the conveyance path 210A.

The sheet conveyed from the conveyance path 210A is directly discharged to the stacking tray 300 or placed on the processing tray 220 according to the mode of processing the sheet. The direct discharge to the stacking tray 300 means that sheet are discharged to the stacking tray 220 without being reversely conveyed to a position where staple processing can be executed with the sheet on the processing tray 300. In other words, the sheet processing apparatus 200A has a mode of discharging the sheets on which the staple processing is performed by the staple unit 400 to the stacking tray 300 and a mode of discharging the sheets to the stacking tray 300 without performing the staple processing by the staple unit 400. In the present embodiment, the sheet can be aligned by the alignment unit 270A without being placed on the processing tray 220. Further, the sheet can be also aligned on the processing tray 220, and the staple unit 400 can staple the sheets placed on the processing tray 220. Further, the sheet or a sheet bundle placed on the processing tray 220 can be discharged to the stacking tray 300 by the upper discharge roller 230A and the lower discharge roller 230B serving as the pair of discharge rotary members, and the like. Hereinafter, a configuration of each unit will be described in detail.

Conveyance Path

The conveyance path 210A is a path that conveys a sheet in a first conveyance direction (predetermined direction), and includes an upper guide 2101 that guides an upper surface of the conveyed sheet and a lower guide 2102 that guides a lower surface of the sheet. In the conveyance path 210A, the pre-processing rollers 211A and 212A serving as the pair of conveyance rotary members, and upstream rollers (inlet rollers) 213*a* and 213*b* are disposed. These are disposed in pair so as to be separated from each other in a width direction of the sheet (direction of arrow γ in FIG. 3) intersecting a conveyance direction of the sheet (first conveyance direction, direction of arrow β in FIG. 2 (left-right direction)), respectively.

The pre-processing rollers 211A and 212A are a first conveyance portion and the pair of conveyance rotary members that convey a sheet, and at least one of the pre-processing rollers 211A and 212A rotates while nipping the sheet. At least one of the upstream rollers 213*a* and 213*b* rotates while nipping the sheet. The upstream rollers 213*a* and 213*b* are disposed at an inlet of the sheet processing apparatus 200A, and receive a sheet conveyed from upstream of the sheet processing apparatus 200A and convey the sheet to the conveyance path 210A. Then, the sheet passing through the conveyance path 210A reaches the pre-processing rollers 211A and 212A.

The pre-processing rollers 211A and 212A form a pre-processing nip portion 211*a* capable of nipping and conveying a sheet. Then, the sheet is nipped by the pre-processing nip portion 211*a* and conveyed in the first conveyance direction, and the sheet is discharged from the conveyance path 210A. As will be described below, the pre-processing rollers 211A and 212A can be brought into contact with or separated from each other, or the nip pressure can be changed.

Processing Tray

The processing tray 220 serving as the placement portion is disposed on a downstream side in a sheet conveyance direction (first conveyance direction) of the conveyance path 210A and vertically below the conveyance path 210A. The processing tray 220 is inclined with respect to a horizontal plane such that an upstream side in the first conveyance direction is lower than the downstream side in the first conveyance direction. The processing tray 220 temporarily places the sheet conveyed to the downstream side in the first conveyance direction by the pre-processing rollers 211A and 212A. In addition, the processing tray 220 can stack a plurality of sheets in an overlapping manner, and alignment of the sheets in the width direction and movement of the sheets in the width direction (shift of the sheets) are performed by the alignment unit 270A with the sheets on the process tray 220. The trailing edge regulation member 290 serving as the abutment portion against which an upstream end edge (a downstream end edge in a second conveyance direction opposite to the first conveyance direction, and a trailing edge of the sheet) of the sheet placed on the processing tray 220 in the first conveyance direction abuts is disposed at an upstream end of the processing tray 220 in the first conveyance direction. A part of the processing tray 220 (for example, the downstream side end portion in the first conveyance direction) may protrude vertically above the conveyance path 210A.

Further, the staple unit 400 serving as a binding unit performing a binding process on the sheets is disposed upstream of the processing tray 220 in the first conveyance direction. The staple unit 400 performs staple processing (binding processing) as predetermined processing on the sheet bundle subjected to the alignment in the width direction and regulation of the trailing edge by the processing tray 220. The staple unit 400 configures a part of a sheet binding apparatus 410 as described below, is configured to change a staple position with respect to the sheet bundle and to move according to the staple position. The predetermined processing may be other processing such as punching other than stapling. The sheet or the sheet bundle placed on the processing tray 220 are discharged to the stacking tray 300 by the upper discharge roller 230A and the lower discharge roller 230B as described below.

Reversing Paddle

The reversing paddle 240A serving as the reverse conveyance portion conveys the sheet on the processing tray 220 in the second conveyance direction opposite to the first conveyance direction. The reversing paddle 240A includes a paddle portion 2401 serving as a rotary member, a paddle arm 2402 serving as a supporting portion that supports the paddle portion 2401, and a swing fulcrum 2403 that swingably supports the paddle arm 2402. That is, the paddle arm 2402 is swingable in a vertical direction about the swing fulcrum 2403, and the paddle portion 2401 is rotatably provided at the distal end of the paddle arm 2402.

The reversing paddle 240A is swingable about the swing fulcrum 2403 between a return position where the paddle portion 2401 abuts on the upper surface of the sheet on the processing tray 220 to convey the sheet in the second conveyance direction and an upper retracting position where the paddle portion 2401 is retracted above the return position. The swing fulcrum 2403 is disposed upstream of the pre-processing nip portion 211*a*, which is a nip position at which the sheet is nipped by the pre-processing rollers 212A and 211A, in the first conveyance direction and vertically above the pre-processing nip portion 211*a*. The paddle arm 2402 extends from the swing fulcrum 2403 toward the downstream side in the first conveyance direction, and the paddle portion 2401 is provided at a distal end portion thereof. A pair of the reversing paddles 240A is disposed on both sides in the width direction of the upper discharge roller 230A to be described below.

Trailing Edge Dropping Member

A pair of the trailing edge dropping members 250A serving as the sheet dropping portion is provided on both sides of the pair of reversing paddles 240A. That is, the pair of the trailing edge dropping members 250A is disposed on both sides of the reversing paddle 240A in the width direction, and moves in the vertical direction in conjunction with the reversing paddle 240A as described below, so that the pair of the trailing edge dropping members 250A operates to abut on the upper surface of the sheet on the upstream side in the first conveyance direction and to drop the upstream end portion (trailing edge portion) of the sheet toward the processing tray 220. The trailing edge dropping member 250A may be operated by a separate drive from the reversing paddle 240A.

The trailing edge dropping member 250A includes a pivot shaft 2501 serving as the pivot axis downstream of the pre-processing rollers 211A and 212A serving as the pair of conveyance rollers in the first conveyance direction. The trailing edge dropping member 250A extends to the upstream side in the first conveyance direction from the pivot shaft 2501, and is pivotable about the pivot shaft 2501 from an upper position above the pre-processing rollers 211A and 212A to a lower position below the pre-processing rollers 211A and 212A. The trailing edge dropping member 250A pivots from the upper position to the lower position, and thus, abuts on the sheet conveyed by the pre-processing rollers 211A and 212A from above and drops the sheet onto the processing tray 220 below.

Return Member

The return member 280 conveys the sheet conveyed toward the trailing edge regulation member 290 by the reversing paddle 240A as described above, further toward the trailing edge regulation member 290, and brings the trailing edge of the sheet into contact with the trailing edge regulation member 290 to regulate the trailing edge position of the sheet. The return member 280 is configured by a knurled belt 281, and rotationally drives the knurled belt 281 to further convey the sheet conveyed to the upstream side in the first conveyance direction by the reversing paddle 240A, thereby bringing the trailing edge into contact with the trailing edge regulation member 290. The return member 280 is movable to an abutting position where the return member 280 can abut on the sheet and a retracting position where the return member 280 is retracted above the abutting position, and moves to the abutting position when the sheet is conveyed toward the trailing edge regulation member 290 and to the retracting position when the sheet on the processing tray 220 is conveyed toward the stacking tray 300.

Discharge Roller

The upper discharge roller 230A and the lower discharge roller 230B configure the pair of discharge rotary members and the discharge portion, convey the sheet conveyed to the downstream side in the first conveyance direction by the pre-processing rollers 211A and 212A to the downstream side in the first conveyance direction with respect to the processing tray 220, and discharge the sheet. Specifically, the upper discharge roller 230A and the lower discharge roller 230B discharge the sheets stapled by the staple unit 400 onto the stacking tray 300. The upper discharge roller 230A is movable to a nip position (contact position) where the sheet is nipped between the upper discharge roller 230A and the lower discharge roller 230B and a retracting position where the upper discharge roller 230A is retracted above the nip position, and nips the sheet between the upper discharge roller 230A and the lower discharge roller 230B at the nip position. That is, the upper discharge roller 230A functions as a nip member that nips the sheet between the upper discharge roller 230A and the lower discharge roller 230B at the nip position. Two upper discharge rollers 230A are disposed apart from each other in the width direction of the sheet. Two lower discharge rollers 230B are disposed apart from each other in the width direction of the sheet. In the present embodiment, the upper discharge rollers 230A and the lower discharge rollers 230B are disposed inside the pair of reversing paddles 240A in the width direction.

The upper discharge roller 230A and the lower discharge roller 230B nip the sheet or the sheet bundle at the nip position, and for example, the lower discharge roller 230B rotates to convey the nipped sheet or sheet bundle. The upper discharge roller 230A is a driven roller that rotates following the rotation of the lower discharge roller 230B, but may be configured to drive. That is, in the present embodiment, the upper discharge roller 230A is the driven rotary member, and the lower discharge roller 230B is the driving rotary member. Further, the upper discharge roller 230A functions as a nip member capable of nipping the sheet with the lower discharge roller 230B at the nip position, but the nip member may be another rotary member such as a belt instead of the roller, or may be an abutting member that abuts on the sheet without rotating like a lever member. Further, the lower discharge roller 230B may be a rotary member such as a belt in addition to the roller.

The upper discharge roller 230A is pivotable about the pivot shaft 2301 between the nip position and the retracting position. In other words, the upper discharge roller 230A is movable up and down between the nip position and the retracting position. The upper discharge roller 230A is provided at a distal end of the discharge arm 2302 serving as a supporting portion. The pivot shaft 2301 is provided coaxially with the swing fulcrum 2403 described above, and is disposed upstream in the first conveyance direction from the pre-processing nip portion 211*a* that nips the sheet with the pre-processing rollers 211A and 212A, and vertically above the pre-processing nip portion 211*a*. Then, the discharge arm 2302 extends from the pivot shaft 2301 to the downstream side in the first conveyance direction, and the upper discharge roller 230A is provided at a distal end portion thereof. The pivot shaft 2301 may not be disposed coaxially with the swing fulcrum 2403, but in the present embodiment, the pivot shafts of the upper discharge roller 230A and the reversing paddle 240A are coaxial.

The pivot shaft 2301 is disposed on the upstream side in the first conveyance direction with respect to a discharge nip portion where the upper discharge roller 230A nips the sheet with the lower discharge roller 230B at the nip position. Further, the upper discharge roller 230A is positioned vertically above the pre-processing nip portion 211*a* that nips the sheet with the pre-processing rollers 211A and 212A in the retracting position, and the pivot shaft 2301 is positioned vertically above the center of the upper discharge roller 230A in the retracting position.

Since the positional relationship between the pivot shaft 2301 and the pre-processing nip portion 211*a* is defined as described above, the upper discharge roller 230A allows the sheet passing through the pre-processing nip portion 211*a* to move toward the stacking tray 300 in the state of being in the retracting position. On the other hand, the upper discharge roller 230A rotates counterclockwise in FIG. 2 about the pivot shaft 2301, thereby moving downward from the retracting position toward the nip position. When the upper discharge roller 230A moves to the nip position, the sheet can be nipped between the upper discharge roller 230A and the lower discharge roller 230B.

Alignment Unit

The alignment unit 270A serving as a shift unit moves in a shift direction (width direction) intersecting the first conveyance direction in a state of being in contact with an end edge along the first conveyance direction of the sheet conveyed to the downstream side in the first conveyance direction by the pre-processing rollers 211A and 212A, thereby moving the sheet in the shift direction. Such an alignment unit 270A includes a pair of aligning plates 271A disposed to face each other in the shift direction.

The pair of aligning plates 271A is disposed further downstream of the downstream end portion in the first conveyance direction of the conveyance path 210A, and moves in the width direction to abut on the end edge in the width direction of the sheet, thereby performing the alignment of the sheet in the width direction. In the present embodiment, the aligning plates 271A are disposed on both sides in the width direction of the sheet placed on the processing tray 220, and are movable in the width direction, respectively. The pair of aligning plates 271A extends from the upstream side to the downstream side in the first conveyance direction with respect to the upper discharge roller 230A and the lower discharge roller 230B. The configuration of the pair of aligning plates 271A is the same. The pair of aligning plates 271A moves in the shift direction by the driving of a front side (F side) aligning plate moving motor MT16 and a rear side (R side) aligning plate moving motor MT17 (see FIG. 3) serving as driving units.

The aligning plate 271A is formed to have a large width in the vertical direction on the downstream side in the first conveyance direction. That is, the aligning plate 271A includes a first plate portion 2701 on the downstream side in the first conveyance direction and a second plate portion 2702 formed to be continuous with the first plate portion 2701 on the upstream side in the first conveyance direction. The first plate portion 2701 has a larger area in the vertical direction than the second plate portion 2702 so as to be able to abut on the conveyed sheet even if the leading edge side of the sheet is curled upward or downward. On the other hand, the second plate portion 2702 is formed to have a height in the vertical direction lower than that of the first plate portion 2701 so as not to interfere with the trailing edge dropping member 250A even when the trailing edge dropping member 250A is located at the lower position. The upper end edge of the second plate portion 2702 is inclined so as to be lower toward the upstream side in the first conveyance direction.

Further, the first plate portion 2701 is formed so as to extend from the upstream side to the downstream side in the first conveyance direction with respect to the upper discharge roller 230A and the lower discharge roller 230B. Accordingly, even when a sheet is discharged by a first shift discharge process described below, at least the first plate portion 2701 can abut on the sheet. Also, the second plate portion 2702 is located on the processing tray 220 and is formed continuously with the first plate portion 2701 in the first conveyance direction. As a result, at least the second plate portion 2702 can abut on the sheet placed on the processing tray 220 by a second shift discharge process described below.

Stacking Tray

As described above, the sheet discharged by the upper discharge roller 230A and the lower discharge roller 230B is stacked on the stacking tray 300 serving as the stacking portion. The stacking tray 300 is provided downstream of the processing tray 220 in the first conveyance direction so as to be vertically movable downward. The stacking tray 300 is inclined with respect to the horizontal plane such that the upstream side in the first conveyance direction is lower than the downstream side thereof. Such a stacking tray 300 is supported so as to be movable in the vertical direction along rails disposed in the vertical direction, for example, and moves up and down by the driving of a stacking tray elevating motor MT20 (see FIG. 3) serving as an elevating unit.

An upstream end of the stacking tray 300 in the first conveyance direction is provided with a rising surface 310*a* serving as a supporting side regulating unit that regulates an upstream end (trailing edge) in a predetermined direction of the sheet or the sheet bundle stacked on the stacking tray 300, and a trailing edge presser 310*b* that presses the trailing edge of the sheet abutting on the rising surface 310*a*. The trailing edge presser 310*b* is inclined toward the downstream side in the first conveyance direction toward the upper side, and can press the trailing edge of the sheet even if the trailing edge of the sheet is curled upward. Further, a sheet pressing paddle 320A is provided coaxially with the rotation shaft of the lower discharge roller 230B.

The stacking tray 300 is movable up and down between a first stacking position and a second stacking position below the first stacking position by a stacking tray elevating motor MT20. The second stacking position is a position at which the operation of the stacking tray 300 that has been lowered when the sheets are discharged to the stacking tray 300 is switched to the rising. At the time of sheet discharge, the sheet pressing paddle 320A rotates as the stacking tray 300 moves up and down, and the sheet or the sheet bundle on the stacking tray 300 is pressed by the sheet pressing paddle 320A.

Control Configuration of Sheet Processing Apparatus

Figure 3:
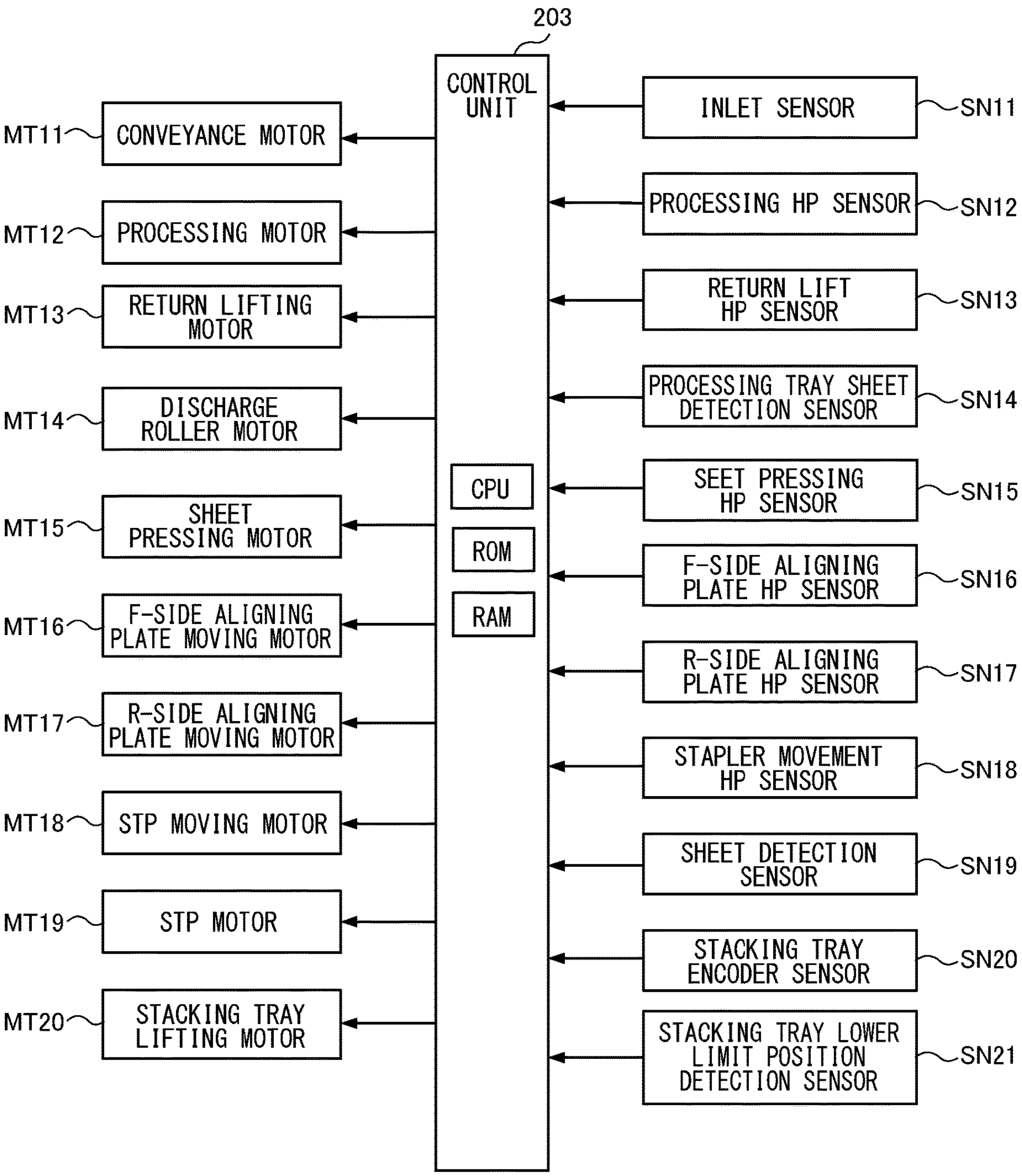
FIG. 3 is a block diagram illustrating a main part of a control configuration of the sheet processing apparatus according to the embodiment.

A control configuration of the sheet processing apparatus 200A will be described with reference to FIG. 3. FIG. 3 is a block diagram illustrating each motor and each sensor included in the sheet processing apparatus 200A. Signals of these sensors are input to a control unit 203, and each motor is controlled by the control unit 203. The control unit 203 is communicably connected to a control unit included in the image forming apparatus 100, and controls the entire sheet processing apparatus 200A.

Such a control unit 203 includes a central processing unit (CPU), a read only memory (ROM), and a random access memory (RAM). The CPU controls each unit while reading a program corresponding to the control procedure stored in the ROM. In addition, work data and input data are stored in the RAM, and the CPU performs control with reference to data stored in the RAM on the basis of the above-described program or the like.

A conveyance motor MT11 drives one of the upstream rollers (inlet rollers) 213*a* and 213*b*, one of the pre-processing rollers 211A and 212A, the reversing paddle 240A, and the return member 280. A processing motor MT12 lifts and lowers the reversing paddle 240A, the trailing edge dropping member 250A, and the upper discharge roller (nip member) 230A. The present embodiment further includes a return lifting motor MT13 for lifting and lowering the return member 280, a discharge roller motor MT14 for driving the upper discharge roller 230A, a sheet pressing motor MT15 for driving the sheet pressing (bundle pressing) paddle 320A, an F-side aligning plate moving motor MT16 for moving (laterally moving) the front aligning plate 271A in the width direction, an R-side aligning plate moving motor MT17 for moving (laterally moving) the rear aligning plate 271A in the width direction, an STP moving motor MT18 for moving a staple unit (STP) 400 to change the staple position, an STP motor MT19 for driving the staple unit 400 to staple the sheet bundle, and a stacking tray lifting motor MT20 for lifting and lowering the stacking tray 300.

Each sensor will be described with reference to FIG. 2. First, an inlet sensor SN11 is provided in the conveyance path 210A and detects a leading edge of the sheet conveyed to the conveyance path 210A. A processing HP sensor SN12 detects the home positions of the reversing paddle 240A, the trailing edge dropping member 250A, and the upper discharge roller (nip member) 230A. A return lift HP sensor SN13 detects a home position (a position retracted from the processing tray 220) of the return member 280. A processing tray sheet detection sensor SN14 detects the presence or absence of a sheet on the processing tray 220. A sheet pressing HP sensor SN15 detects the home position of the sheet pressing paddle 320A.

A F-side aligning plate HP sensor SN16 and an R-side aligning plate HP sensor SN17 detect that the aligning plate 271A on the front side and the aligning plate 271A on the rear side are at positions (home positions) separated from the sheet placed on the processing tray 220 in the width direction, respectively. A stapler movement HP sensor SN18 detects that the staple unit 400 is at the home position. A sheet detection sensor SN19 detects the uppermost sheet placed on the stacking tray 300. A stacking tray encoder sensor SN20 detects the position of the stacking tray 300 in a lifting direction. A stacking tray lower limit position detection sensor SN21 detects a lower limit position of the stacking tray 300. The control unit 203 performs each control as described below on the basis of the signal of each sensor.

Control of Each Mode

Next, control of each mode of the present embodiment will be described. In the present embodiment, there are a straight discharge mode in which the sheets sent to the sheet processing apparatus 200A are discharged to the stacking tray 300 as they are without being subjected to predetermined processing, a shift mode in which the sheets sent to the sheet processing apparatus 200A are moved (shifted) in the width direction and discharged to the stacking tray 300, and a staple mode in which the sheets sent to the sheet processing apparatus 200A are stapled as predetermined processing and discharged to the stacking tray 300. Each of these modes is selected by the user.

Further, in the shift mode, there are a case where a shift operation is performed on a sheet (first sheet, small-sized sheet) of which length in the sheet conveyance direction (first conveyance direction) is a first length and a case where a shift operation is performed on a sheet (second sheet, large-sized sheet) of which length in the first conveyance direction is a second length longer than the first length. The small-sized sheet is, for example, a sheet of which length in the first conveyance direction is equal to or less than a predetermined length, and the large-sized sheet is, for example, a sheet of which length in the first conveyance direction is longer than the predetermined length. The predetermined length is, for example, a so-called A4 vertical size in which an A4 size sheet is sent in the vertical direction (direction in which the longitudinal direction is the conveyance direction). Further, in the shift mode, it is possible to select and execute a productivity priority mode in which productivity is prioritized and an alignment priority mode in which alignment of sheets is prioritized.

The productivity priority mode as a first shift discharge process is a mode in which the sheet conveyed to the downstream side in the first conveyance direction by the pre-processing rollers 211A and 212A is shifted in the shift direction by the alignment unit 270A by driving the F-side aligning plate moving motor MT16 and the R-side aligning plate moving motor MT17 without being conveyed in a second conveyance direction by the reversing paddle 240A, and is discharged to the stacking tray 300 by the upper discharge roller 230A and the lower discharge roller 230B.

The alignment priority mode as a second shift discharge process is a mode in which the sheet conveyed to the downstream side in the first conveyance direction by the pre-processing rollers 211A and 212A is conveyed in the second conveyance direction by the reversing paddle 240A on the processing tray 220, a downstream end edge of the sheet in the second conveyance direction is abutted against (regulated) the trailing edge regulation member 290, then the F-side aligning plate moving motor MT16 and the R-side aligning plate moving motor MT17 are driven without performing the predetermined process by the staple unit 400, the sheet is shifted in the shift direction by the alignment unit 270A, and the sheet is discharged to the stacking tray 300 by the upper discharge roller 230A and the lower discharge roller 230B.

Manual Binding

A schematic configuration of an appearance of the sheet processing apparatus 200A of the present embodiment configured as described above is as illustrated in FIG. 4. In the sheet processing apparatus 200A of the present embodiment, a manual insertion portion 204 into which a user can manually insert a sheet or a sheet bundle from the outside is provided on the front side of the apparatus in the width direction. The manual insertion portion 204 is a portion into which a corner portion of the sheet bundle is inserted in a case where a user manually binds the sheet bundle by stapling from outside the apparatus. When the user inserts the sheet bundle into the manual insertion portion 204 and presses an operation button 205, the staple unit 400 moves to this position and performs staple processing. Note that a detection unit that detects that the sheet bundle has been inserted may be provided in the manual insertion portion 204, and when the detection unit detects the sheet bundle, the staple unit 400 may be moved to perform the staple process. In this case, the operation button 205 may be omitted.

Sheet Binding Apparatus

Figure 5:
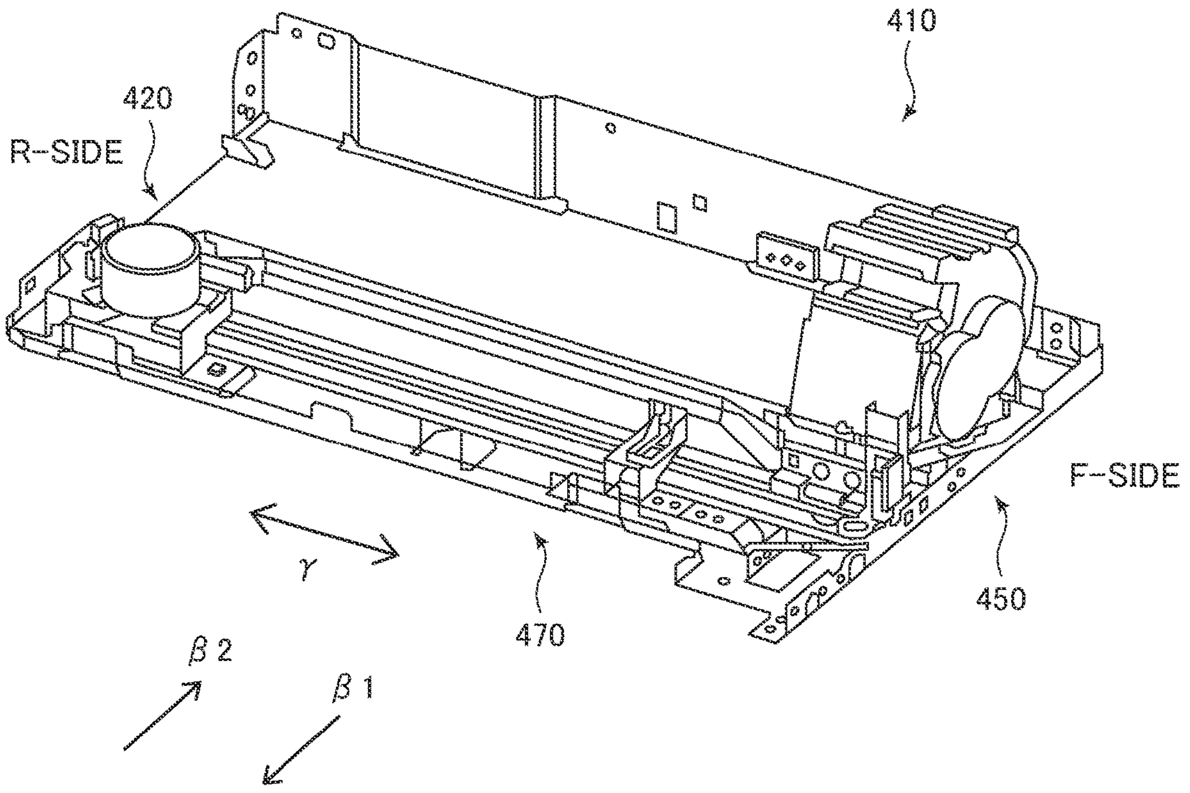
FIG. 5 is a schematic configuration perspective view of the sheet binding apparatus according to the embodiment.
Figure 6:
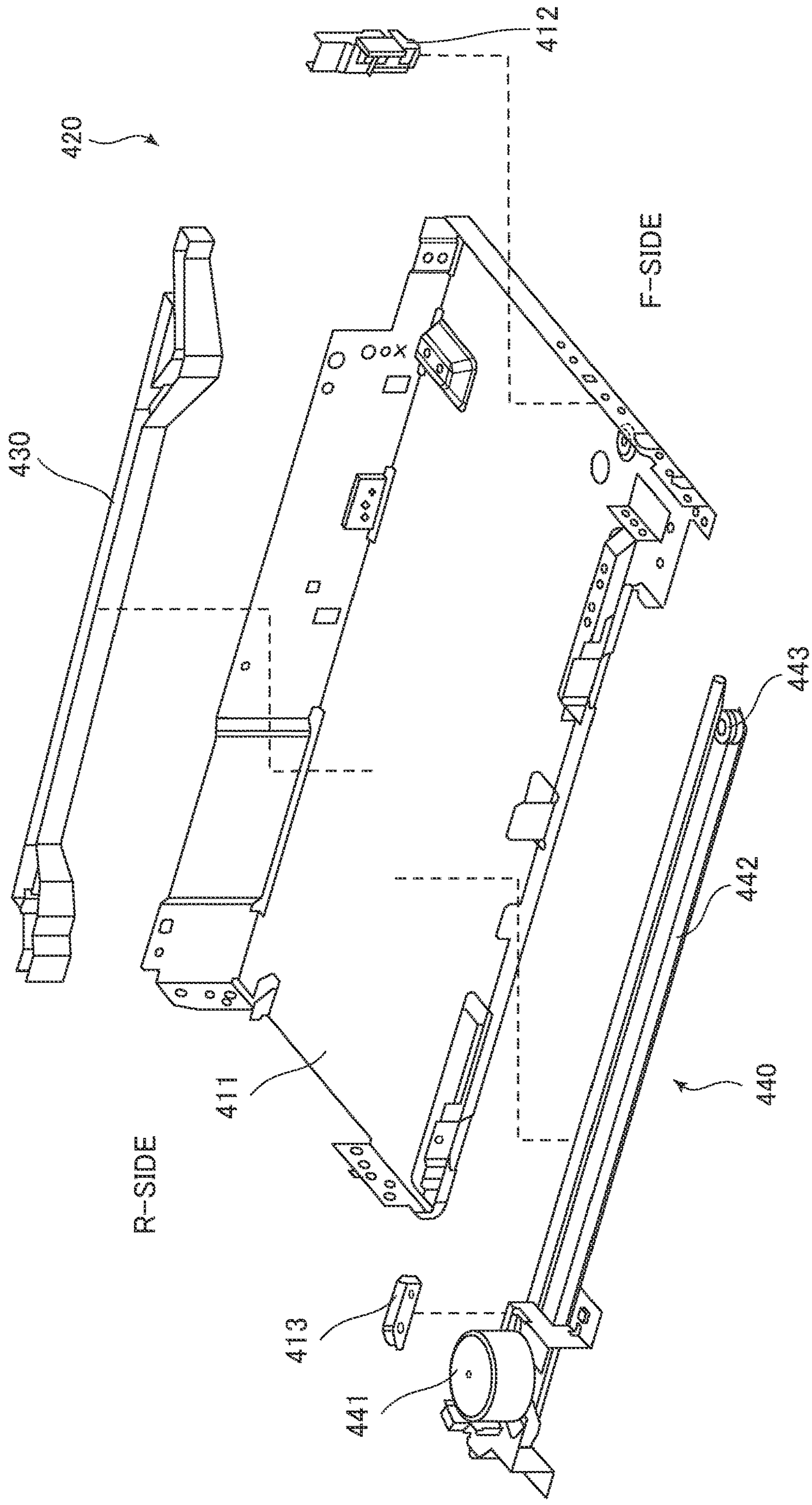
FIG. 6 is an exploded perspective view of a base portion of the sheet binding apparatus according to the embodiment.

Next, the sheet binding apparatus 410 according to the present embodiment will be described with reference to FIGS. 5 to 16B. First, an overall configuration of the sheet binding apparatus 410 will be described with reference to FIGS. 5 to 10. In FIGS. 5 and 6, the right front side in the drawings is the front side (F side) of the apparatus, and the left back side is the rear side (R side) of the apparatus. In FIG. 8, the right front side in the drawing is the rear side (R side) of the apparatus, and the left back side is the front side (F side) of the apparatus.

As illustrated in FIG. 5, the sheet binding apparatus 410 includes a base portion 420 and a stapler moving unit 450. As illustrated in FIG. 6, the base portion 420 includes a base 411, a cam groove 430 serving as a guide portion, a drive unit 440, and the like. The cam groove 430 and the drive unit 440 are fixed on the base 411. An HP sensor 412 (the above-described stapler movement HP sensor SN18) that detects the home position (HP) of the staple unit 400 and an abutment member 413 are also fixed on the base 411.

Figure 7:
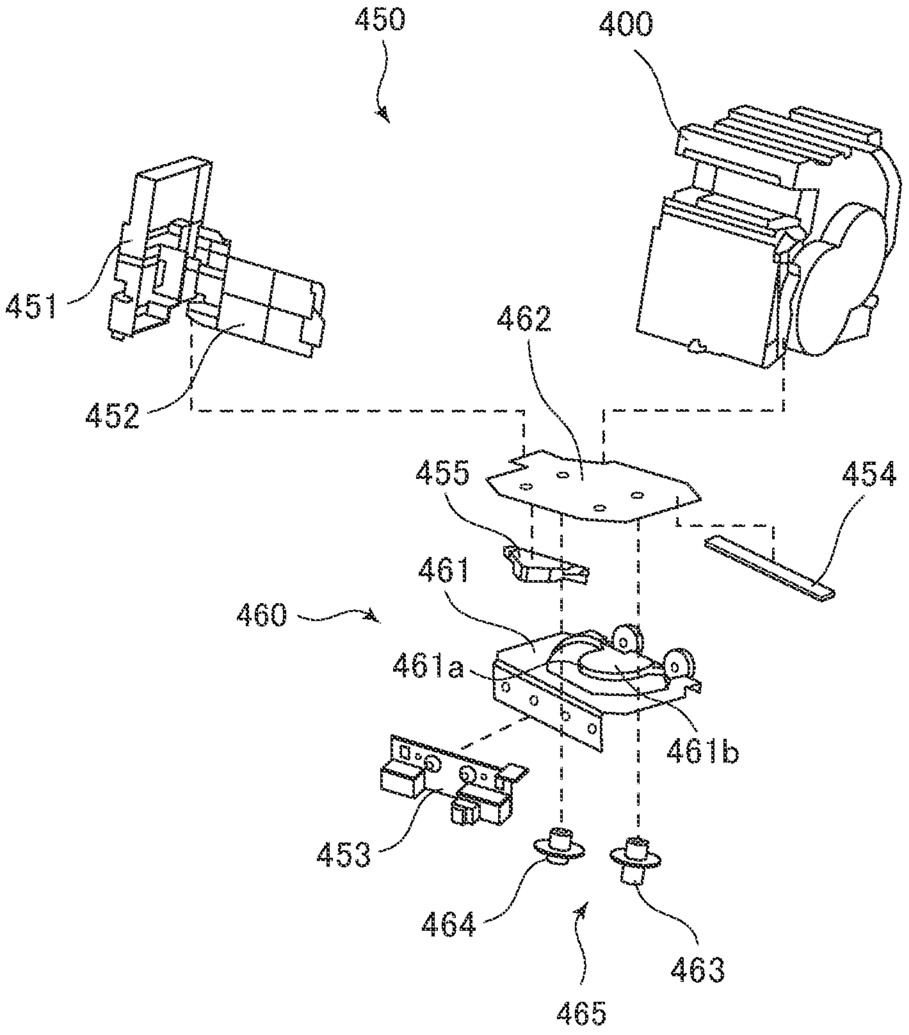
FIG. 7 is an exploded perspective view of a stapler moving unit of the sheet binding apparatus according to the embodiment.
Figure 8:
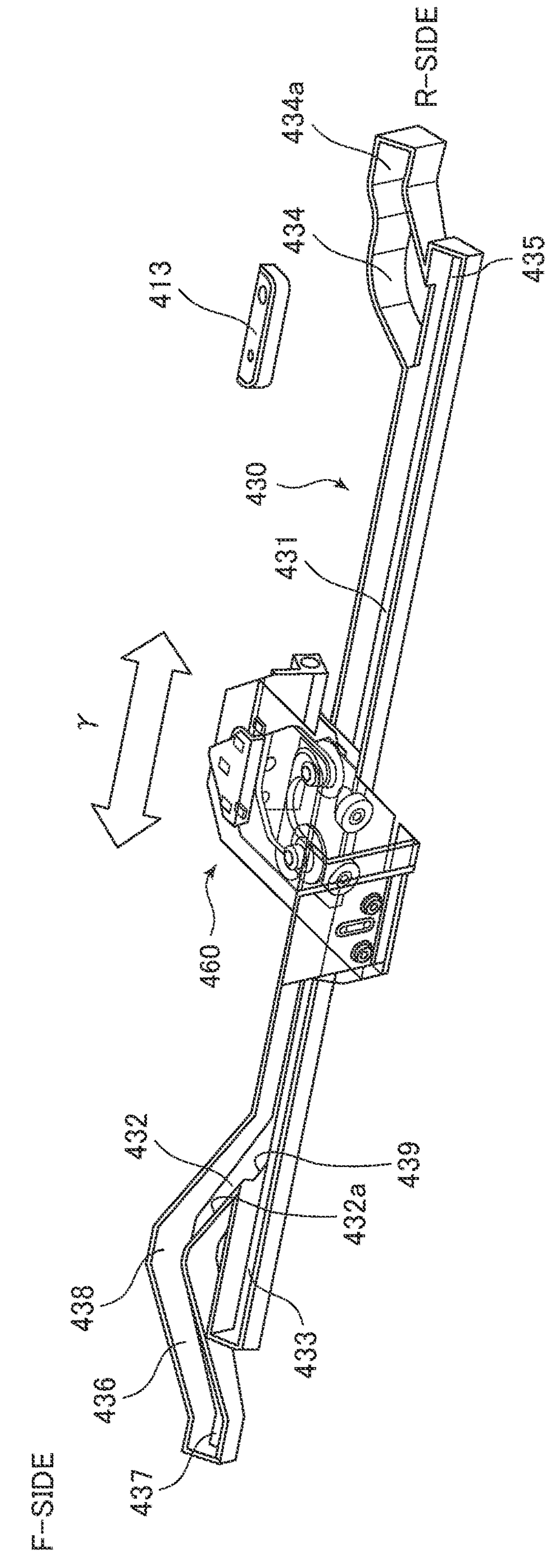
FIG. 8 is a perspective view illustrating a relationship between a cam groove and a stapler holding unit according to the embodiment.
Figure 9B:
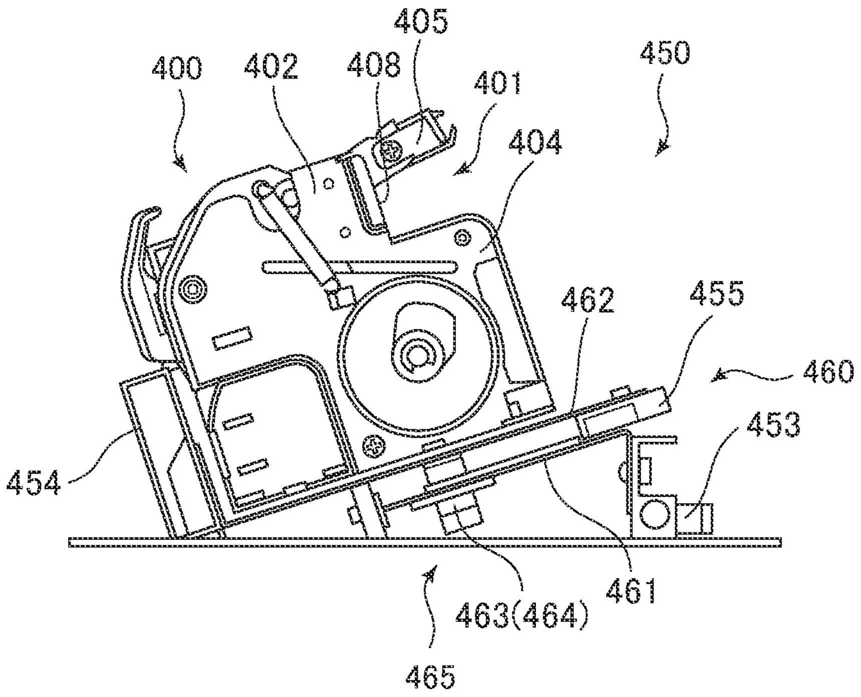
FIG. 9B is a cross-sectional view of the stapler moving unit according to the embodiment.
Figure 10:
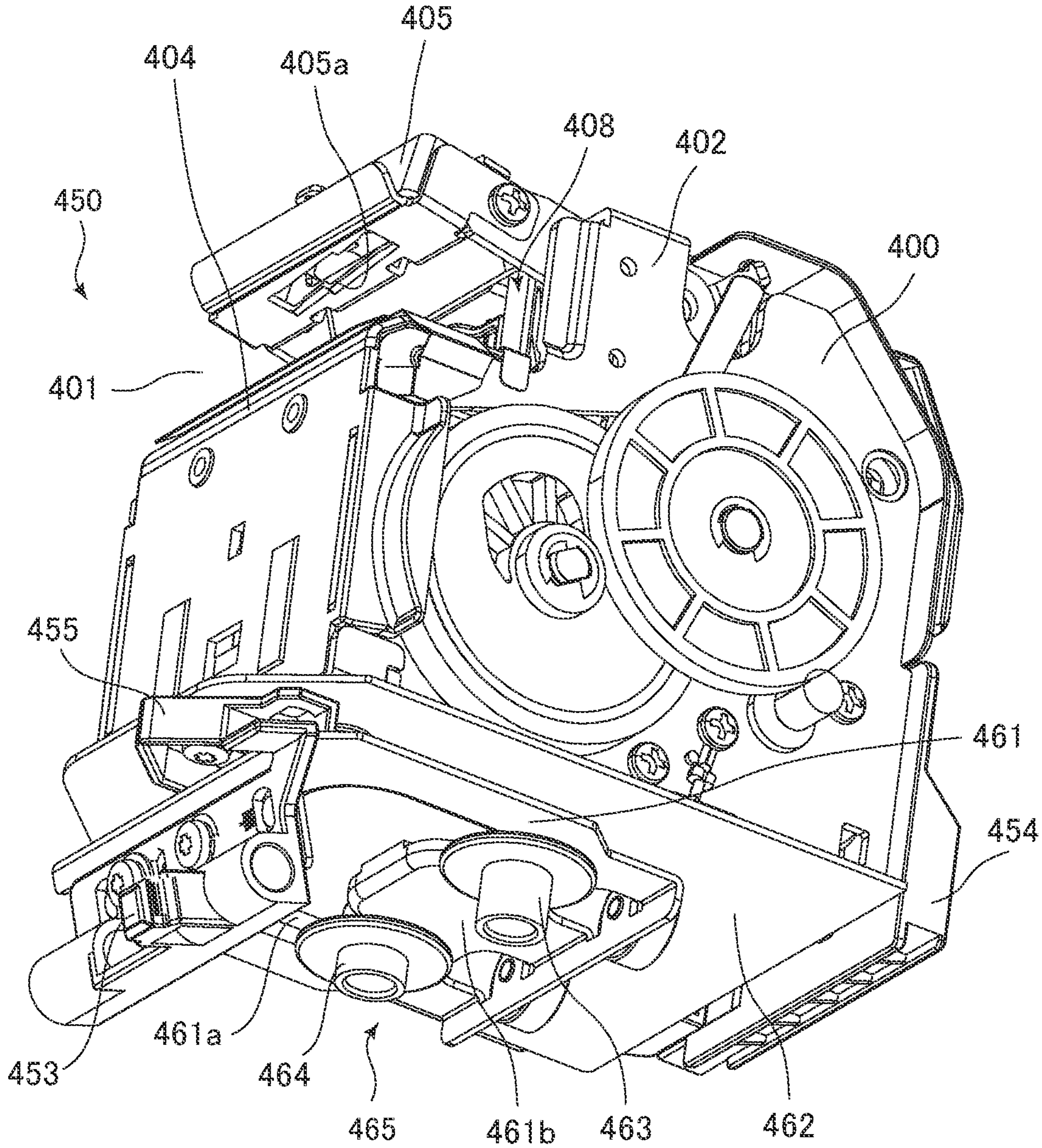
FIG. 10 is a perspective view of the stapler moving unit according to an embodiment.
Figure 36:
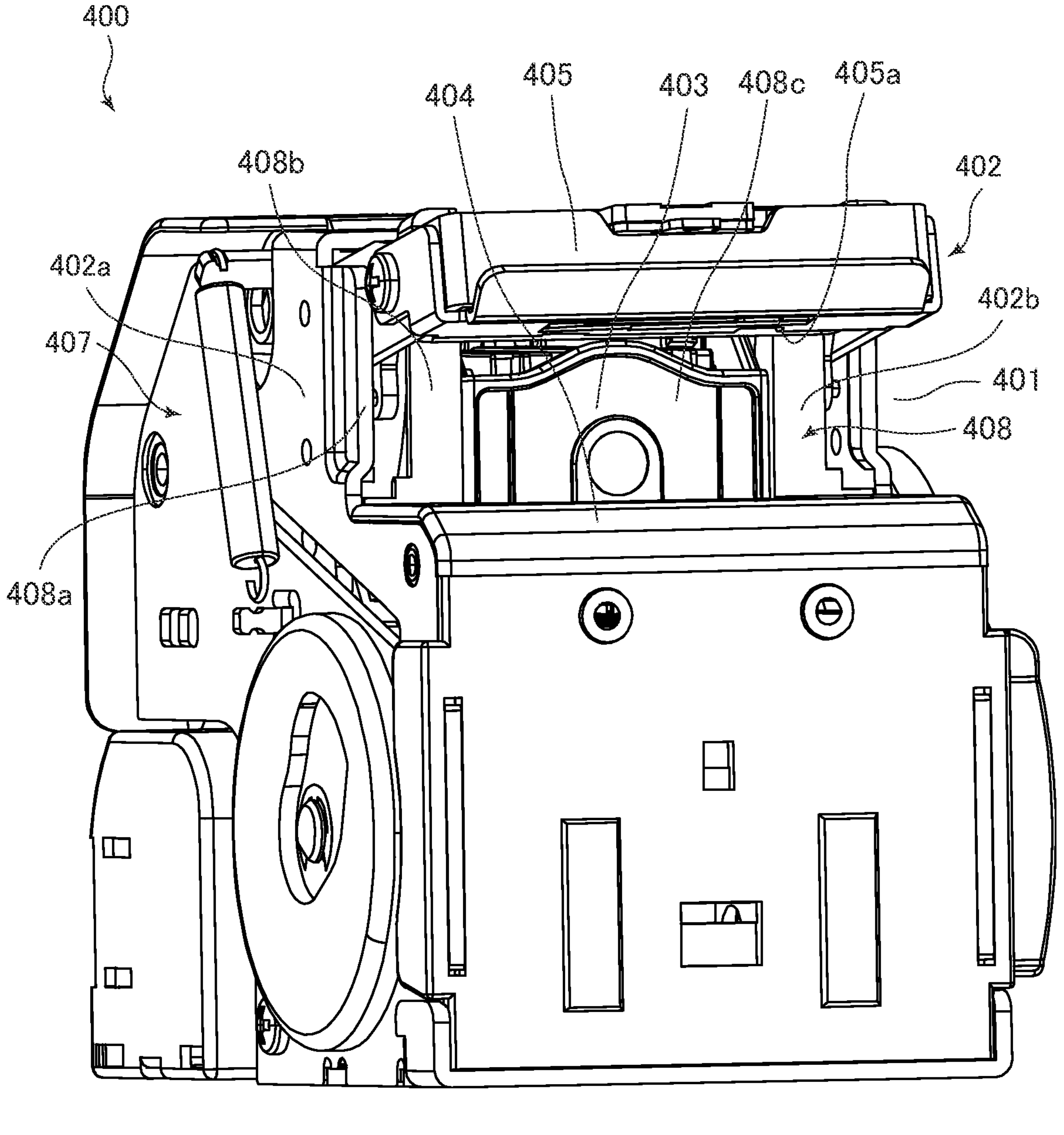
FIG. 36 is a perspective view of a stapler unit according to an embodiment.

As illustrated in FIG. 7, the stapler moving unit 450 includes a staple unit 400, a stapler holding unit 460, and the like. In the staple unit 400, the downstream end edge of the sheet in the second conveyance direction abuts against the trailing edge regulation member 290, and the staple unit 400 performs the binding process on the sheet moved in the width direction by the alignment unit 270A. As illustrated in FIGS. 9B, 10, and 36, such a staple unit 400 includes a unit frame 402, a needle cartridge 403, a staple head 404, an anvil member 405, and the like. The unit frame 402 includes a pair of metal side plates 402*a*, a pair of resin frames 402*b* disposed between the pair of side plates 402*a*, and the like. The needle cartridge 403 is detachably provided with respect to the unit frame 402 and holds a staple needle. The needle cartridge 403 is mounted between the pair of resin frames 402*b*.

The staple head 404 serving as the first portion is a portion that supplies the staple needle held in the needle cartridge 403 to a position where the binding process is performed, and is disposed below the anvil member 405 in the present embodiment. The anvil member 405 serving as the second portion is a portion that is disposed to face the staple head 404 and performs the binding process on sheets by nipping the sheets with the staple head 404. In the present embodiment, the anvil member 405 is disposed above the staple head 404 and moves up and down by being driven by a staple driving mechanism 407. The anvil member 405 is formed with a bending groove 405*a* for bending a point of the staple needle which is supplied from the staple head 404 and penetrates the sheet bundle. The staple driving mechanism 407 is a mechanism that moves the anvil member 405 up and down by driving the STP motor MT19 (FIG. 3).

The staple unit 400 has an insertion portion 401 that inserts the sheet bundle between the staple head 404 and the anvil member 405. The insertion portion 401 has a substantially U-shape when the staple unit 400 is viewed from either side in the width direction. That is, in the staple unit 400, a back side surface 408 is disposed on the downstream side in the second conveyance direction from the position where the binding process is performed on the sheets by the staple head 404 and the anvil member 405. The position where the binding process is performed is a position where the staple needle protrudes from the staple head 404, and is a position where the bending groove 405*a* of the anvil member 405 is formed.

In the present embodiment, the back side surface 408 includes a first end surface 408*a*, a second end surface 408*b*, and a third end surface 408*c*. The first end surface 408*a* is a surface located on both sides of the insertion portion 401 in the width direction and facing the upstream side in the second conveyance direction in the pair of metal side plates 402*a* constituting the unit frame 402. The second end surface 408*b* is a surface located on both sides of the insertion portion 401 in the width direction and facing the upstream side in the second conveyance direction in the pair of resin frames 402*b* constituting the unit frame 402. The third end surface 408*c* is a surface of the needle cartridge 403 that is located between the pair of resin frames 402*b* and exposed to the upstream side in the second conveyance direction. In the present embodiment, since the first, second, and third end surfaces 408*a*, 408*b*, and 408*c* are located on substantially a single plane, they are collectively referred to as the back side surface 408.

The stapler holding unit 460 includes a slide plate 461 serving as a moving portion, a rotation plate 462 serving as a rotation holding portion, and an engaging portion 465. The engaging portion 465 includes a first roller 463 serving as a first protrusion and a second roller 464 serving as a second protrusion.

Base Portion

In the base portion 420, the cam groove 430 and the like are fixed on the base 411 as described above. As illustrated in FIG. 8, the cam groove 430 guides movement of the staple unit 400 in a first direction and a second direction opposite to the first direction. Note that FIG. 8 illustrates a relationship between the stapler holding unit 460 and the cam groove 430 by omitting the staple unit 400 in the stapler moving unit 450.

The first direction and the second direction, which are the moving directions of the staple unit 400, are the above-described width direction (an arrow y direction in FIGS. 4, 5, and 8), and the staple unit 400 is guided by the cam groove 430 to reciprocate between the F side and the R side in the width direction. The above-described HP sensor 412 is disposed in the vicinity of the F-side end of the cam groove 430, and the abutment member 413 is disposed in the vicinity of the R-side end of the cam groove 430, respectively. A detailed configuration of the cam groove 430 will be described below.

As illustrated in FIGS. 5 and 6, the drive unit 440 serving as a driving unit reciprocates the staple unit 400 in the width direction along the cam groove, and includes a motor 441 (the above-described STP moving motor MT18) serving as a drive source and a belt 442. The belt 442 is stretched between a driving pulley (not illustrated) to which driving is transmitted from an output shaft of the motor 441 and a driven pulley 443. In the present embodiment, the motor 441 and the driving pulley are arranged on the R side in the width direction, the driven pulley is arranged on the F side, and the belt 442 is arranged over the width direction. As will be described below, a stapler moving unit 450 is fixed to the belt 442, and when the belt 442 rotates, the stapler moving unit 450 reciprocates in the width direction along the cam groove 430.

Note that the driving unit for moving the staple unit 400 may have a configuration other than the above-described belt configuration. For example, a motor and a pinion gear to which drive is transmitted from an output shaft of the motor are provided on the staple unit 400 side, and a rack gear is provided along the width direction on the base 411 side. Then, the pinion gear and the rack gear are engaged with each other. By driving the motor on the staple unit 400 side, the staple unit 400 moves along the rack gear by the engagement between the pinion gear and the rack gear. As described above, the driving unit may be configured to cause the staple unit 400 to self-propel.

Stapler Moving Unit

As illustrated in FIG. 7, the stapler moving unit 450 includes the staple unit 400, a cable holder 451, a cover 452, a belt holder 453, an inclination regulation member 454, a contact portion 455, the stapler holding unit 460, and the like. The staple unit 400 can perform binding process on the sheet bundle. The cable holder 451 is a holder that holds a cable connected to an apparatus body of the sheet processing apparatus 200A. The cover 452 covers a connection portion between the staple unit 400 and the cable disposed via the cable holder 451. The staple unit 400 is driven by power supplied from the apparatus body via the cable.

The belt holder 453 is connected to the belt 442 of the drive unit 440 described above. The inclination regulation member 454 regulates an inclination angle of the staple unit 400 as described below. The contact portion 455 is a member that abuts on an abutment member 413 provided in the base portion 420 and serves as a trigger for inclining the staple unit 400 when the staple unit 400 performs oblique binding described below on the R side.

Figure 9A:
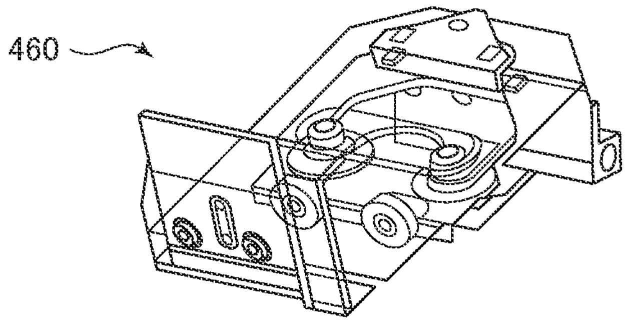
FIG. 9A is a perspective view of the stapler holding unit according to the embodiment.

As illustrated in FIGS. 7 and 9A, the stapler holding unit 460 is obtained by integrally assembling the slide plate 461, the rotation plate 462, the first roller 463, and the second roller 464, and moves along the cam groove 430 integrally with the staple unit 400.

The slide plate 461 moves along the cam groove 430 together with the staple unit 400. For this purpose, the belt holder 453 is fixed to the slide plate 461, and the slide plate 461 moves along the cam groove 430 by the rotation of the belt 442. Further, the slide plate 461 has a guide hole 461*a* as a penetrating portion through which the first roller 463 and the second roller 464 penetrate and which allows the first roller 463 and the second roller 464 to move with the rotation of the staple unit 400.

The rotation plate 462 rotatably holds the staple unit 400 with respect to the slide plate 461, and the staple unit 400 is integrally fixed to the upper surface thereof. The rotation plate 462 is disposed on the upper surface of the slide plate 461 so as to be rotatable with respect to the slide plate 461. Further, the contact portion 455 is fixed to the rotation plate 462, and when the stapler moving unit 450 moves to the R side and the contact portion 455 abuts the abutment member 413, the rotation plate 462 and the staple unit 400 rotate with respect to the slide plate 461. Further, the first roller 463 and the second roller 464 are fixed to the rotation plate 462 at intervals.

The first roller 463 and the second roller 464 are provided to be movable in the width direction together with the staple unit 400 and to be rotatable together with the staple unit 400, and are engaged with the cam groove 430. An outer peripheral surface of at least a portion of the first roller 463 and the second roller 464 engaged with the cam groove 430 is formed in a cylindrical shape. The first roller 463 and the second roller 464 are rotatably fixed to a surface of the rotation plate 462 on a side opposite to a side on which the staple unit 400 is fixed, that is, a lower surface. The first roller 463 and the second roller 464 may not rotate.

In addition, the first roller 463 and the second roller 464 are provided so as to protrude downward from the rotation plate 462, and protrusion amounts of the first roller 463 and the second roller 464 are different from each other. That is, the first roller 463 serving as the first protrusion has a larger protrusion amount from the rotation plate 462 than the second roller 464 serving as the second protrusion. The first roller 463 and the second roller 464 are arranged at a predetermined interval from each other, pass through the guide hole 461*a* formed in the slide plate 461 located below the rotation plate 462, and protrude below the slide plate 461.

The guide hole 461*a* of the slide plate 461 is an opening curved so as to guide the first roller 463 and the second roller 464 in the rotation direction of the staple unit 400, and at least an inner peripheral edge portion of the guide hole 461*a* is formed in a substantially semicircular shape. In the present embodiment, the inner peripheral edge portion of the guide hole 461*a* is a semicircle having a diameter slightly larger than the distance between the outer peripheral surface of the first roller 463 and the outer peripheral surface of the second roller 464. As a result, the first roller 463 and the second roller 464 are movable along the inner peripheral edge portion of the guide hole 461*a*. The guide hole 461*a* has a width larger than the diameters of the first roller 463 and the second roller 464, and is formed to smoothly guide the first roller 463 and the second roller 464. The outer peripheral edge of the guide hole 461*a* may be formed in a substantially semicircular shape, and the first roller 463 and the second roller 464 may be movable along the outer peripheral edge of the guide hole 461*a*.

Further, a straight line connecting both ends of the semicircle of the guide hole 461*a* is substantially parallel to the width direction which is a moving direction of the staple unit 400. Therefore, in a state where the staple unit 400 is not inclined with respect to the width direction, the first roller 463 and the second roller 464 are positioned so as to be arranged substantially parallel to the width direction, and are positioned at the both ends of the semicircle of the guide hole 461*a*. Then, the first roller 463 and the second roller 464 sandwich an arc-shaped plate portion 461*b* on the inner side of the guide hole 461*a* at this position.

When the slide plate 461 is driven by the drive unit 440 to move in the width direction, the first roller 463 and the second roller 464 are engaged with the cam groove 430, and the slide plate 461 moves along the cam groove 430. At this time, the arc-shaped plate portion 461*b* of the slide plate 461 is sandwiched between the first roller 463 and the second roller 464, so that the slide plate 461 and the rotation plate 462 can be integrally and stably moved.

In the above example, the rotation plate 462 is disposed between the staple unit 400 and the slide plate 461, and the first roller 463 and the second roller 464 provided on the rotation plate 462 are disposed so as to penetrate the slide plate 461. However, as long as the staple unit 400 is rotatable with respect to the slide plate 461, the positions of the slide plate 461 and the rotation plate 462 may be interchanged. For example, the staple unit 400 and the rotation plate 462 may be disposed so as to sandwich the slide plate 461, and the staple unit 400 and the rotation plate 462 may be fixed via an arm or the like. In short, the stapler holding unit 460 only needs to be configured to be able to move the staple unit 400 along the cam groove 430 and to be able to rotate the staple unit 400 at a position where oblique binding is performed on the F side and the R side to be described below.

The guide hole 461*a* is not limited to the semicircular curved configuration as described above. For example, on a straight line connecting the center of the first roller 463 and the center of the second roller 464, a round hole having a diameter slightly larger than a distance between positions where the outer peripheral surface of the first roller 463 and the outer peripheral surface of the second roller 464 are farthest from each other may be used. In short, the guide hole 461*a* may be formed so as to guide the first roller 463 and the second roller 464 so that the first roller 463 and the second roller 464 penetrate and may rotate together with the staple unit 400.

As illustrated in FIGS. 9B and 10, the stapler moving unit 450 is configured by assembling the staple unit 400 to the stapler holding unit 460. As illustrated in FIG. 9B, the staple unit 400 is disposed to be inclined in accordance with the inclination of the processing tray 220 described above, and the insertion portion 401 into which the sheet bundle, on which the binding process is performed, is inserted is directed obliquely upward. The inclination regulation member 454 described above is disposed on the back surface of the staple unit 400 on the side opposite to the insertion portion 401, and the inclination of the staple unit 400 is regulated by the inclination regulation member 454 abutting on the base 411. As a result, it is possible to prevent the staple unit 400 from being excessively inclined when the staple unit 400 moves in the width direction. The position of the inclination regulation member 454 in the vertical direction can be adjusted.

Cam Groove

Figure 11:
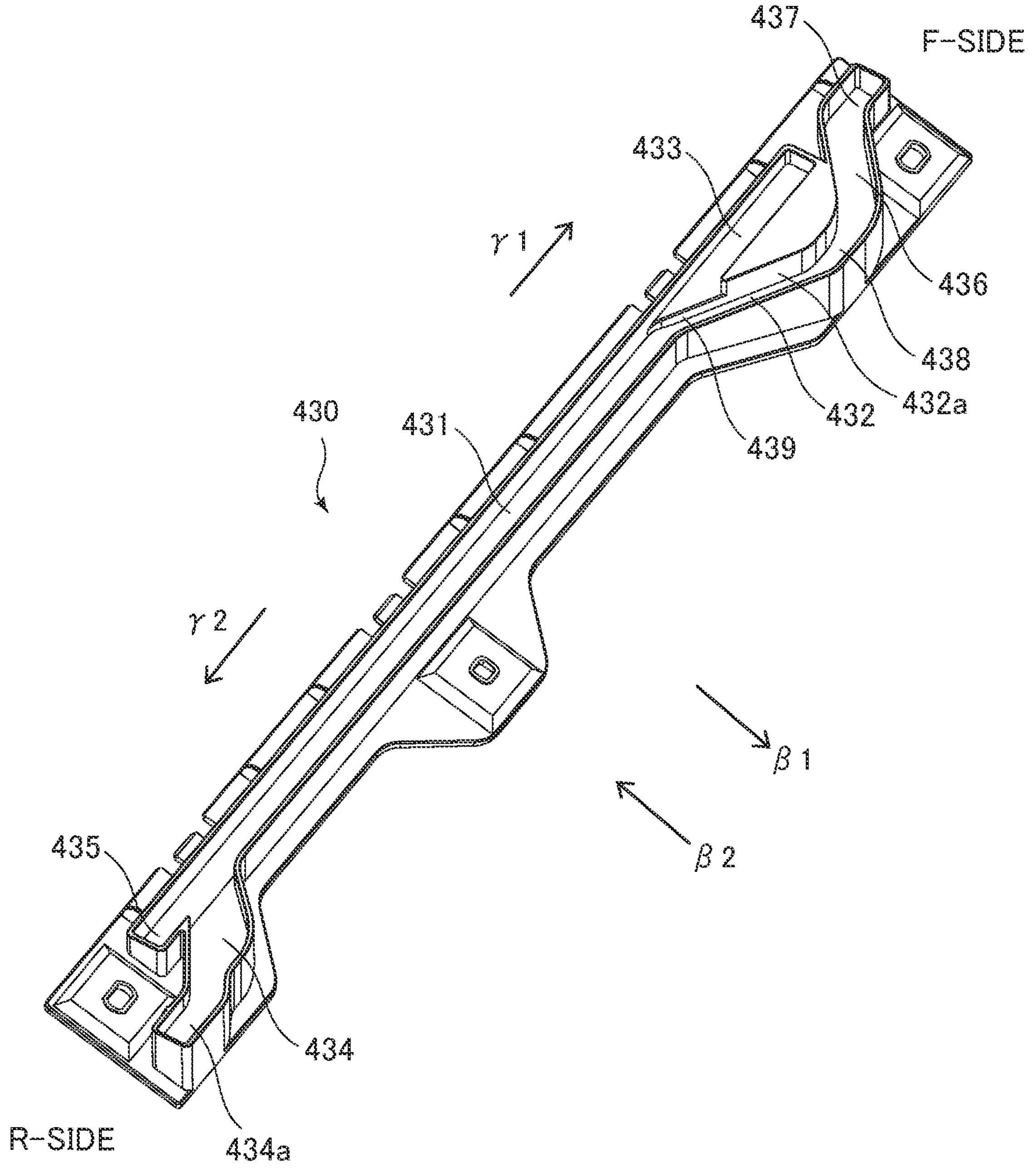
FIG. 11 is a perspective view of the cam groove according to the embodiment.
Figure 12:
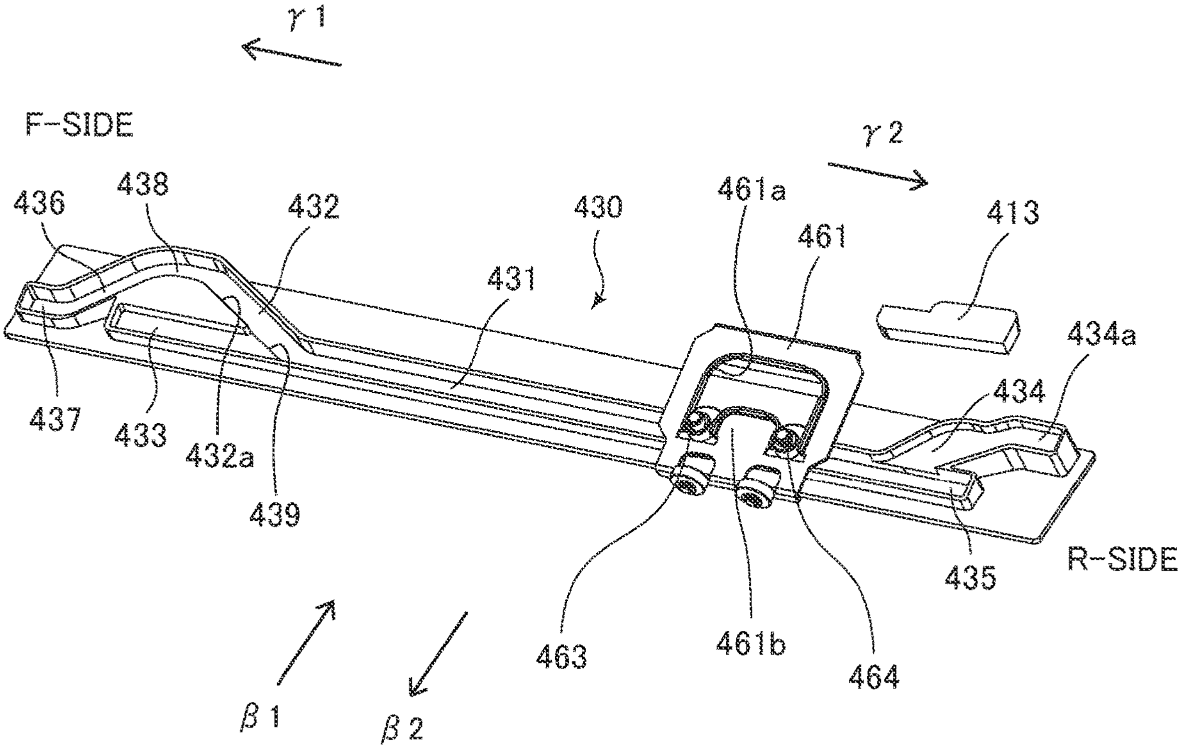
FIG. 12 is a perspective view illustrating a relationship between the cam groove and a moving portion according to the embodiment.
Figure 13:
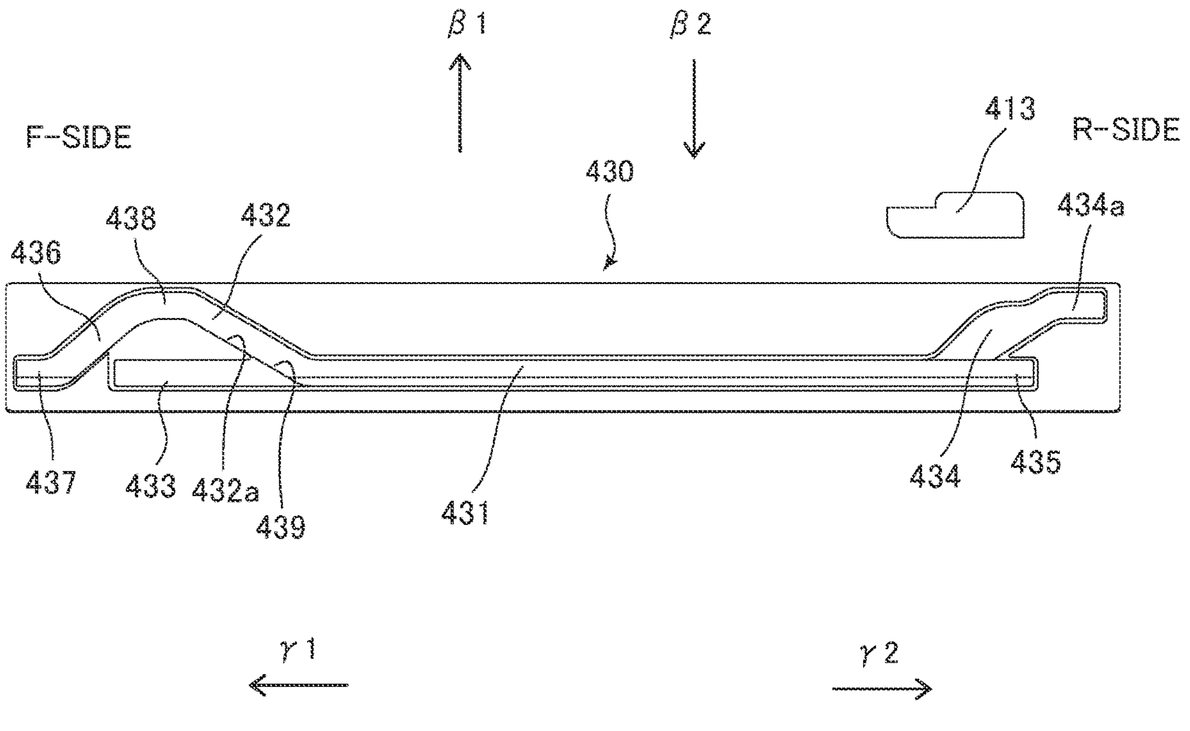
FIG. 13 is a plan view of the cam groove according to the embodiment.

Next, the cam groove 430 will be described with reference to FIGS. 11 to 13. Here, the first direction and the second direction are directions along the above-described width direction, and the first direction is indicated by an arrow γ1 and the second direction is indicated by an arrow γ2. In the present embodiment, the first direction is a direction toward the F side along the width direction, and the second direction is a direction toward the R side along the width direction. The relationship between the first direction and the second direction may be reversed depending on the configuration of the device. In addition, a direction of an arrow β1 illustrated in FIGS. 11 to 13 is the above-described first conveyance direction, and a direction of an arrow β2 is the above-described second conveyance direction. The first conveyance direction β1 is a direction in which the sheet is conveyed toward the processing tray 220 by the above-described pre-processing rollers 211A and 212A, and the second conveyance direction β2 is a direction in which the sheet on the processing tray 220 is conveyed toward the trailing edge regulation member 290 by the above-described reversing paddle 240A.

The cam groove 430 includes a first groove 431, a second groove 432, a third groove 433, a fourth groove 434, a fifth groove 435, a sixth groove 436, and a seventh groove 437. In the present embodiment, the second groove 432, the third groove 433, the sixth groove 436, and the seventh groove 437 are disposed on the downstream side in the first direction γ1 of the first groove 431, that is, on the F side. On the other hand, the fourth groove 434 and the fifth groove 435 are disposed on the downstream side in the second direction γ2 of the first groove 431, that is, on the R side. Each groove has a width slightly larger than the diameters of the first roller 463 and the second roller 464, and is formed such that the first roller 463 and the second roller 464 may enter and are guided without rattling. In the present embodiment, the outer diameters of the first roller 463 and the second roller 464 are the same, and the widths of the grooves are also the same. Hereinafter, each groove will be described in detail.

The first groove 431 is formed along the first direction γ1. The second groove 432 is formed along a direction inclined with respect to the first direction γ1 from a downstream end of the first groove 431 in the first direction γ1. That is, the second groove 432 is inclined with respect to the width direction, and an inclination direction is a direction toward the downstream side in the first conveyance direction β1 as it goes toward the downstream side in the first direction γ1. The third groove 433 is formed along the first direction γ1 from the downstream end of the first groove 431 in the first direction γ1. That is, the third groove 433 is formed in a similar manner as the first groove 431, on the downstream side of the first groove 431 in the first direction γ1, extending downstream side from the first groove 431.

The fourth groove 434 is formed along a direction inclined with respect to the second direction γ2 from the downstream end of the first groove 431 in the second direction γ2. That is, the fourth groove 434 is inclined with respect to the width direction, and an inclination direction is a direction toward the downstream side in the first conveyance direction β1 as it goes toward the downstream side in the second direction γ2. The fifth groove 435 is formed along the second direction γ2 from the downstream end of the first groove 431 in the second direction γ2. That is, the fifth groove 435 is formed in a similar manner as the first groove 431, on the downstream side of the first groove 431 in the second direction γ2, extending downstream side from the first groove 431.

The sixth groove 436 is formed on the downstream side of the second groove 432 in the first direction γ1 along a direction inclined opposite to the second groove 432 with respect to the first direction γ1. That is, the sixth groove 436 is inclined with respect to the width direction, and the inclination direction is a direction toward the upstream side in the first conveyance direction β1, that is, the downstream side in the second conveyance direction β2 as it goes toward the downstream side in the first direction γ1. Between the second groove 432 and the sixth groove 436, a switching groove 438 for switching a rotation direction of the first roller 463 with respect to the second roller 464 is provided as described below.

The seventh groove 437 is formed along the first direction γ1 from the downstream end of the sixth groove 436 in the first direction γ1. The seventh groove 437 is located at the same position as the first groove 431 and the third groove 433 in the first conveyance direction β1, and when the first roller 463 enters the seventh groove 437 as described below, the direction of the stapler moving unit 450 is the same as the case where the first roller 463 and the second roller 464 are located in the first groove 431.

Relationship Between each Groove and First Roller and Second Roller

Next, a relationship between the grooves and the first roller 463 and the second roller 464 will be described with reference to FIGS. 11 to 16B. In the present embodiment, among the grooves described above, the third groove 433 is formed such that a depth of the groove is shallower than the other grooves. As described above, the first roller 463 and the second roller 464 have different protrusion amounts from the rotation plate 462. As a result, an entry amount of each of the first roller 463 and the second roller 464 into the groove is made different. The second roller 464 is disposed upstream side of the first roller 463 in the first direction γ1, that is, on the R side.

Note that the first roller 463 and the second roller 464 have different lengths so as to have different protrusion amounts from the rotation plate 462, but may have the same length as long as the entry amount into the groove is different. For example, by changing the attachment position in the height direction (a depth direction of the groove) with respect to the rotation plate 462, the entry amount of the first roller 463 and the second roller 464 into the groove can be changed even if the lengths are the same.

Here, the stapler moving unit 450 moves in the first direction γ1 and the second direction γ2, and each of the first roller 463 and the second roller 464 are positioned in any one of the grooves described above, whereby the posture of the staple unit 400 can be changed. Specifically, the staple unit 400 can be changed to a first posture and a second posture inclined with respect to the first posture. In the present embodiment, the drive unit 440 that moves the staple unit 400, the stapler holding unit 460 that holds the staple unit 400, and the cam groove 430 constitute a movable turning unit 470 (FIG. 5) that moves the staple unit 400 in the width direction and further turns the staple unit 400 between the first posture and the second posture inclined with respect to the first posture. Note the movable turning unit 470 may be configured to perform moving operation and turning operation by separate motors.

The first posture is a posture in which the staple unit 400 performs the binding process in the direction along the width direction with respect to a downstream edge portion of the sheet in the second conveyance direction β2, that is, a side stitch binding posture. The second posture is a posture in which the staple unit 400 performs the binding process in a direction inclined with respect to the width direction with respect to the corner portion on a first end side or a second end side (the F side or the R side in the present embodiment) in the width direction of the downstream edge portion of the sheet in the second conveyance direction β2, that is, a posture in which the staple unit performs the oblique binding. Note that the inclination direction with respect to the width direction is opposite between the second posture on the F side and the second posture on the R side.

The sheet binding apparatus 410 according to the present embodiment can execute a first binding process in which the staple unit 400 performs side stitching to a downstream edge portion (trailing edge portion) of the sheet in the second conveyance direction β2 in the first posture, a second binding process in which the staple unit 400 performs oblique binding to the first end side (F side) of the downstream edge portion (trailing edge portion) of the sheet in the second conveyance direction β2 in the second posture, and a third binding process in which the staple unit 400 performs oblique binding to the second end side (R side) of the downstream edge portion (trailing edge portion) of the sheet in the second conveyance direction β2 in the second posture.

Figure 14A:
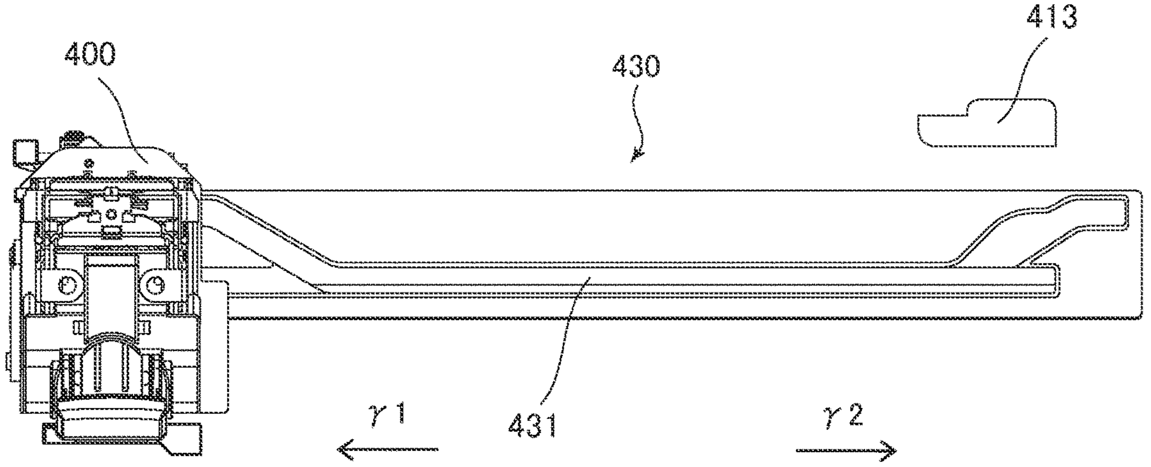
FIG. 14A is a plan view illustrating a relationship between the cam groove and the stapler moving unit at a home position.
Figure 14B:
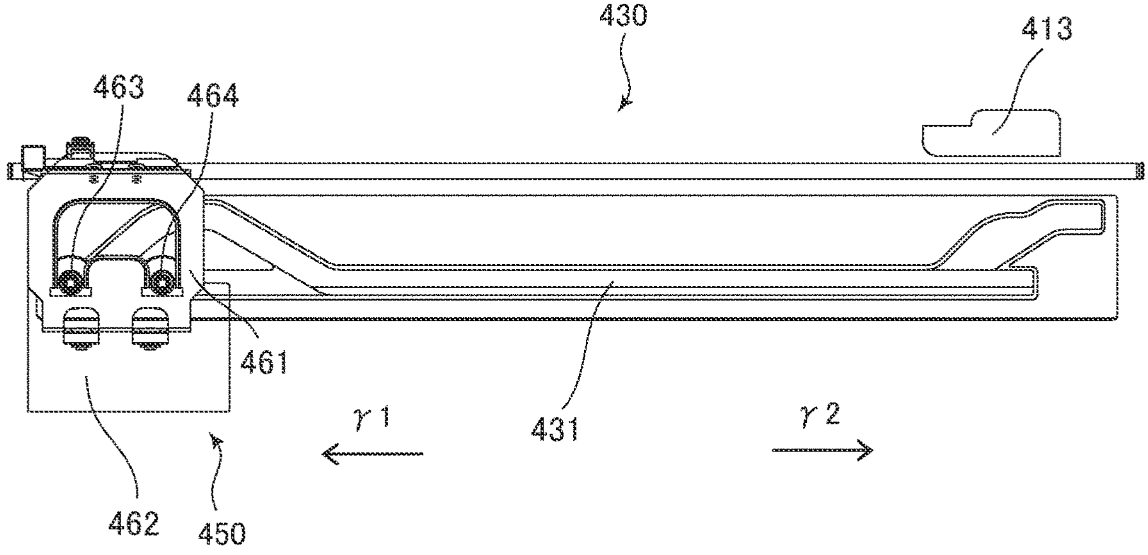
FIG. 14B is a plan view illustrating a relationship between the cam groove and the moving portion at the home position.
Figure 15A:
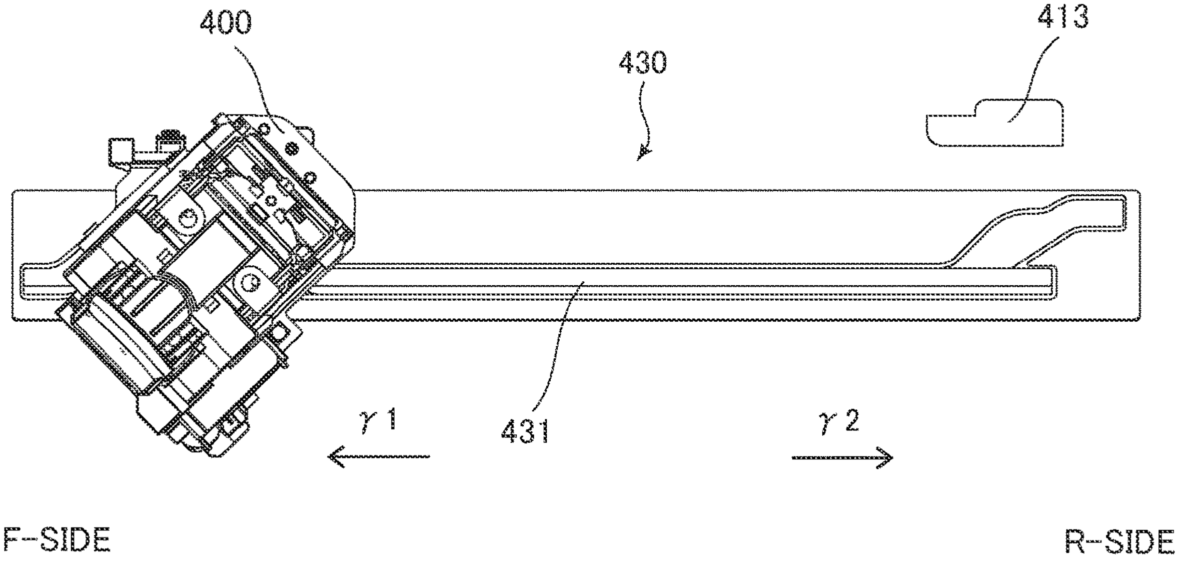
FIG. 15A is a plan view illustrating a relationship between the cam groove and the stapler moving unit at an oblique binding position on a front side.
Figure 15B:
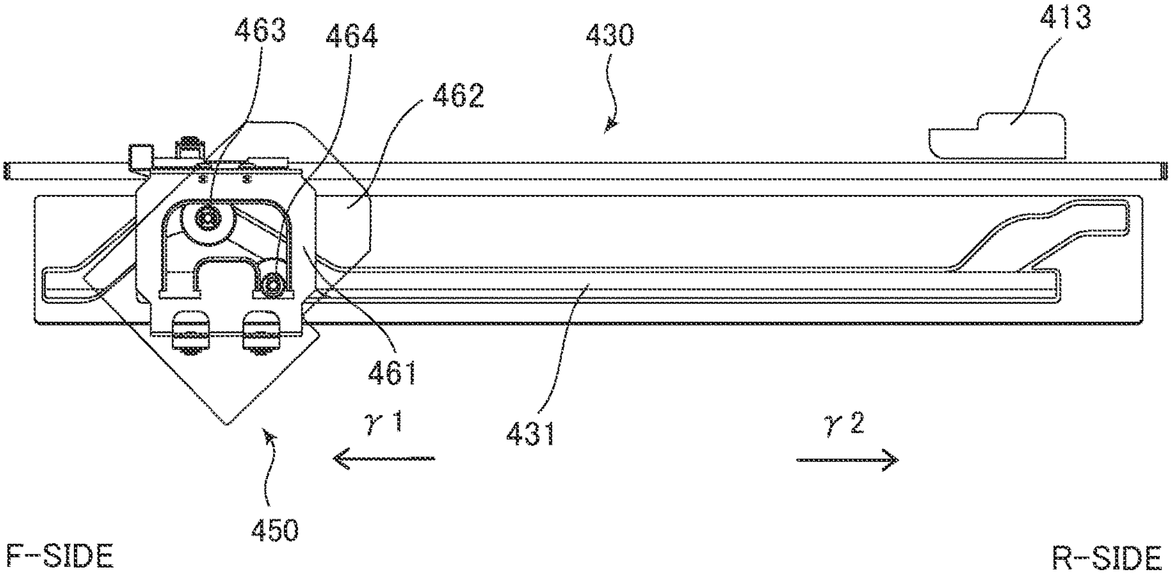
FIG. 15B is a plan view illustrating a relationship between the cam groove and the moving portion at the oblique binding position on the front side.
Figure 16A:
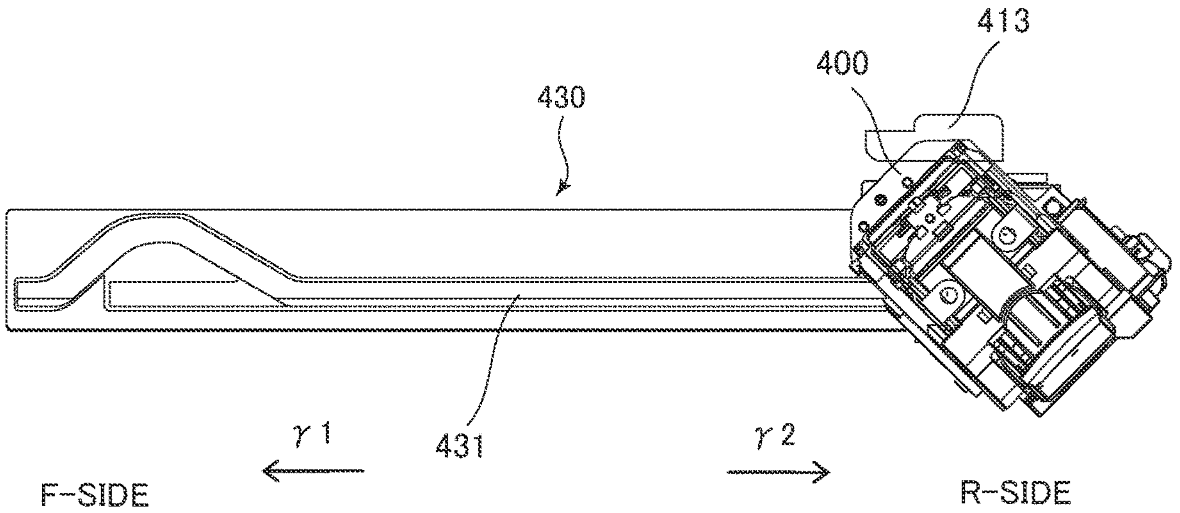
FIG. 16A is a plan view illustrating a relationship between the cam groove and the stapler moving unit at the oblique binding position on a rear side.
Figure 16B:
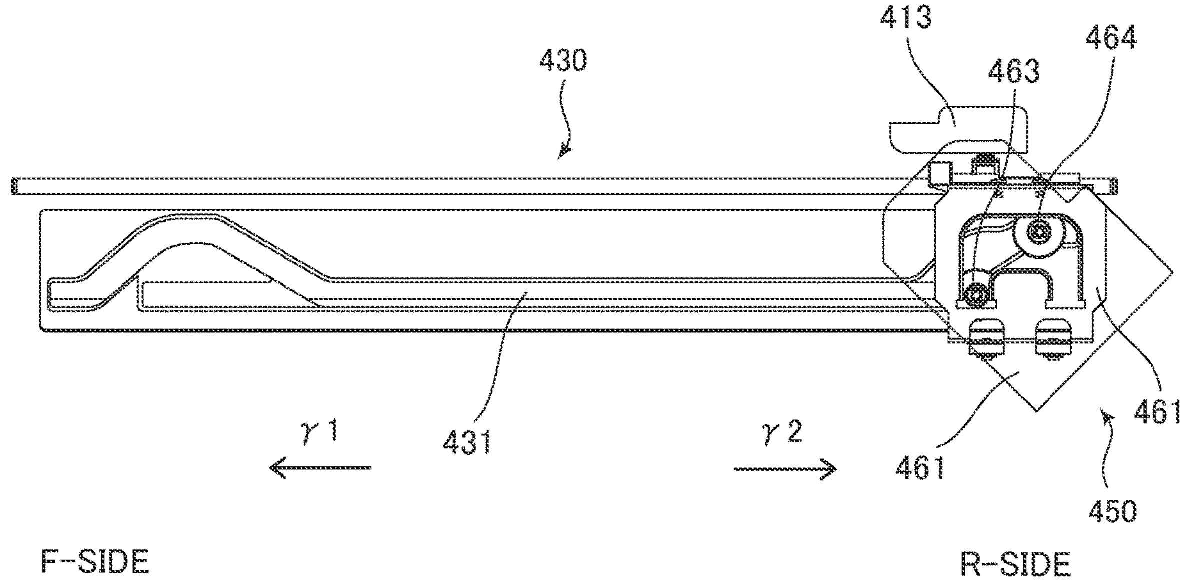
FIG. 16B is a plan view illustrating a relationship between the cam groove and the moving portion at the oblique binding position on the rear side.

FIGS. 14A and 14B illustrate a state in which the stapler moving unit 450 is at the home position (HP). At the home position, the staple unit 400 takes the same posture as the first posture, but does not perform the binding process on the sheets. FIGS. 15A and 15B illustrate the second posture on the F side, and FIGS. 16A and 16B illustrate the second posture on the R side, respectively.

First Groove and F-Side Groove

First, a relationship between the first groove 431, the second groove 432, the third groove 433, the sixth groove 436, and the seventh groove 437 on the downstream side in the first direction γ1 of the first groove 431, that is, on the F side, and the first roller 463 and the second roller 464 will be described. The first roller 463 can be engaged with the first groove 431 and the second groove 432 by entering the first groove 431 and the second groove 432 by a first entry amount. On the other hand, the second roller 464 can be engaged with the first groove 431 and the third groove 433 by entering the first groove 431 and the third groove 433 with a second entry amount smaller than the first entry amount.

The third groove 433 has a stepped surface 439 serving as a restricting portion that restricts entry of the first roller 463 from the first groove 431 and permits entry of the second roller 464 from the first groove 431. That is, the first groove 431 and the second groove 432 are formed such that the depth of the groove is deeper than the first entry amount. On the other hand, the third groove 433 is formed such that the depth of the groove is shallower than the first entry amount and deeper than the second entry amount. The stepped surface 439 between the third groove 433 and the first groove 431 restricts entry of the first roller 463 from the first groove 431 and allows entry of the second roller 464 from the first groove 431.

Therefore, when the stapler moving unit 450 moves to the downstream side in the first direction γ1 toward the third groove 433 along the first groove 431, the first roller 463 on the downstream side in the first direction γ1 with respect to the second roller 464 abuts on the stepped surface 439. The stepped surface 439 is formed in parallel with the inclination direction of the second groove 432, and is on the same plane as the inner wall surface 432*a* on the upstream side in the first conveyance direction β1 of the second groove 432, that is, on the third groove 433 side. Therefore, when the stapler moving unit 450 further attempts to move downstream side in the first direction γ1 in a state of being in contact with the stepped surface 439, the first roller 463 is guided to the second groove 432 along the inclination of the stepped surface 439.

On the other hand, with the movement of the stapler moving unit 450 to the downstream side in the first direction γ1, the second roller 464 located upstream side of the first roller 463 in the first direction γ1 reaches the position of the stepped surface 439 after the first roller 463 is guided to the second groove 432. The entry amount of the second roller 464 into the groove is smaller than the entry amount of the first roller 463 into the groove, and the third groove 433 is formed deeper than the entry of the second roller 464 into the groove. Therefore, when the stapler moving unit 450 moves downstream side in the first direction γ1, the second roller 464 enters the third groove 433 without abutting on the stepped surface 439.

By such an operation, the first roller 463 enters the second groove 432, and the second roller 464 enters the third groove 433, respectively, and the rotation plate 462 to which the first roller 463 and the second roller 464 are fixed rotates with respect to the slide plate 461. At this time, the first roller 463 rotates about the second roller 464 along the guide hole 461*a* formed in the slide plate 461, so that the first roller 463 can enter the second groove 432 and rotate the rotation plate 462.

Then, when the stapler moving unit 450 further moves to the downstream side in the first direction γ1, the first roller 463 reaches the switching groove 438 as illustrated in FIG. 15B. The first roller 463 can enter the switching groove 438, and in the present embodiment, the switching groove has the same depth as the second groove 432. Switching groove 438 is formed substantially parallel to the first groove 431. Therefore, when the first roller 463 is positioned in the switching groove 438, the position of the first roller 463 with respect to the second roller 464 is stabilized in the first conveyance direction β1.

That is, in a state where the first roller 463 enters the second groove 432, the positional relationship with the second roller 464 changes depending on the position of the first roller 463 on the second groove 432, and the angle of the staple unit 400 held by the rotation plate 462 also changes. On the other hand, when the first roller 463 enters the switching groove 438, the angle of the staple unit 400 is stabilized regardless of the position of the first roller 463 on the switching groove 438. Then, at this position, the staple unit 400 takes the second posture as illustrated in FIG. 15A for performing oblique binding on the F side as described above. As described above, in the present embodiment, the switching groove 438 functions as a positioning groove of the first roller 463 for causing the staple unit 400 to take the second posture on the F side. Note that the staple unit 400 may take the second posture in a state where the first roller 463 is positioned in the second groove 432.

The restricting portion that restricts the entry of the first roller 463 from the first groove 431 and permits the entry of the second roller 464 from the first groove 431 is not limited to the stepped surface 439 described above. For example, the restricting portion may be a horizontal bar provided at an upstream end of the third groove 433 in the first direction γ1 at a position shallower than the first entry amount and deeper than the second entry amount. In this case, the third groove may have the same depth as the first groove.

Next, a relationship between the sixth groove 436 and the seventh groove 437 formed continuously with the switching groove 438 on the downstream side in the first direction γ1 of the switching groove 438 and the first roller 463 and the second roller 464 will be described. The sixth groove 436 and the seventh groove 437 have a depth into which the first roller 463 can enter, and in the present embodiment, have the same depth as the second groove 432.

As described above, when the first roller 463 enters the second groove 432 and the stapler moving unit 450 moves downstream side in the first direction γ1, the first roller 463 enters the sixth groove 436 through the switching groove 438. At this time, the first roller 463 rotates about the second roller 464 along the guide hole 461*a* formed in the slide plate 461. The rotation direction at this time is opposite to the rotation direction when the first roller 463 enters the second groove 432 from the first groove 431. As a result, the rotation direction of the first roller 463 with respect to the second roller 464 is switched by the switching groove 438, and the entry into the sixth groove 436 and the rotation of the rotation plate 462 become possible.

Next, when the stapler moving unit 450 further moves to the downstream side in the first direction γ1, the first roller 463 enters the seventh groove 437 as illustrated in FIG. 14B. As described above, the seventh groove 437 is formed along the first direction γ1, and is located at the same position as the first groove 431 and the third groove 433 with respect to the first conveyance direction β1. Therefore, when the first roller 463 enters the seventh groove 437, the first roller 463 rotates about the second roller 464 along the guide hole 461*a* formed in the slide plate 461, and the rotation plate 462 and the staple unit 400 held by the rotation plate 462 take a posture as illustrated in FIG. 14A. This posture is the same posture as when the first roller 463 and the second roller 464 are in the first groove 431. In the present embodiment, the case where the first roller 463 is positioned in the seventh groove 437 is set as the home position (HP) of the stapler moving unit 450.

Figure 4:
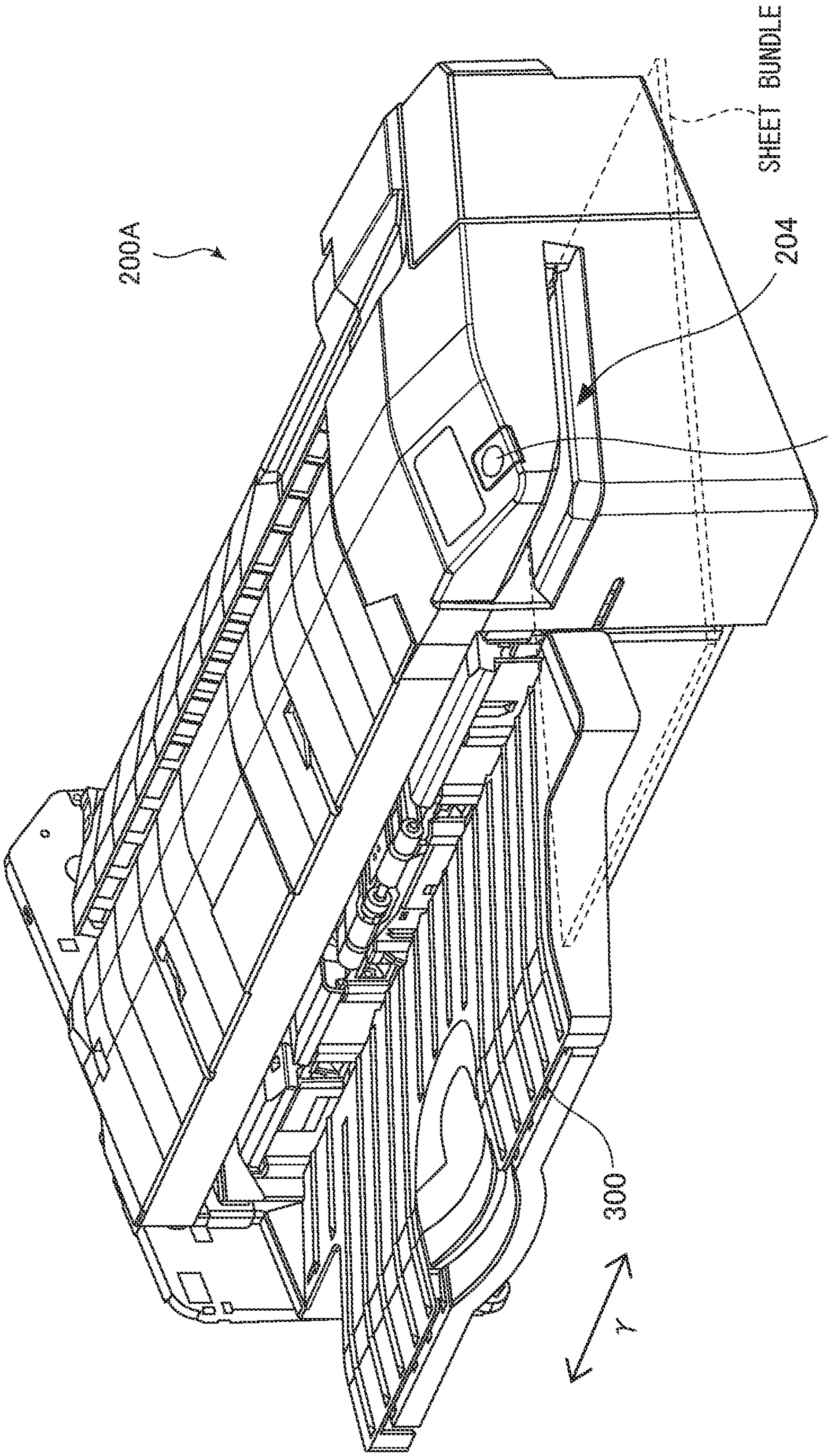
FIG. 4 is a perspective view of the sheet processing apparatus according to the embodiment.

In the present embodiment, the above-described manual binding operation can be performed at the home position, that is, at the position where the first roller 463 enters the seventh groove 437. That is, when the stapler moving unit 450 is located at the home position, a portion of the staple unit 400 that performs the binding process is located in the manual insertion portion 204 (FIG. 4). Therefore, when the user inserts the sheet bundle into the manual insertion portion 204 in this state, the sheet bundle enters a portion where the binding process is performed, and the binding process can be performed.

R-Side Groove

Next, a relationship between the fourth groove 434 and the fifth groove 435 on the downstream side in the second direction γ2 of the first groove 431, that is, on the R side, and the first roller 463 and the second roller 464 will be described. The second roller 464 can enter the fourth groove 434, and the first roller 463 can enter the fifth groove 435. In the present embodiment, the fourth groove 434 has the same depth as the third groove 433, and the fifth groove 435 has the same depth as the first groove 431. The fourth groove 434 may have the same depth as the fifth groove 435.

As described above, the abutment member 413 is disposed in the vicinity of the R-side end of the cam groove 430. As illustrated in FIGS. 12 and 13, the abutment member 413 serving as the abutted portion is disposed outside the first groove 431 to the seventh groove 437. In the present embodiment, the abutment member 413 is disposed at the downstream end portion of the first groove 431 in the second direction γ2 and is disposed on the downstream side of the fourth groove 434 in the first conveyance direction β1. On the other hand, the rotation plate 462 is provided with the contact portion 455.

When the stapler moving unit 450 moves to the downstream side in the second direction γ2 along the first groove 431 and approaches the vicinity of the downstream end portion in the second direction γ2 of the first groove 431, the contact portion 455 abuts against the abutment member 413. When the stapler moving unit 450 further moves to the downstream side in the second direction γ2, the contact portion 455 and the abutment member 413 abut on each other, so that the rotation plate 462 rotates. At this time, the second roller 464 rotates about the first roller 463 along the guide hole 461*a* formed in the slide plate 461. As a result, the second roller 464 enters the fourth groove 434 formed along the direction inclined with respect to the second direction γ2 from the downstream end of the first groove 431 in the second direction γ2. As a result, the staple unit 400 held by the rotation plate 462 turns in a direction opposite to the rotation direction when the first roller 463 enters the second groove 432.

That is, when the second roller 464 is at a position where the second roller 464 can enter the fourth groove 434 from the first groove 431, the contact portion 455 provided on the rotation plate 462 abuts on the abutment member 413. Then, as the staple unit 400 moves from this position in the second direction, the staple unit 400 turns, and the second roller 464 enters the fourth groove 434.

On the downstream side of the fourth groove 434 in the second direction γ2, a positioning groove 434*a* is provided so as to be continuous with the fourth groove 434. The positioning groove 434*a* has the same depth as the fourth groove 434 and is formed in parallel with the first groove 431. On the downstream side of the first groove 431 in the second direction γ2, the fifth groove 435 is formed along the second direction γ2 from the downstream end in the second direction γ2 of the first groove 431.

As described above, when the second roller 464 enters the fourth groove 434 and the stapler moving unit 450 further moves to the downstream side in the second direction γ2, the first roller 463 positioned on the upstream side in the second direction γ2 with respect to the second roller 464 moves in the first groove 431. Then, as illustrated in FIG. 16B, the second roller 464 enters the positioning groove 434*a*, and the first roller 463 enters the fifth groove 435, respectively. Then, at this position, the staple unit 400 takes the second posture as illustrated in FIG. 16A for performing oblique binding on the R side as described above.

Similarly to the above-described switching groove 438, the positioning groove 434*a* stabilizes the posture of the staple unit 400. However, the staple unit 400 may take the second posture in a state where the second roller 464 is positioned in the fourth groove 434, and in this case, the positioning groove 434*a* may be omitted. Further, the fifth groove 435 is formed by extending the first groove 431 in order to move the second roller 464 to the positioning groove 434*a*, the fifth groove 435 may be omitted as long as the staple unit 400 can be brought into the second posture without moving the first roller 463 to the fifth groove 435.

Problem of Oblique Binding

Figure 17A:
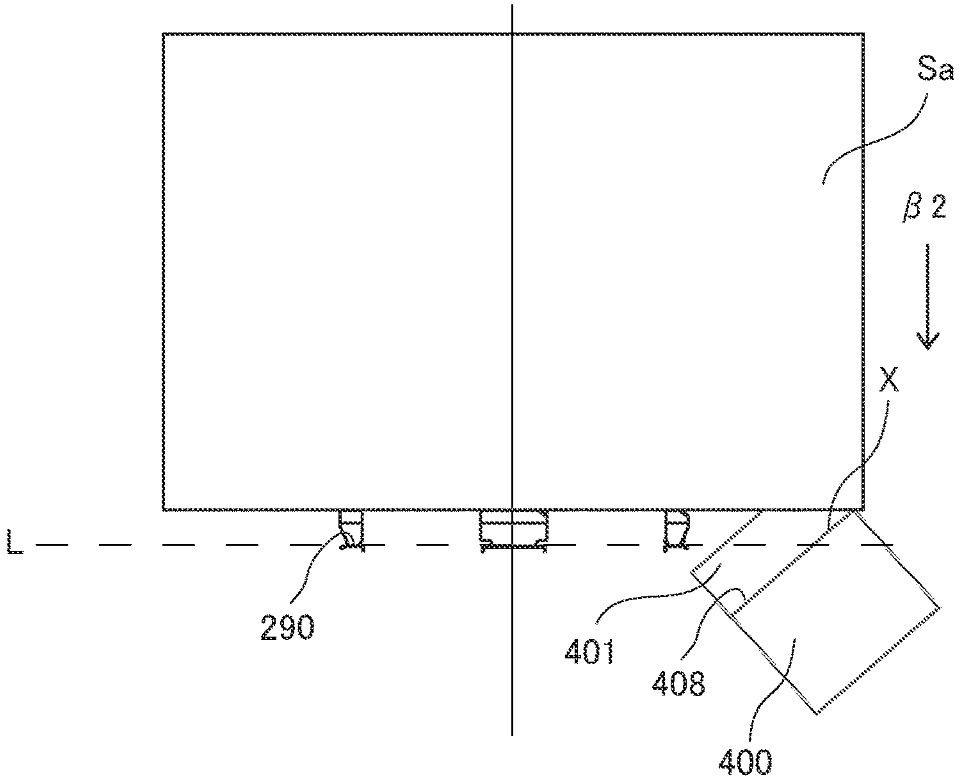
FIG. 17A is a plan view illustrating a main configuration around a processing tray according to a comparative example, and is a view illustrating a receiving state of a sheet having a large size.
Figure 17B:
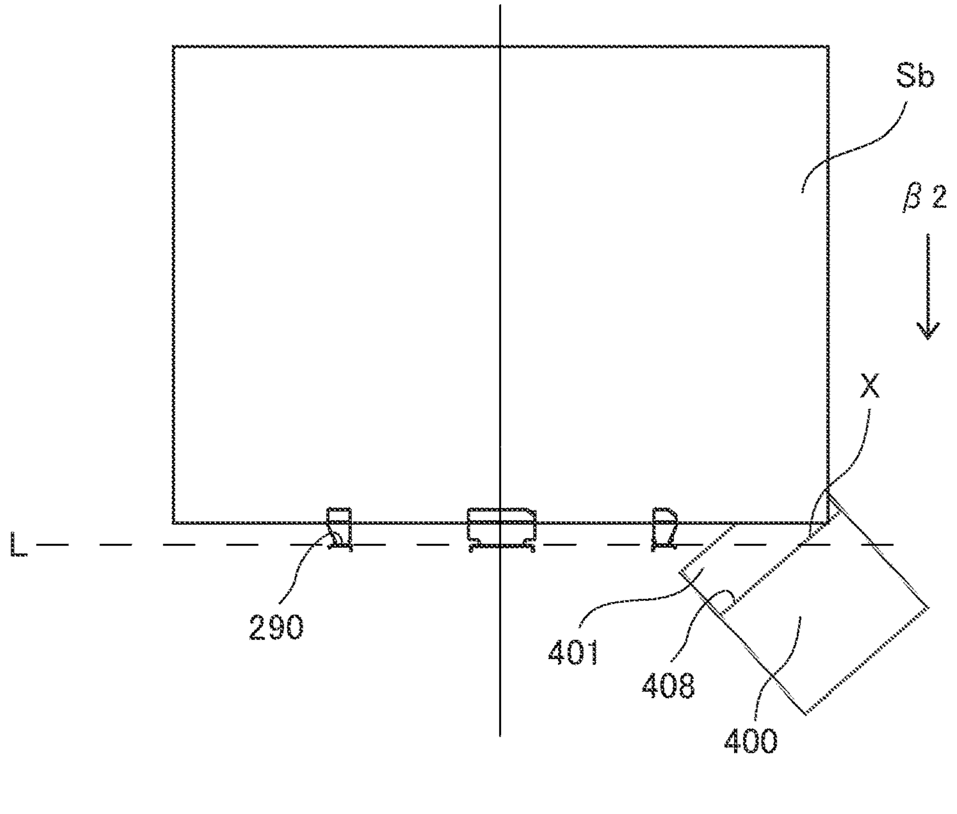
FIG. 17B is a plan view illustrating the main configuration around the processing tray according to the comparative example, and is a view illustrating a receiving state of a sheet having a small size.

Next, a problem in the operation of performing the oblique binding at the corner portion of the sheet bundle will be described with reference to FIGS. 17A and 17B. First, the comparative example of FIGS. 17A and 17B illustrates a state in which the oblique binding is performed on the corner portion on the R side of the downstream edge portion (trailing edge portion) of the sheet in the second conveyance direction β2. The comparative example shows a case where the staple unit 400 is moved to a position (oblique binding position) where the oblique binding on the R side is performed in advance before the sheet is conveyed to the processing tray 220 and conveyed in the second conveyance direction β2 toward the trailing edge regulation member 290.

In the present embodiment and the comparative example, a stapleless binding unit 400A is disposed on the R side from the oblique binding position. That is, in the present embodiment and the comparative example, in addition to the staple unit (first binding unit) 400 that performs the binding process on the sheets using the needles, the stapleless binding unit (second binding unit) 400A that performs the binding process on the sheets without using the needles is provided. The stapleless binding unit 400A is a device that binds paper without making a hole by entangling fibers of the sheet by crimping.

In the case of performing the oblique binding as described above, the staple unit 400 takes the second posture inclined with respect to the first posture when performing the side stitching at the corner portion of the sheet. At this time, in a case where the staple unit 400 takes the second posture before the sheet abuts on the trailing edge regulation member 290, as illustrated in FIGS. 17A and 17B, a part of the trailing edge portion of the sheet may come into contact with the staple unit 400. As described above, the staple unit 400 has the back side surface 408 on the downstream side in the second conveyance direction β2 of the insertion portion 401. When the staple unit 400 is in the first posture, the back side surface 408 is located on the downstream side in the second conveyance direction β2 with respect to a sheet abutting surface (a position of broken line L) of the trailing edge regulation member 290 against which the trailing edge of the sheet abuts when the binding process is performed. Therefore, when the staple unit 400 is in the first posture, the trailing edge portion of the sheet does not come into contact with the back side surface 408 even if the sheet is inserted into the insertion portion 401 to perform the binding process.

On the other hand, when the staple unit 400 is in the second posture, as illustrated in FIGS. 17A and 17B, a part of the back side surface 408 is located on the upstream side in the second conveyance direction β2 with respect to the sheet abutting surface (the position of the broken line L) of the trailing edge regulation member 290. Here, in a case where the size of the sheet processing apparatus 200A in the width direction is reduced in order to downsize the apparatus, the amount by which the staple unit 400 can be moved in the width direction in order to take the second posture is limited. Therefore, for example, as illustrated in FIG. 17A, when a sheet Sa having a large size is conveyed to the downstream side in the second conveyance direction β2, there is a possibility that a trailing edge portion of the sheet Sa comes into contact with a corner portion 408*d* of the back side surface 408. In addition, as illustrated in FIG. 17B, when a sheet Sb having a size smaller than that of the sheet Sa is conveyed to the downstream side in the second conveyance direction β2, there is a possibility that a trailing edge portion of the sheet Sb comes into contact with a partial surface of the back side surface 408.

If a part of the sheet comes into contact with the staple unit 400 in this way, there is a possibility that oblique binding to the corner portion of the sheet cannot be performed or the sheet is bent. Therefore, in order to prevent interference between the staple unit 400 and the sheet at the time of performing oblique binding, it is required to move the staple unit 400 to a position not interfering with the sheet. In consideration of the above, it is difficult to downsize the device.

In particular, when the stapleless binding unit 400A is disposed on the R side with respect to the oblique binding position on the R side as described above, the range in which the staple unit 400 can move in the width direction is limited, and the above-described problem is likely to occur. In addition, even if such a stapleless binding unit 400A is not provided, a similar problem may occur because the moving range of the staple unit 400 in the width direction is narrowed due to the demand for downsizing of the device in recent years. In the present embodiment, in order to solve such a problem, the following control is performed.

Control of Oblique Binding of Embodiment

With reference to FIGS. 18 to 25, a description will be given of control when the oblique binding is performed at the corner portion of the sheet in the present embodiment. In the present embodiment, when the staple unit 400 performs the binding process at the corner portion on the first end side in the width direction of the sheet in the second posture, the staple unit 400 is set to the second posture on the first end side in the width direction of the sheet after the sheet is shifted to the second end side in the width direction as follows.

That is, after an abutment operation and the shift operation are performed on the sheet conveyed to the processing tray 220, the movable turning unit 470 turns the staple unit 400 from the first posture to the second posture, and the staple unit 400 in the second posture performs the binding process, that is, the oblique binding. Here, the abutment operation is an operation of conveying the sheet on the processing tray 220 in the second conveyance direction β2 by the reversing paddle 240A and abutting a downstream end edge (trailing edge) of the sheet in the second conveyance direction β2 against the trailing edge regulation member 290. Further, the shift operation is an operation of moving the sheet by the alignment unit 270A in the width direction with respect to a position where the sheet is conveyed to the processing tray 220 by the pre-processing rollers 211A and 212A. In the present embodiment, the sheet is shifted to the side opposite to the side where the oblique binding of the sheet is performed in the width direction. That is, when the oblique binding is performed at the corner portion on the first end side of the sheet in the width direction, the sheet is moved to the second end side in the width direction.

The shift amount of the sheet at this time is an amount that satisfies the following conditions. That is, with respect to the position of the sheet conveyed to the processing tray 220, the sheet is moved to the second end side in the width direction by the alignment unit 270A and to a position where the sheet does not contact the back side surface 408 when the staple unit 400 takes the second posture. Specifically, in the back side surface 408 of the staple unit 400 in the second posture, a portion located on the upstream side in the second conveyance direction β2 with respect to the sheet abutting surface of the trailing edge regulation member 290 (a portion above the position of the broken line L in FIGS. 17A and 17B) is referred to as a "portion X". In this case, in the shift operation, the sheet is shifted until the corner portion on the first end side in the width direction of the sheet is positioned closer to the second end side in the width direction than the portion X.

The reason why the sheet can be shifted to such a position is that the sheet processing apparatus 200A of the present embodiment can perform a shift discharge process of shifting and discharging the sheet in the first place. In the present embodiment, a sheet alignment is performed based on the center in which a center position in the width direction of the sheet coincides with a center position in the width direction of the processing tray 220. In the present embodiment, the sheet can be shifted by a predetermined amount (for example, 15 mm) from the center reference position to the first end side and the second end side in the width direction and discharged. Therefore, by performing the shift operation within this predetermined amount range, it is possible to shift the sheet in order to perform the oblique binding on the sheet as described above without increasing the size of the apparatus.

In addition, either the abutment operation or the shift operation may be performed first, but in the present embodiment, the abutment operation is performed first. That is, when the staple unit 400 performs the binding process on the corner portions of the sheet in the width direction in the second posture, the shift operation is performed after the abutment operation is performed.

In the case of performing side stitching, such a shift operation is not performed. That is, when the staple unit 400 performs the binding process on the downstream edge portion of the sheet in the second conveyance direction β2 in the first posture, the staple unit 400 in the first posture performs the binding process on the sheet in which the downstream edge portion of the sheet in the second conveyance direction β2 abuts on the trailing edge regulation member 290 by the abutment operation without performing the shift operation described above. However, even when the side stitching is performed, the sheet alignment operation by the alignment unit 270A is performed.

Hereinafter, the control content of the present embodiment will be specifically described by exemplifying a case where oblique binding is performed at the corner portion on the R side of the sheet bundle obtained by bundling the two sheets. Note that, in the following, a case where oblique binding is performed at the corner portion on the R side as the corner portion on the first end side in the width direction of the trailing edge portion of the sheet will be described. However, in a case where oblique binding is performed at the corner portion on the F side, the operation is similar to that in a case where oblique binding is performed at the corner portion on the R side, and only the direction of moving the sheet by the shift operation is reversed.

Figure 18:
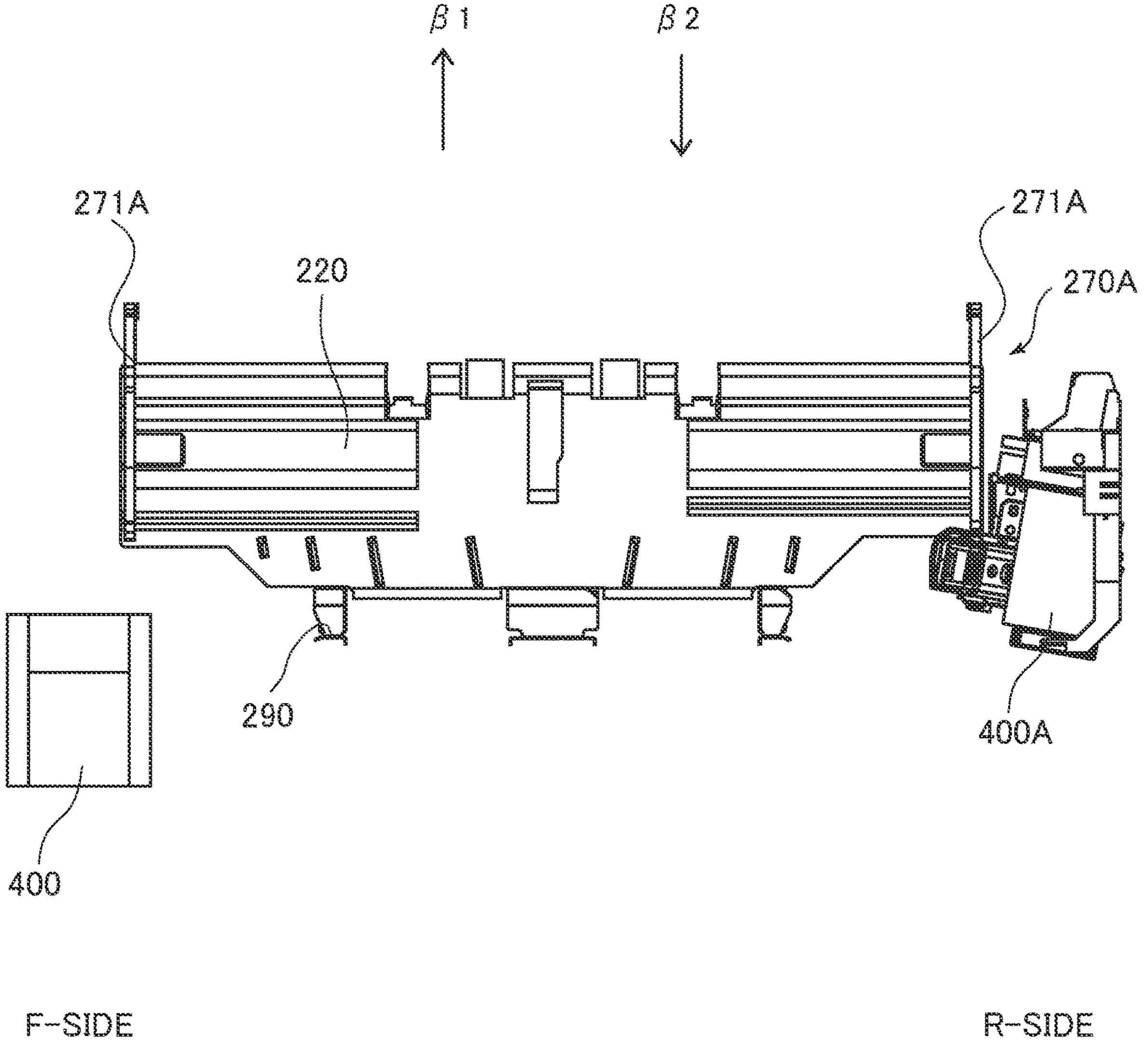
FIG. 18 is a plan view illustrating the main configuration around the processing tray according to the embodiment, and is a view illustrating a state in which the staple unit is at a home position.
Figure 19:
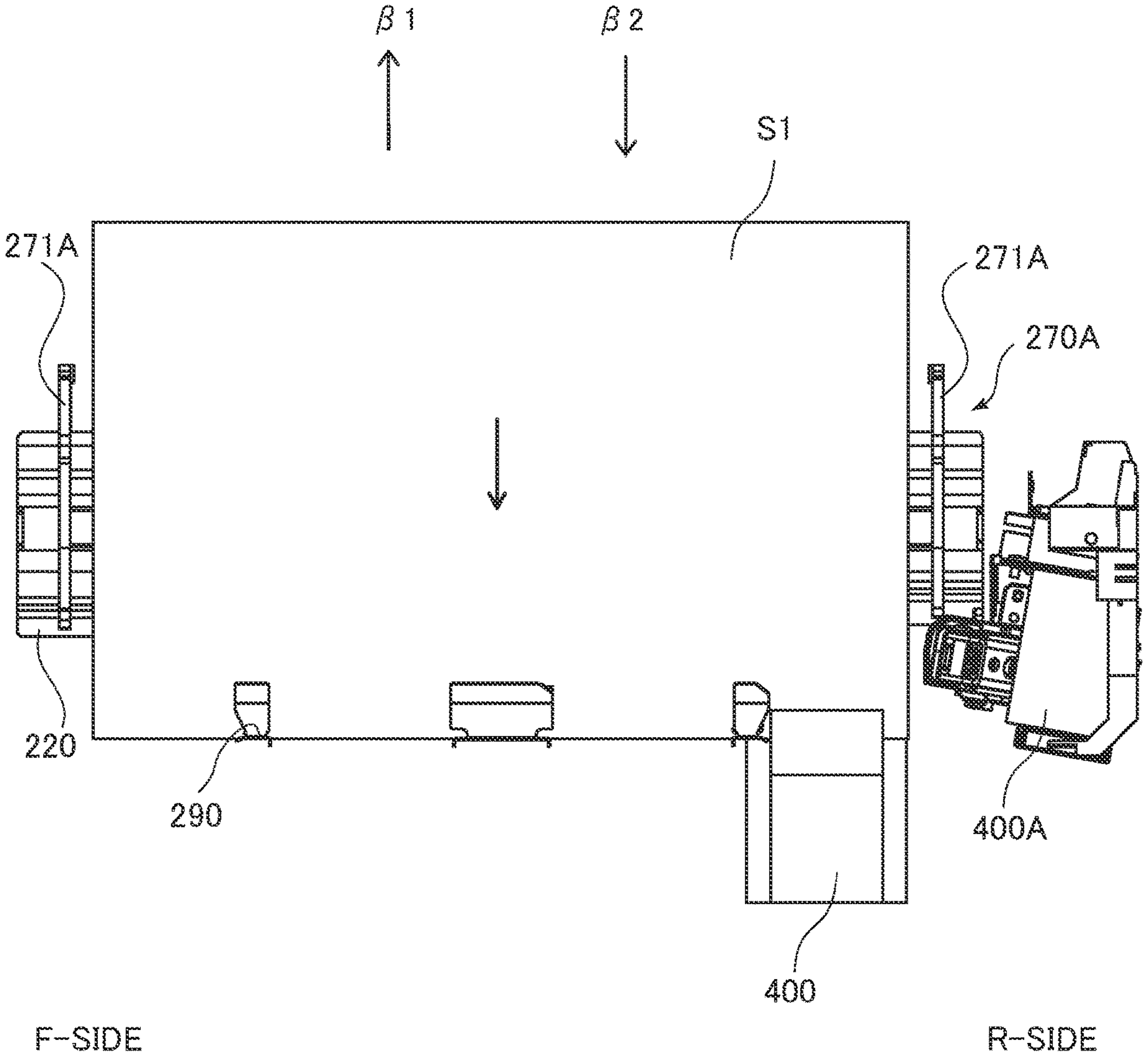
FIG. 19 is a plan view illustrating the main configuration around the processing tray according to the embodiment, and is a view illustrating a state at the time of receiving a first sheet.

FIG. 18 illustrates a state in which the staple unit 400 is in a home position. Next, as illustrated in FIG. 19, a first sheet S1 is received in the processing tray 220, conveyed in the second conveyance direction β2 by the reversing paddle 240A, and the sheet S1 abuts on the trailing edge regulation member 290. In the present embodiment, at this time, the staple unit 400 is moved from the home position to just before the position where the oblique binding is performed at the corner portion on the R side. Specifically, the second roller 464 of the stapler moving unit 450 is moved until it is positioned at the entrance of the fourth groove 434 of the cam groove 430, in other words, until the contact portion 455 abuts the abutment member 413. At this point, the staple unit 400 remains in the first posture.

Figure 20:
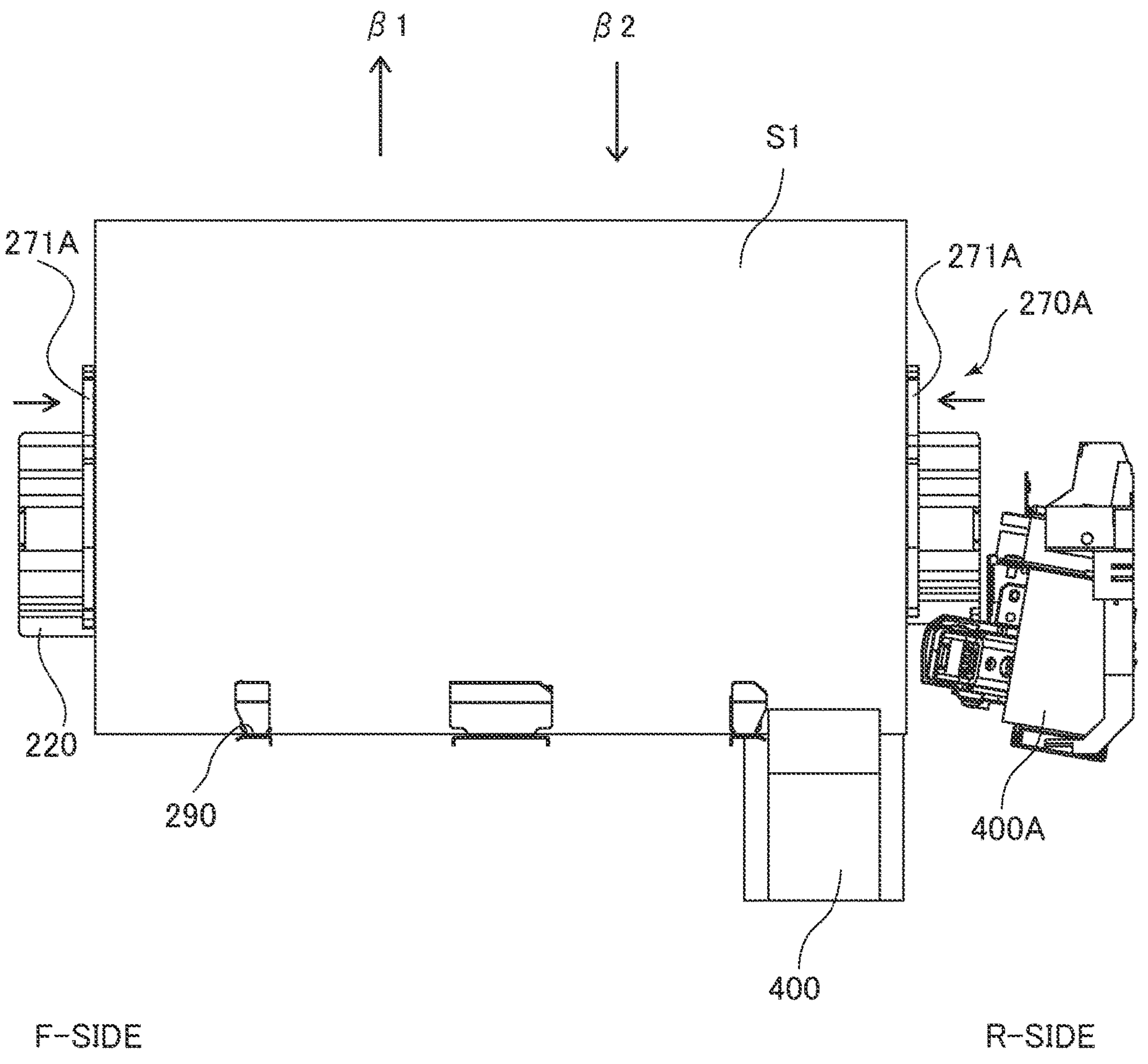
FIG. 20 is a plan view illustrating the main configuration around the processing tray according to the embodiment, and is a view illustrating a state at the time of alignment of the first sheet.
Figure 21:
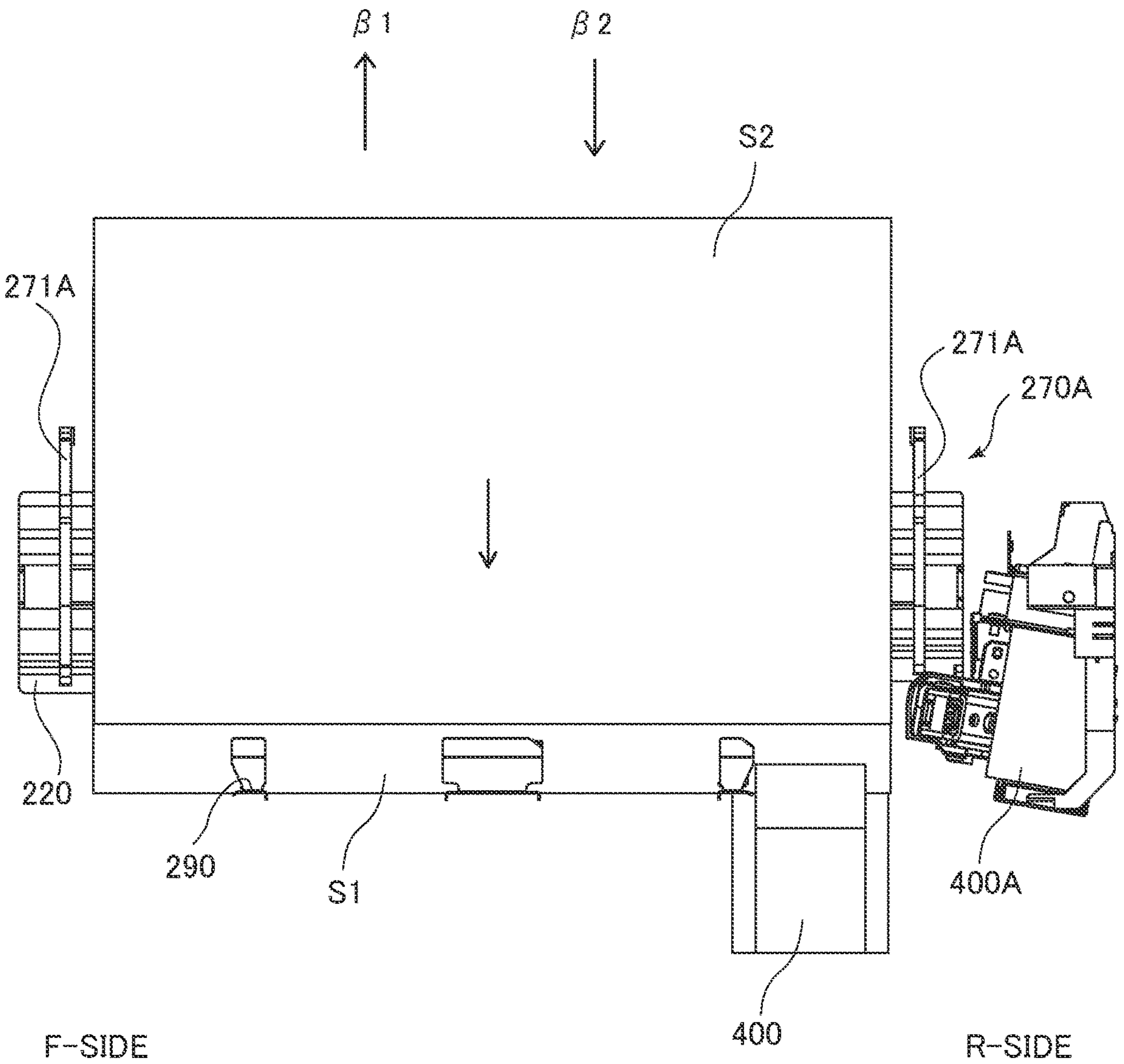
FIG. 21 is a plan view illustrating the main configuration around the processing tray according to the embodiment, and is a view illustrating a state at the time of receiving a second sheet.
Figure 22:
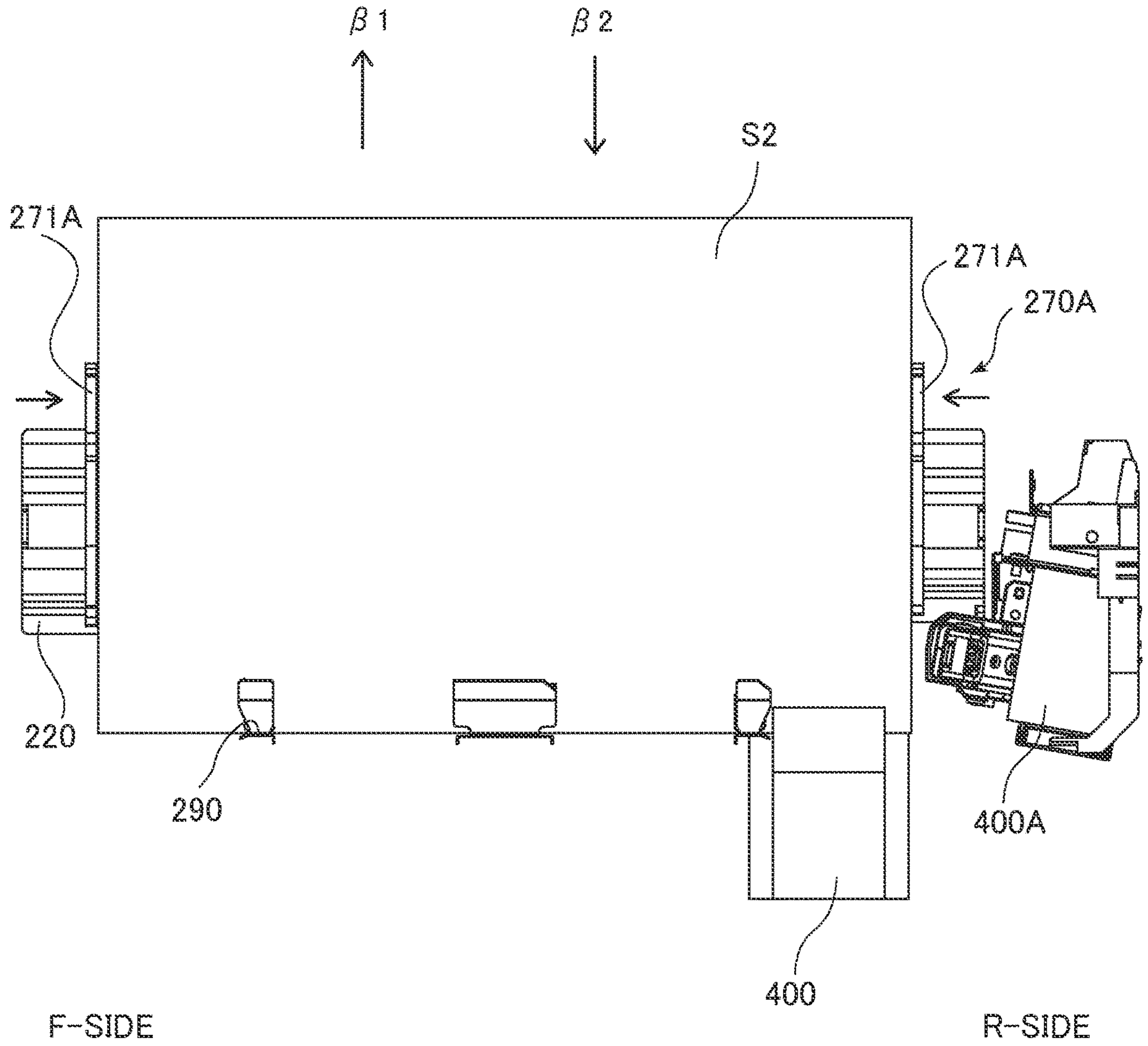
FIG. 22 is a plan view illustrating the main configuration around the processing tray according to the embodiment, and is a view illustrating a state at the time of alignment of the second sheet.

Next, as illustrated in FIG. 20, the pair of aligning plates 271A of the alignment unit 270A is brought into contact with both end edges of the sheet S in the width direction to align the first sheet S1. Next, as illustrated in FIG. 21, the pair of aligning plates 271A is separated from the sheet, and a second sheet S2 is received in the processing tray 220. Then, the second sheet S2 is conveyed in the second conveyance direction β2 by the reversing paddle 240A and the sheet S2 is abutted against the trailing edge regulation member 290, and alignment of the second sheet S2 is performed by the pair of aligning plates 271A as illustrated in FIG. 22.

Figure 23:
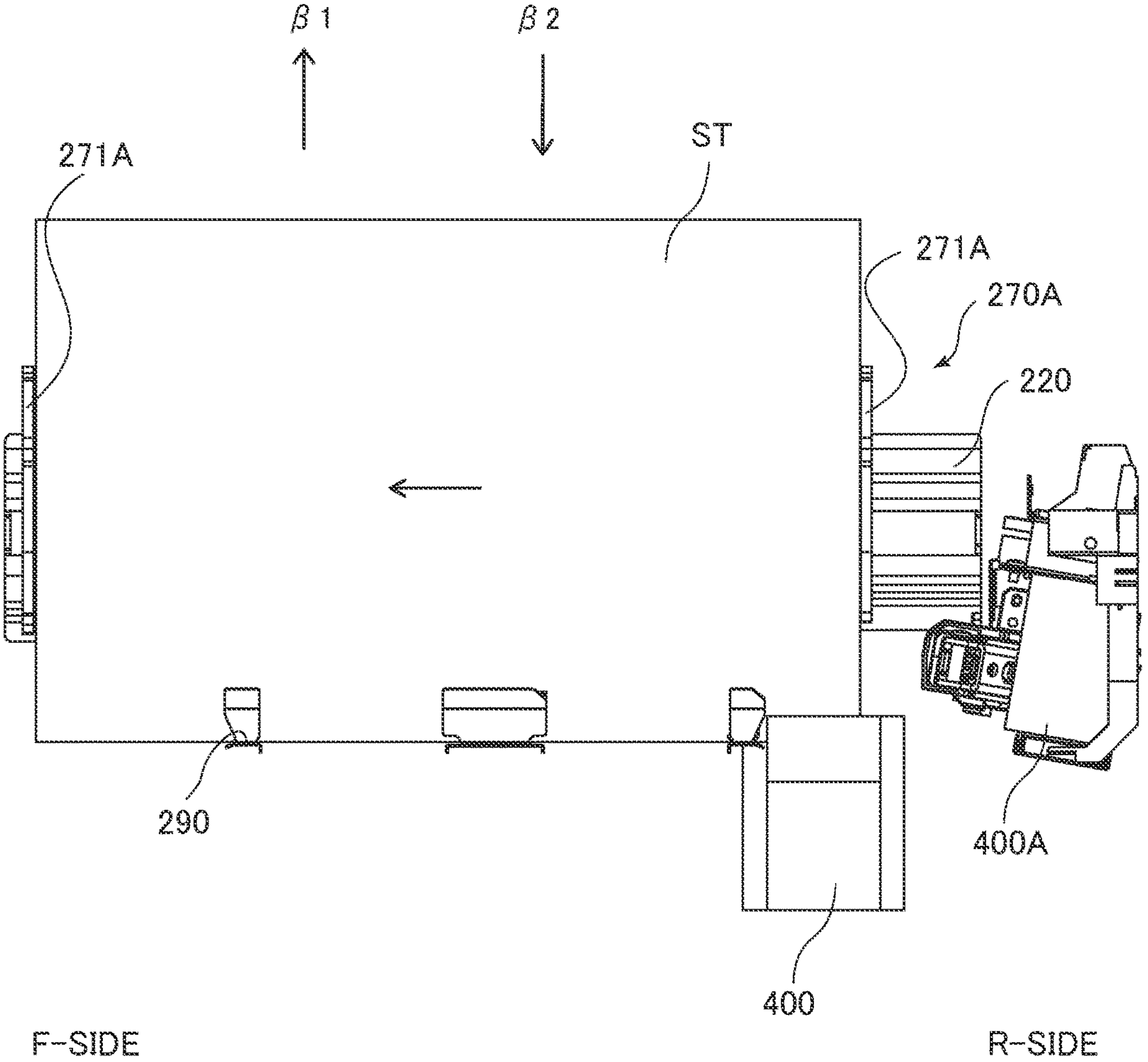
FIG. 23 is a plan view illustrating the main configuration around the processing tray according to the embodiment, and is a view illustrating a state at the time of shifting a sheet bundle.

When the alignment of a final sheet of a sheet bundle ST to be formed, that is, the second sheet S2 in the present embodiment is completed, as illustrated in FIG. 23, the sheet bundle ST is nipped by the pair of aligning plates 271A and moved to the F side in the width direction. That is, the shift operation of moving the sheet bundle ST to the F side opposite to the R side where the oblique binding is performed is performed by the pair of aligning plates 271A.

Figure 24:
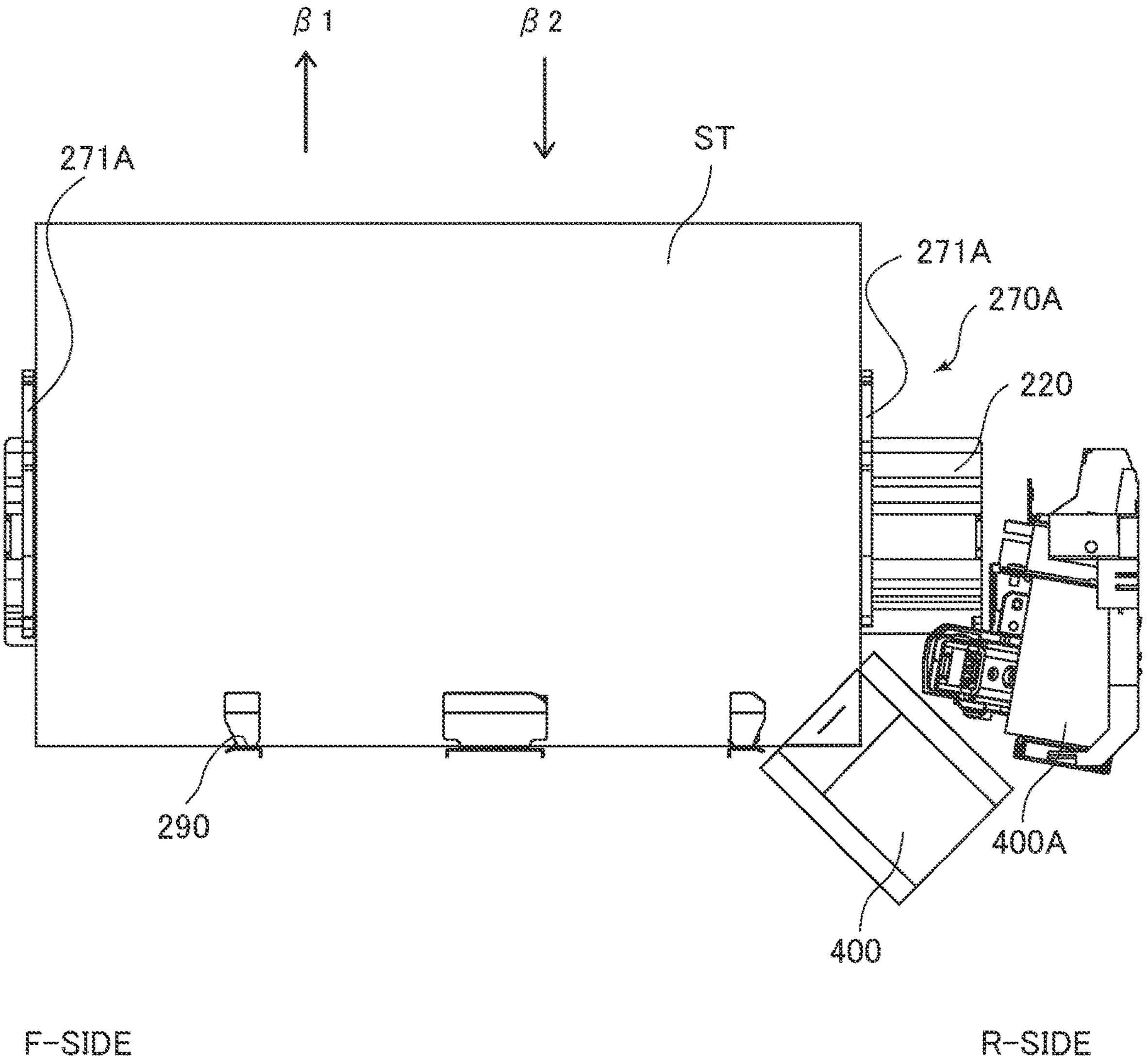
FIG. 24 is a plan view illustrating the main configuration around the processing tray according to an embodiment, and is a view illustrating a state in which oblique binding is performed on a corner portion of the sheet bundle.
Figure 25:
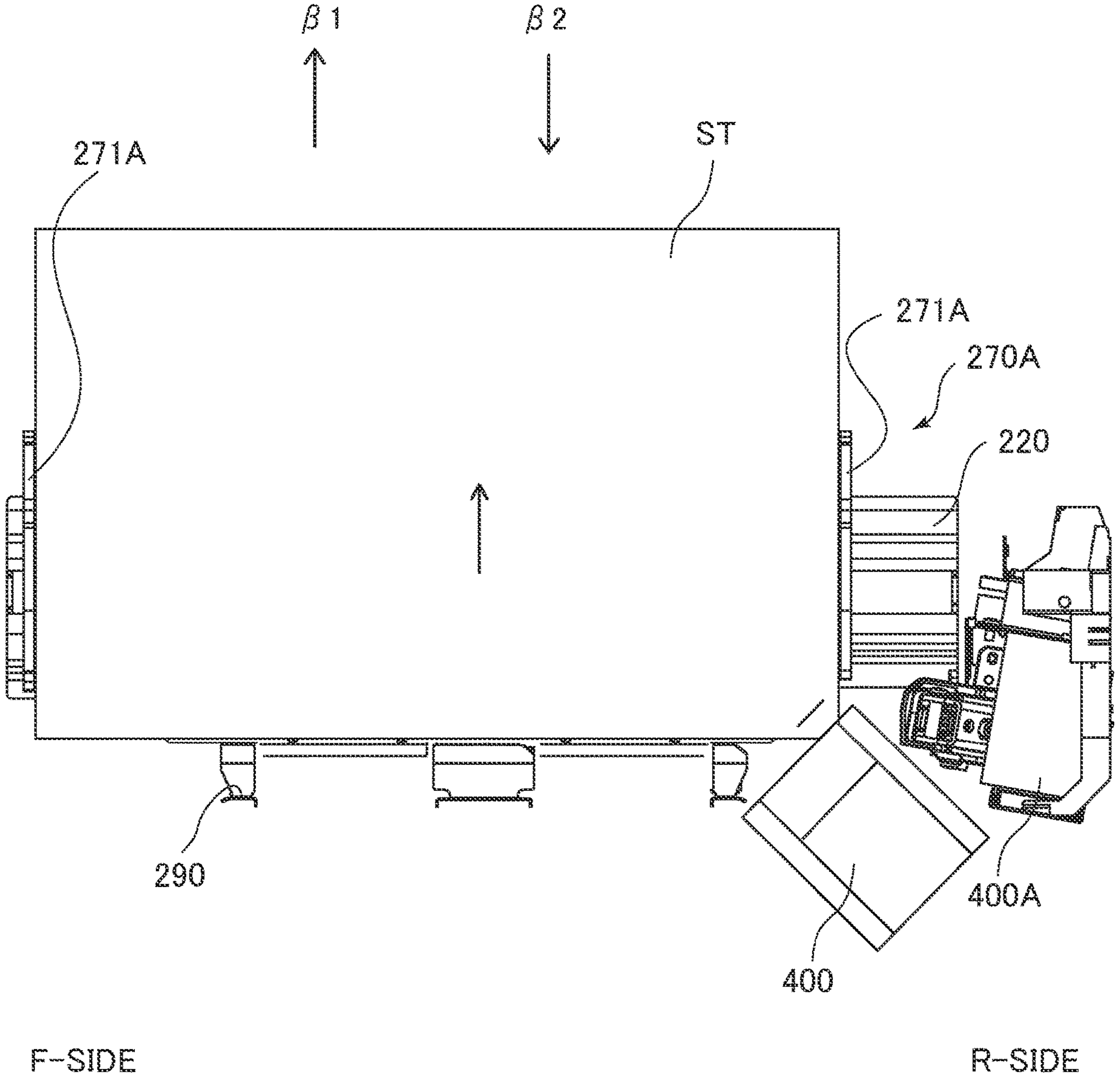
FIG. 25 is a plan view illustrating the main configuration around the processing tray according to the embodiment, and is a view illustrating a state when the sheet bundle is discharged.

After the sheet bundle ST is moved to the F side in the width direction, as illustrated in FIG. 24, the staple unit 400 is turned from the first posture to the second posture at a position where the oblique binding is performed at the corner portion on the R side of the trailing edge portion of the sheet bundle ST. In the present embodiment, as described above, the position when the sheet bundle ST is shifted to the F side is the position where the oblique binding is performed with respect to the corner portion on the R side. Therefore, after the shift operation is performed, the position of the sheet bundle ST in the width direction is maintained, and the staple unit 400 is set to the second posture. Then, the binding process is performed at this position. That is, the oblique binding is performed at the corner portion on the R side of the trailing edge portion of the sheet bundle ST. Thereafter, as illustrated in FIG. 25, the sheet bundle ST subjected to the oblique binding is discharged to the stacking tray 300 by the upper discharge roller 230A and the lower discharge roller 230B.

In the above description, after the shift operation is performed on the sheet bundle ST, the staple unit 400 is set to the second posture at that position, and the oblique binding is performed. However, depending on the position of the sheet bundle after the shift operation and the position where the staple unit 400 performs the oblique binding, the staple unit 400 may be brought into the second posture, and then the sheet bundle may be further moved in the width direction. For example, after the shift operation is performed on the sheet bundle ST, the staple unit 400 is turned from the first posture to the second posture. Thereafter, the sheet bundle is moved in the direction opposite to the direction in which the shift operation is performed, and then the binding process is performed by the staple unit 400. In any case, the shift operation may be performed on the sheet before the staple unit 400 is turned from the first posture to the second posture.

As described above, in the present embodiment, when the oblique binding is performed on the corner portion of the sheet, the staple unit 400 is turned from the first posture to the second posture after the sheet is shifted in the direction opposite to the position where the oblique binding is performed. Therefore, even if an amount of movement of the staple unit 400 to the oblique binding position is not increased, interference between the staple unit 400 and the sheet can be prevented when the oblique binding is performed. As a result, the apparatus can be made compact.

Another Example of Embodiment

Next, another example of the present embodiment will be described with reference to FIGS. 26 to 35. In the above example, the case where the shift operation is performed on the sheet before the staple unit 400 is turned to the second posture has been described. However, as described below, the shift operation may be performed on the sheet after the staple unit 400 is turned to the second posture.

That is, after the movable turning unit 470 turns the staple unit 400 from the first posture to the second posture, the shift operation is performed on the sheet conveyed to the downstream side in the first conveyance direction β1 by the pre-processing rollers 211A and 212A without performing the operation of conveying the sheet in the second conveyance direction β2 by the reversing paddle 240A. Thereafter, an abutment operation of conveying the sheet in the second conveyance direction β2 by the reversing paddle 240A and abutting the trailing edge of the sheet against the trailing edge regulation member 290 is performed, and then the binding process is performed by the staple unit 400 in the second posture.

Hereinafter, the control content according to another example of the present embodiment will be specifically described by exemplifying a case where oblique binding is performed at the corner portion on the R side of the sheet bundle obtained by bundling two sheets. Note that, in the following, a case where oblique binding is performed at the corner portion on the R side as the corner portion on the first end side in the width direction of the trailing edge portion of the sheet will be described. However, in a case where oblique binding is performed at the corner portion on the F side, the operation is similar to that in a case where oblique binding is performed at the corner portion on the R side, and only the direction of moving the sheet by the shift operation is reversed.

Figure 26:
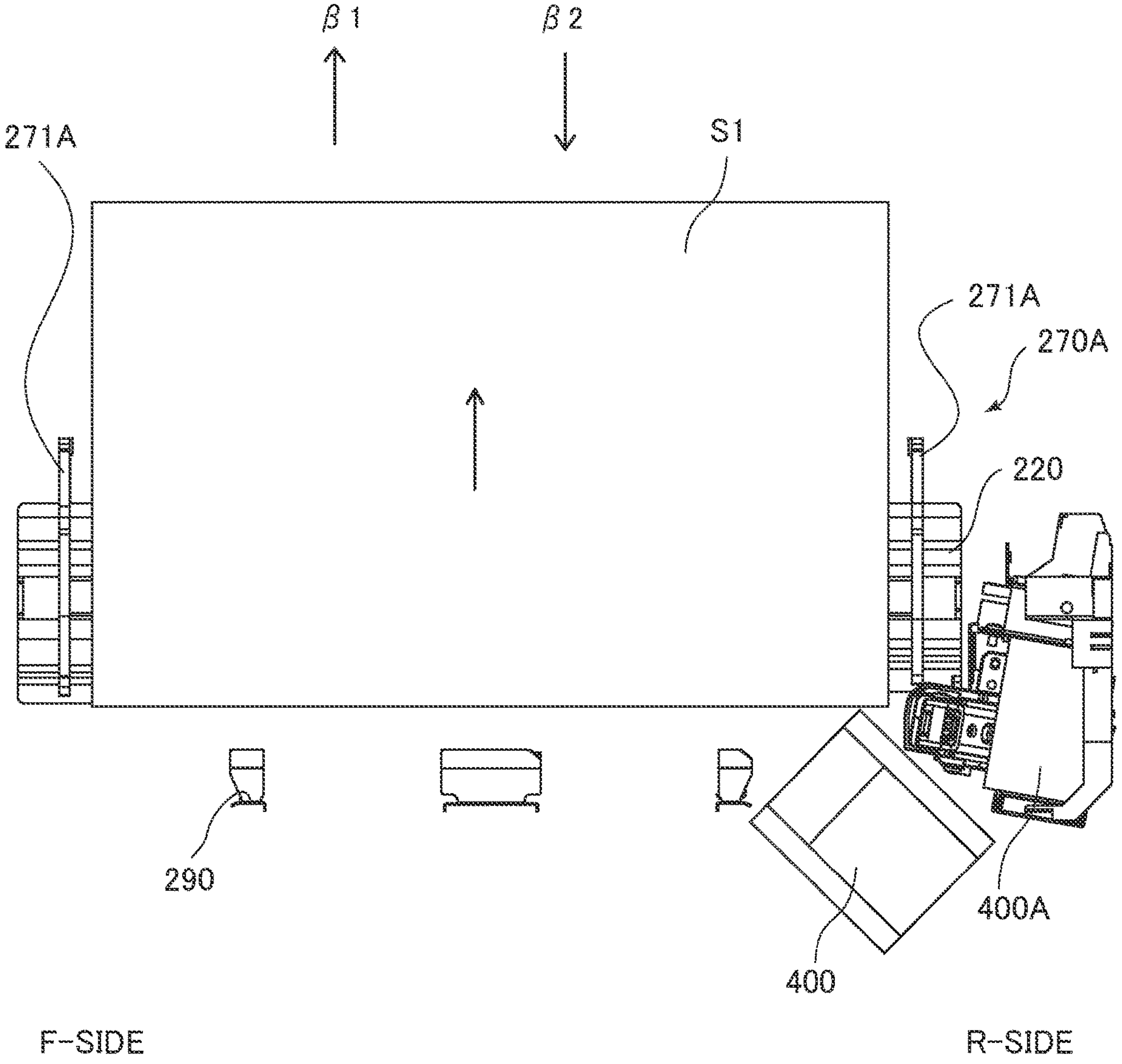
FIG. 26 is a plan view illustrating a main configuration around a processing tray according to another example of the embodiment, and is a view illustrating a state at the time of receiving the first sheet.

As illustrated in FIG. 26, when the first sheet S1 is received in the processing tray 220, the staple unit 400 is turned from the first posture to the second posture on the R side in the width direction. The timing of rotating the staple unit 400 may be before or during the conveyance of the sheet S1 to the processing tray 220. Further, the state illustrated in FIG. 26 is, for example, a state in which the sheet is dropped on the processing tray 220 by the trailing edge dropping member 250A, and the sheet is not conveyed in the second conveyance direction β2 by the reversing paddle 240A.

Figure 27:
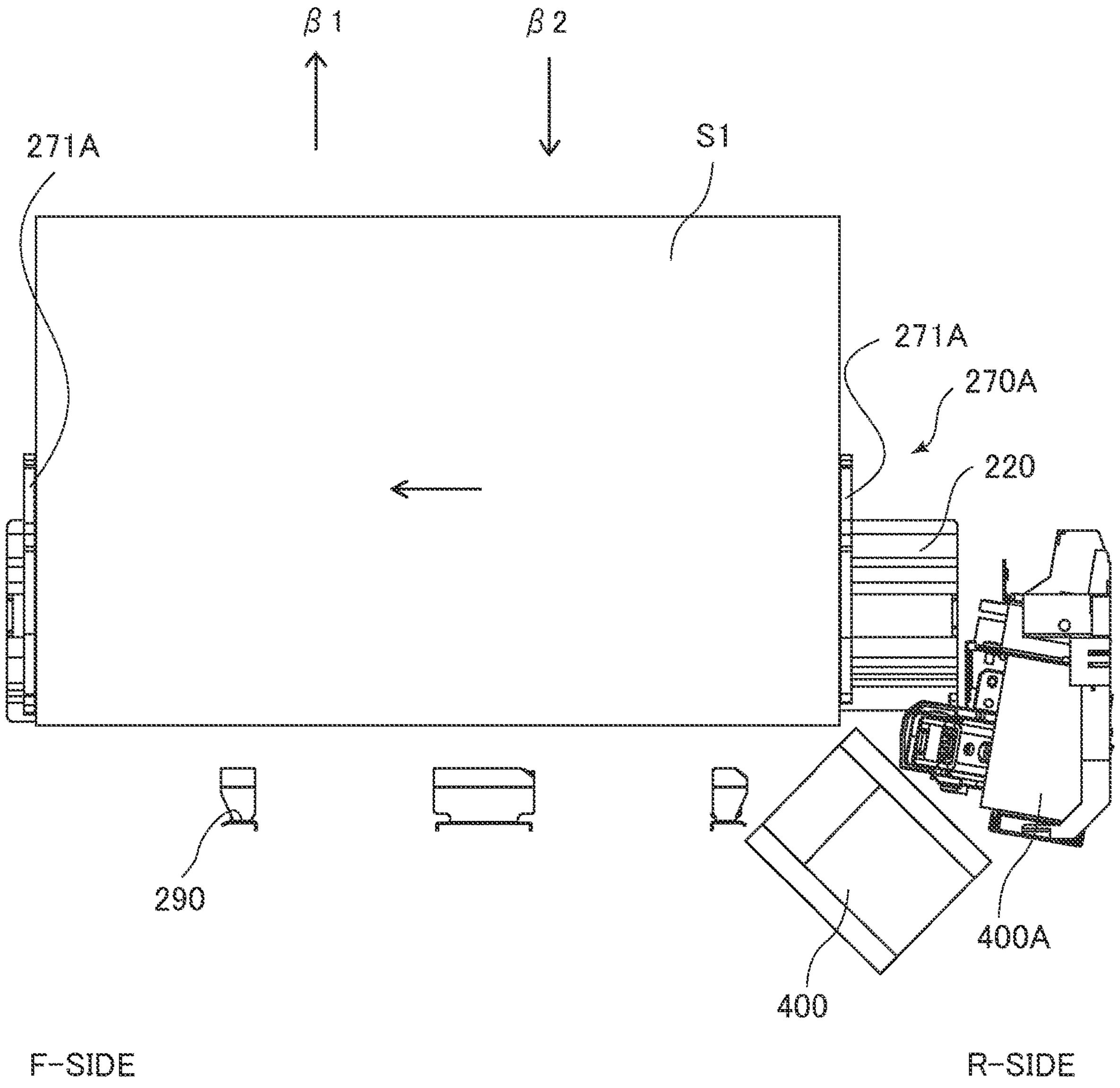
FIG. 27 is a plan view illustrating the main configuration around the processing tray according to another example of the embodiment, and is a view illustrating a state when the first sheet is shifted.

Next, as illustrated in FIG. 27, the first sheet S1 is moved to the F side in the width direction by the pair of aligning plates 271A. In this state, the trailing edge portion of the sheet S1 does not abut against the trailing edge regulation member 290. In the present embodiment, as described above, the aligning plate 271A includes the first plate 2701 on the downstream side in the first conveyance direction and the second plate 2702 formed to be continuous with the first plate 2701 on the upstream side in the first conveyance direction (see FIG. 2). Therefore, since the aligning plate 271A abuts on the sheet on the processing tray 220 in a wide range in the first conveyance direction β1, the shift operation can be stably performed even if the trailing edge portion of the sheet does not abut on the trailing edge regulation member 290.

Figure 28:
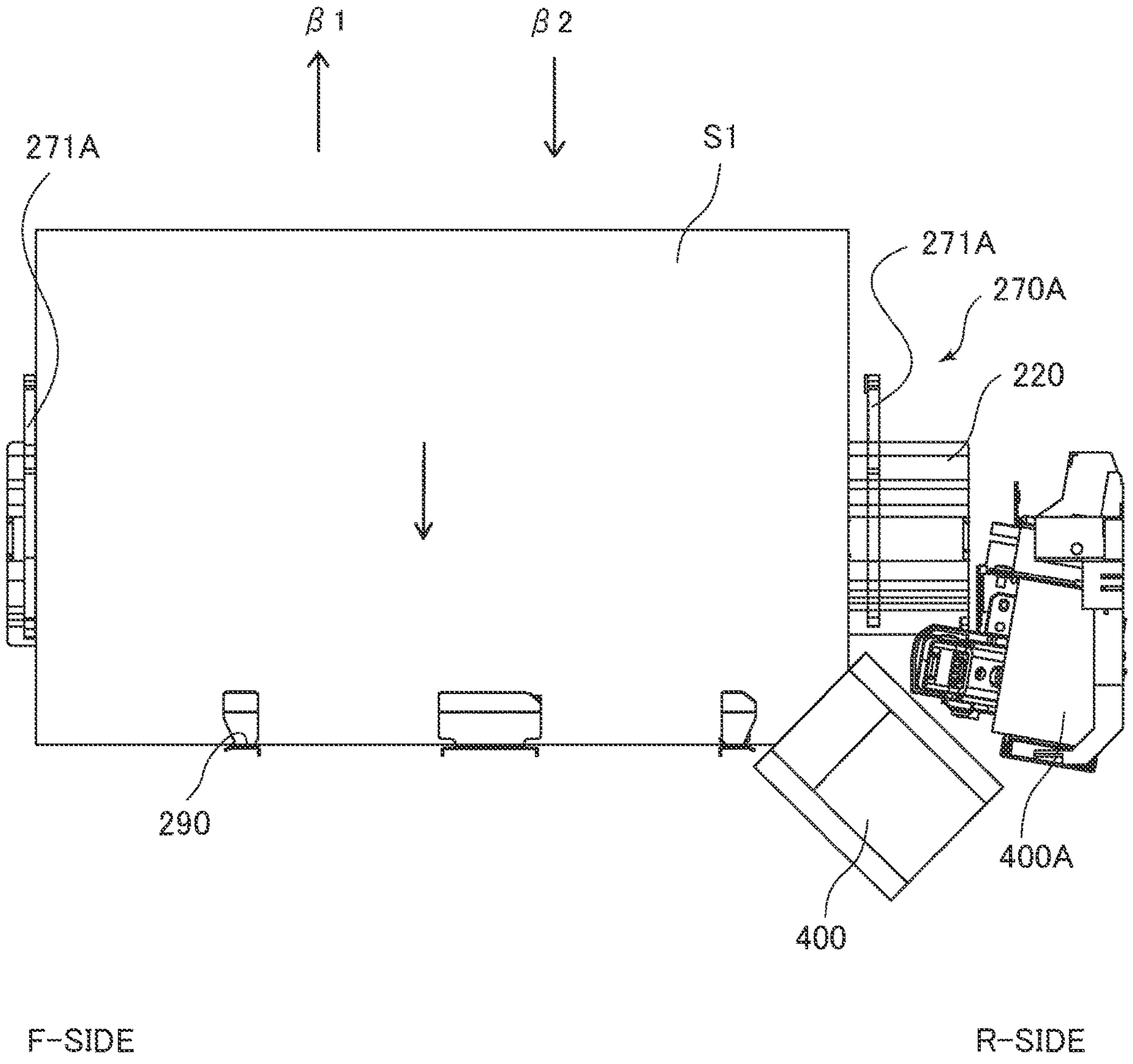
FIG. 28 is a plan view illustrating the main configuration around the processing tray according to another example of the embodiment, and is a view illustrating a state in which the first sheet abuts a trailing edge regulation member.
Figure 29:
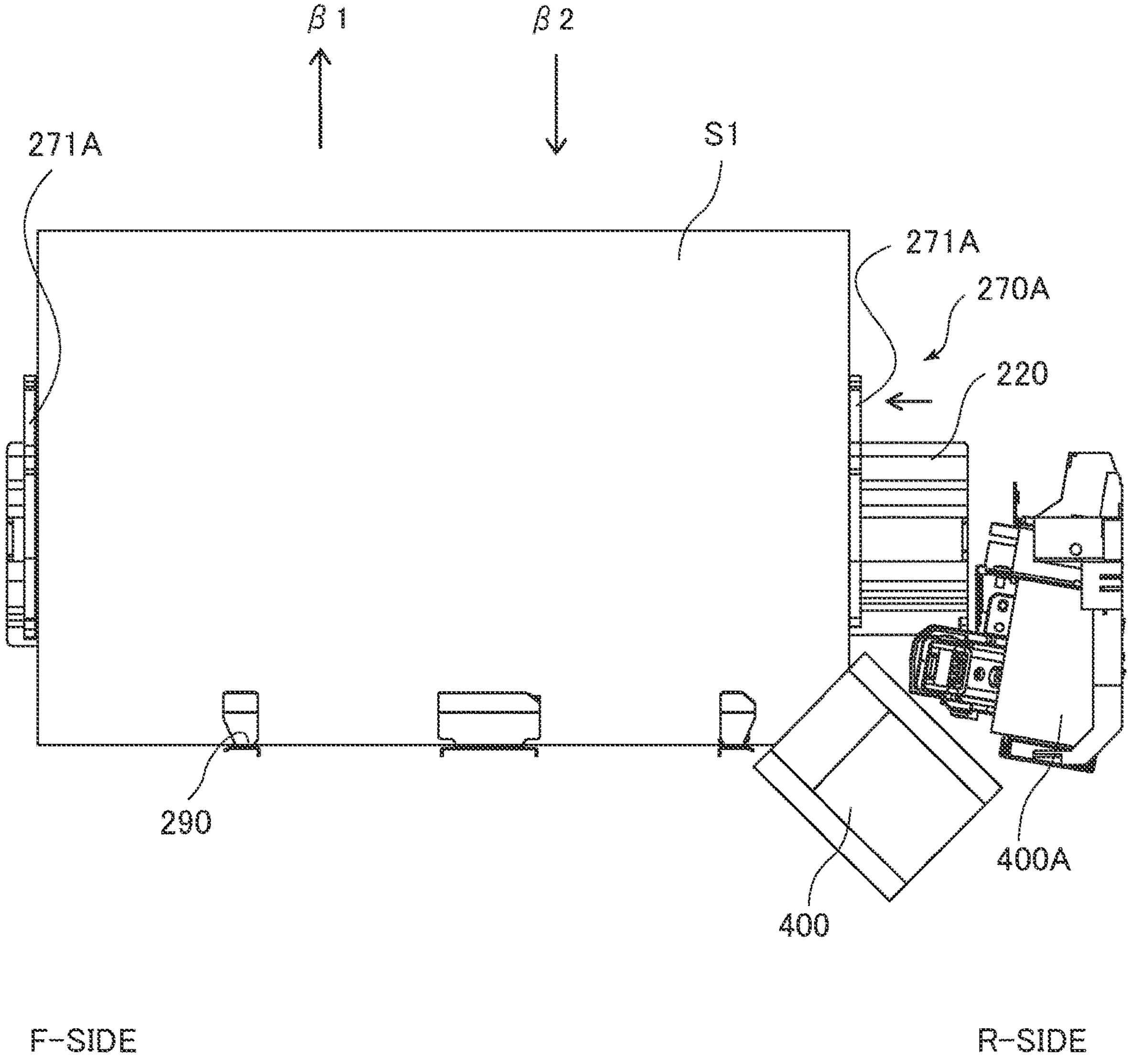
FIG. 29 is a plan view illustrating the main configuration around the processing tray according to another example of the embodiment, and is a view illustrating a state at the time of alignment of the first sheet.

When the sheet S1 is shifted to the F side, as illustrated in FIG. 28, the sheet S1 is conveyed in the second conveyance direction β2 by the reversing paddle 240A to abut against the trailing edge regulation member 290. At this time, the R-side aligning plate 271A is separated from the sheet S1. Next, as illustrated in FIG. 29, the R-side aligning plate 271A is brought into contact with the sheet S1, and the sheet S1 is nipped by the pair of aligning plates 271A. Accordingly, alignment with respect to the first sheet S1 is performed.

Figure 30:
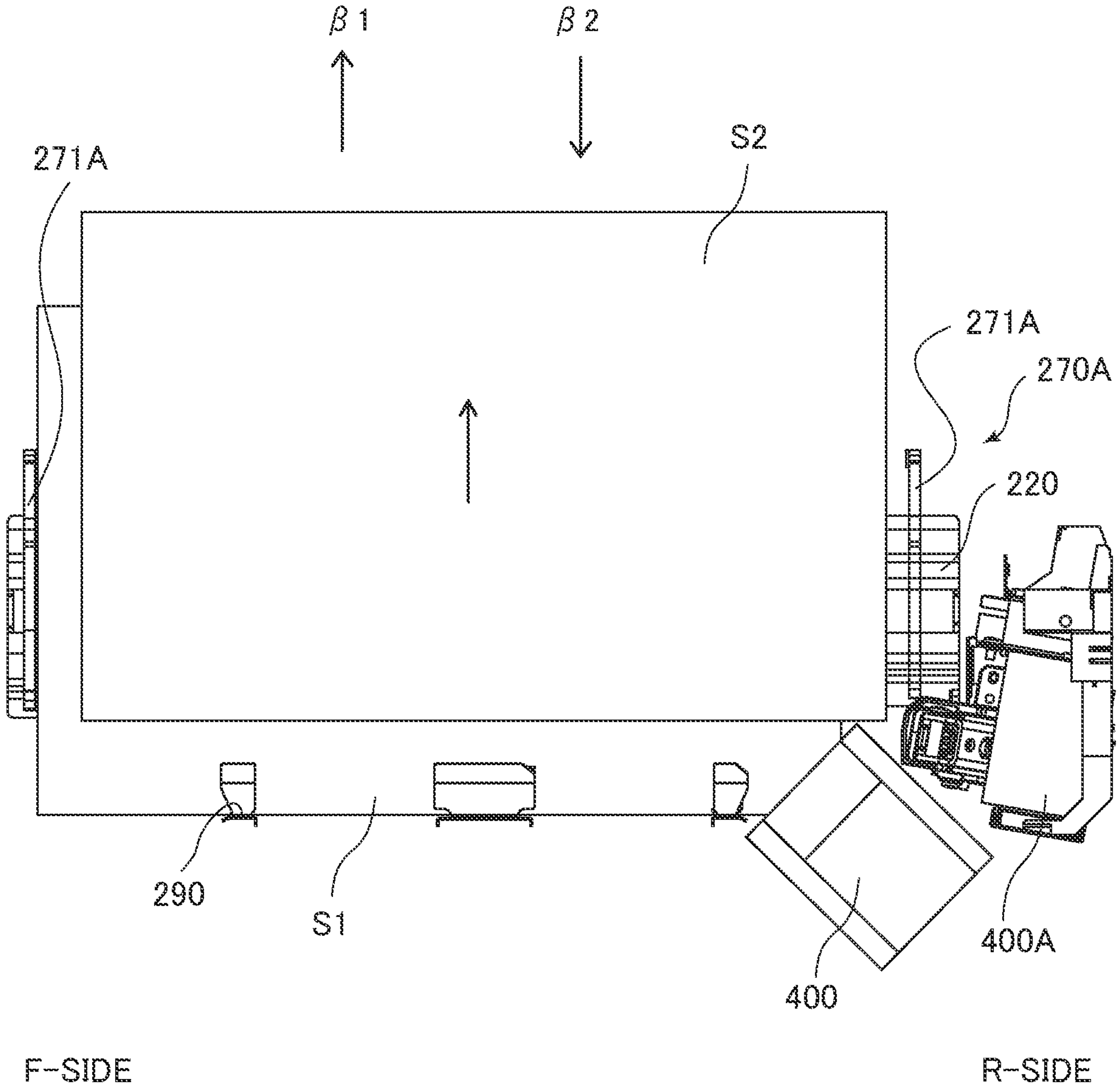
FIG. 30 is a plan view illustrating the main configuration around the processing tray according to another example of the embodiment, and is a view illustrating a state at the time of receiving the second sheet.

Next, as illustrated in FIG. 30, the second sheet S2 is conveyed to the processing tray 220 in a state where the R-side aligning plate 271A is separated from the sheet S1. Also in the state of FIG. 30, the sheet is dropped on the processing tray 220 by the trailing edge dropping member 250A, and the sheet is not conveyed in the second conveyance direction β2 by the reversing paddle 240A.

Figure 31:
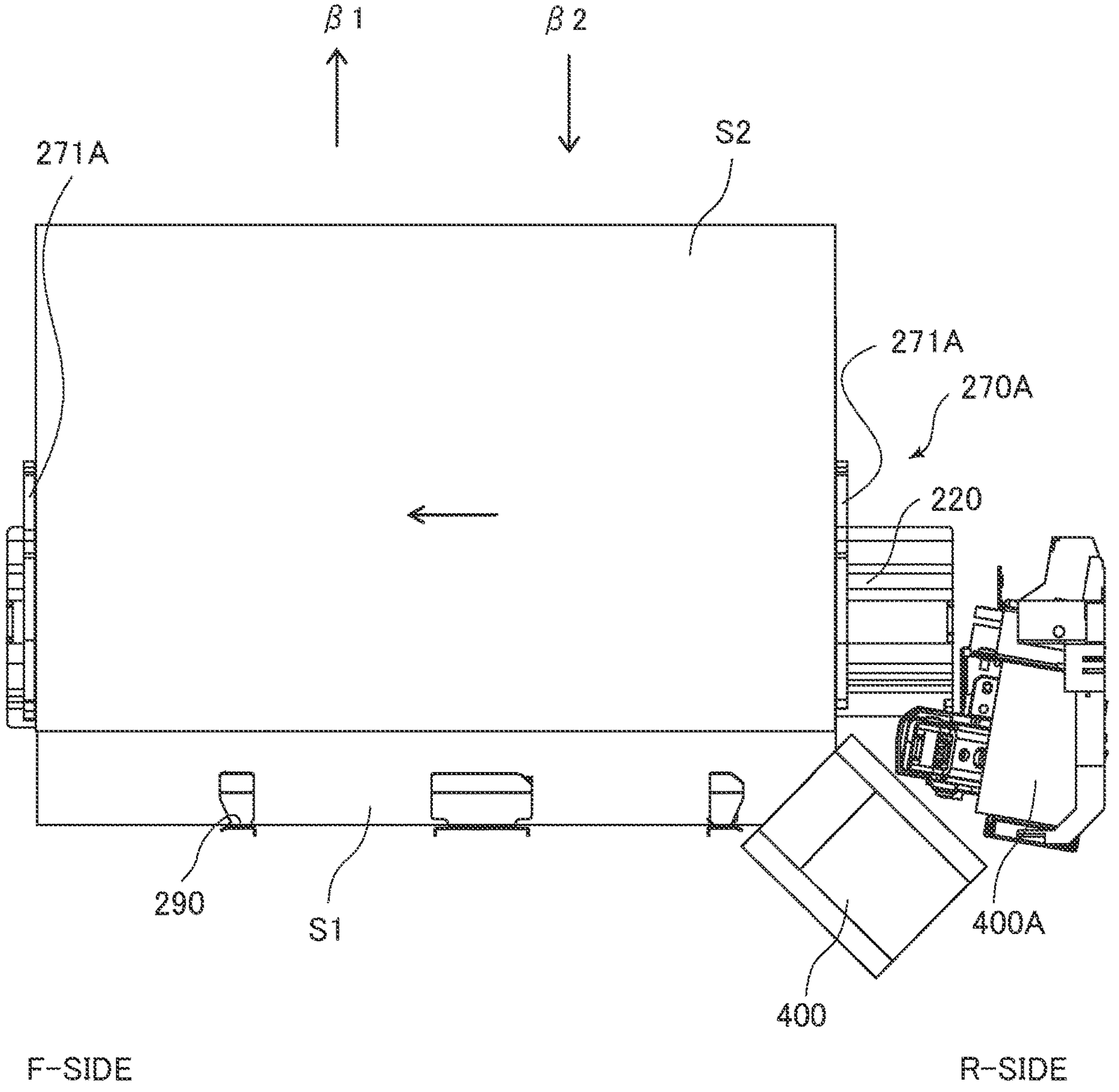
FIG. 31 is a plan view illustrating the main configuration around the processing tray according to another example of the embodiment, and is a view illustrating a state at the time of shifting the second sheet.
Figure 32:
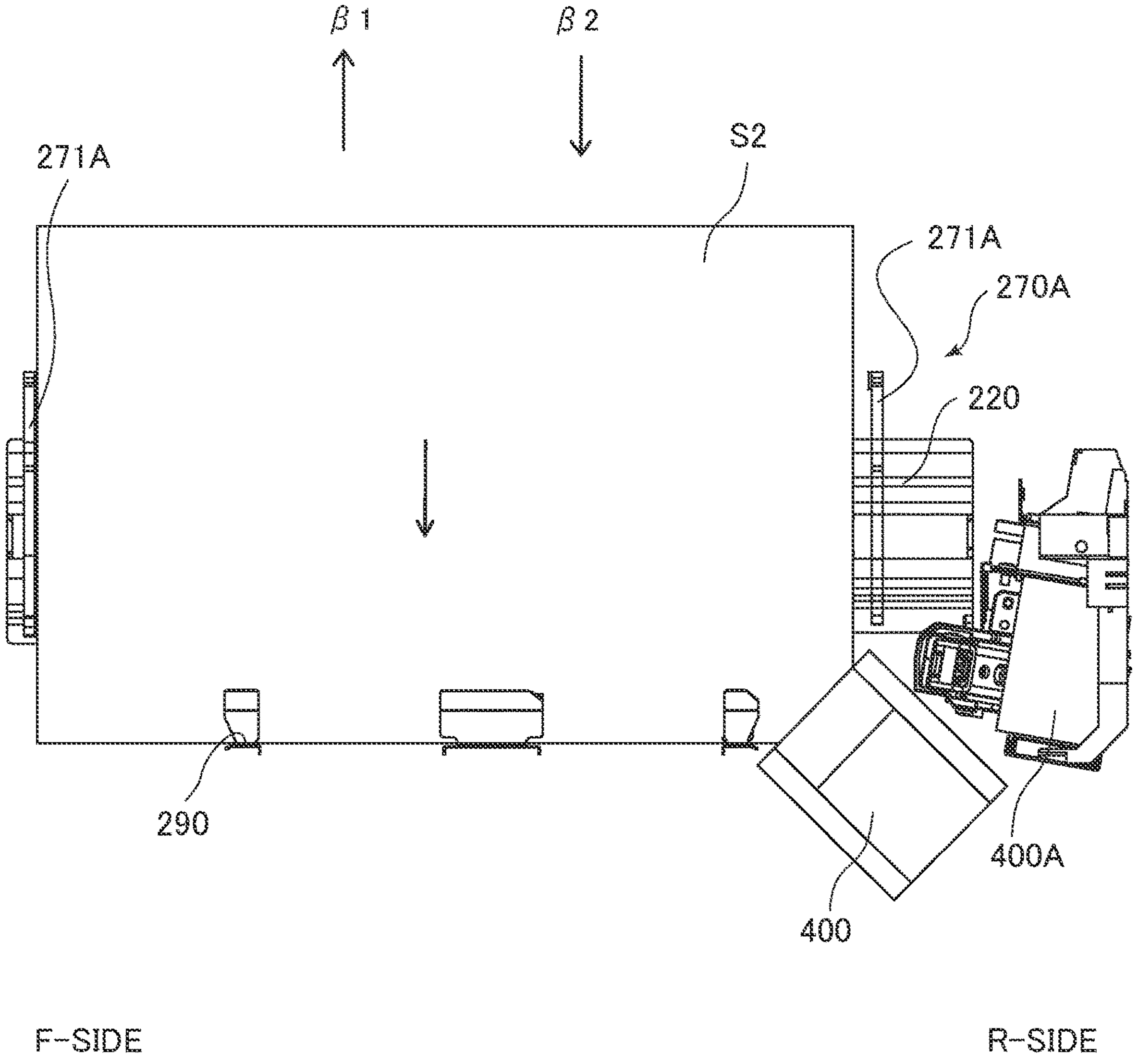
FIG. 32 is a plan view illustrating the main configuration around the processing tray according to another example of the embodiment, and is a view illustrating a state in which the second sheet abuts the trailing edge regulation member.
Figure 33:
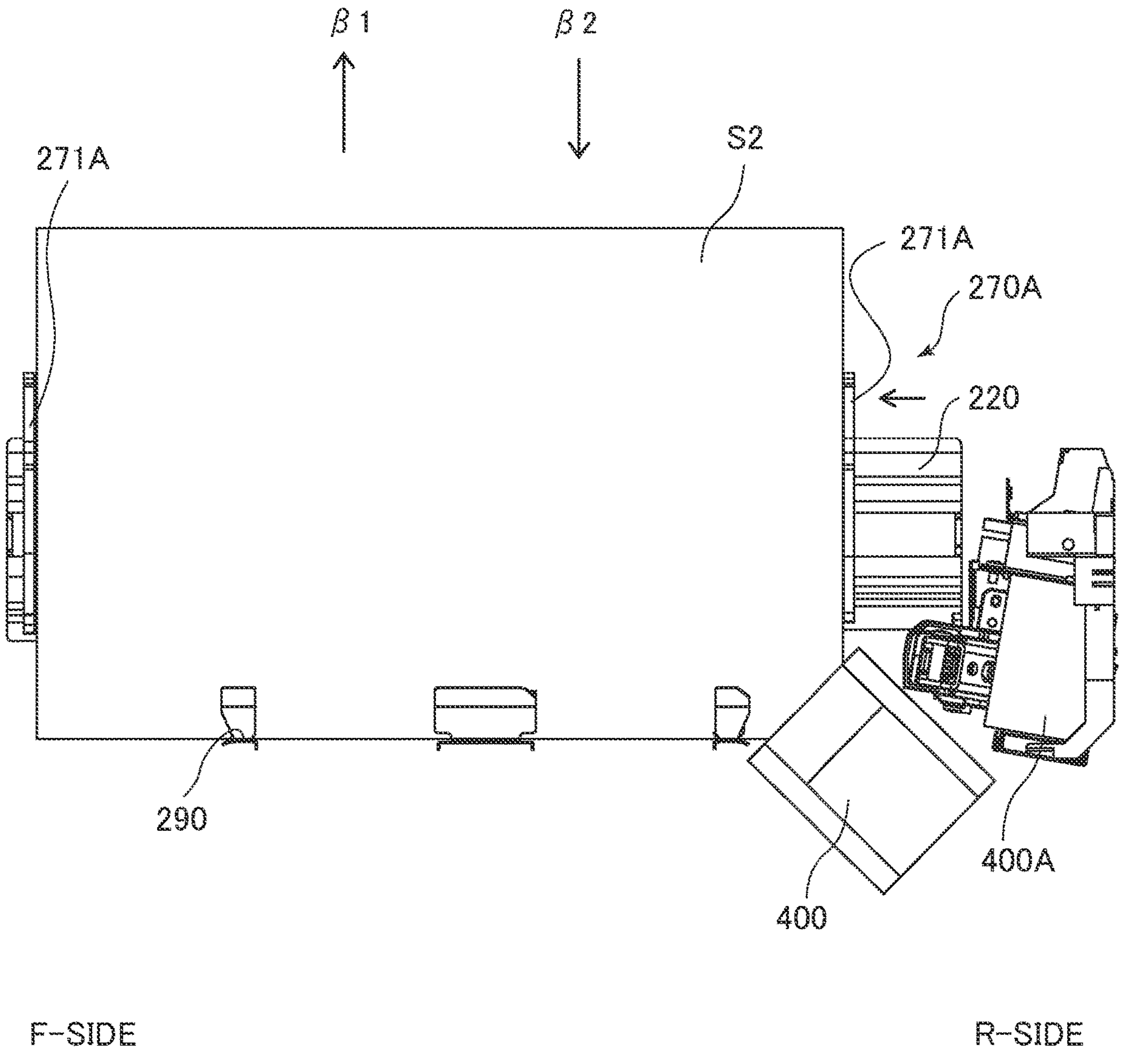
FIG. 33 is a plan view illustrating the main configuration around the processing tray according to another example of the embodiment, and is a view illustrating a state at the time of alignment of the second sheet.

Next, as illustrated in FIG. 31, the aligning plate 271A on the R side is brought into contact with the end portion of the sheet S2, and the second sheet S2 is moved to the F side in the width direction. At this time, the F side aligning plate 271A does not move because the first sheet S1 exists. When the sheet S2 is shifted to the F side, as illustrated in FIG. 32, the sheet S2 is conveyed in the second conveyance direction β2 by the reversing paddle 240A to abut against the trailing edge regulation member 290. At this time, the R-side aligning plate 271A is separated from the sheet S1. Next, as illustrated in FIG. 33, the R-side aligning plate 271A is brought into contact with the sheet S2, and the sheet S2 is nipped by the pair of aligning plates 271A. Accordingly, alignment with respect to the second sheet S2 is performed.

Figure 34:
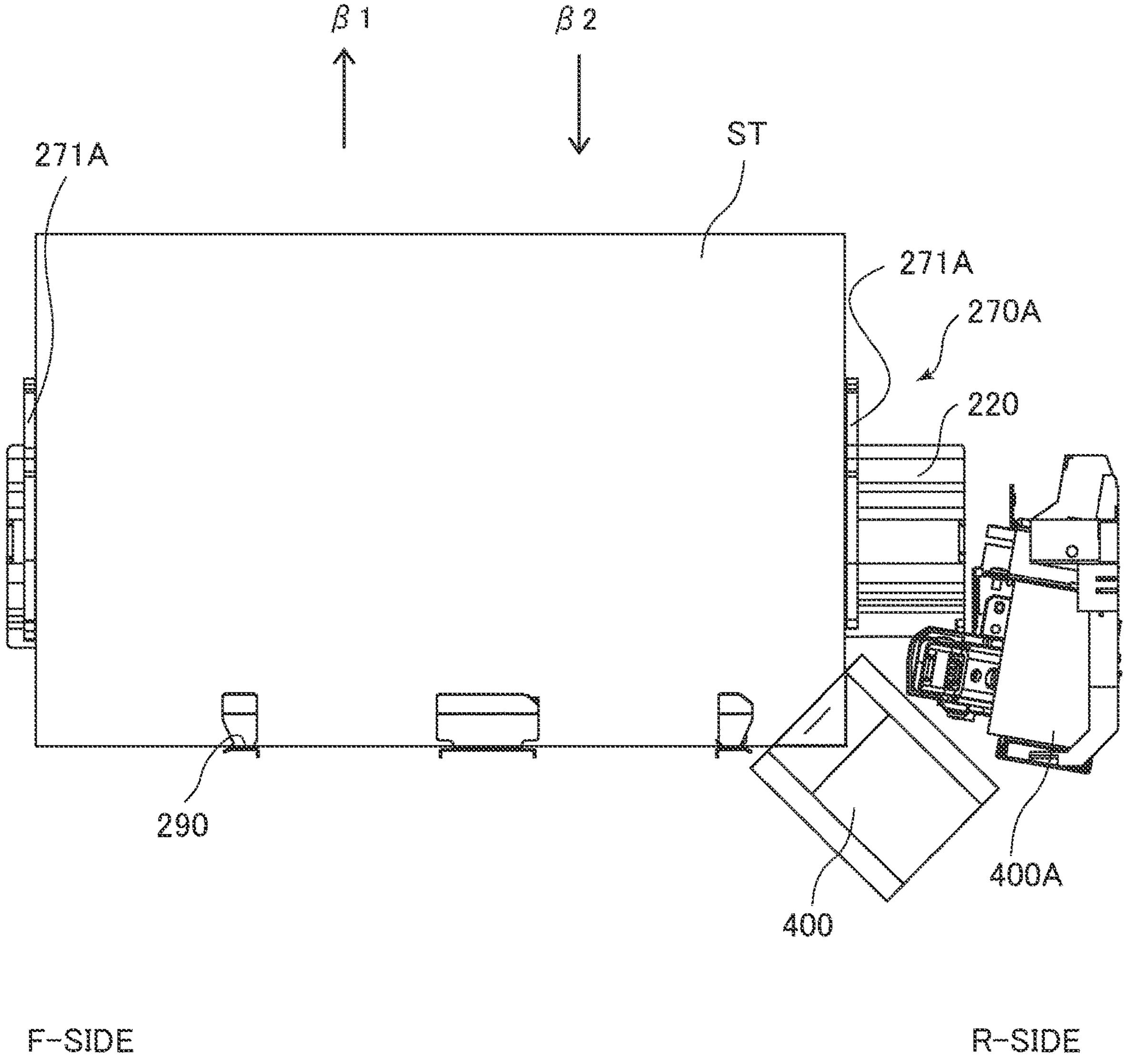
FIG. 34 is a plan view illustrating the main configuration around the processing tray according to another example of the embodiment, and is a view illustrating a state in which oblique binding is performed on the corner portion of the sheet bundle.
Figure 35:
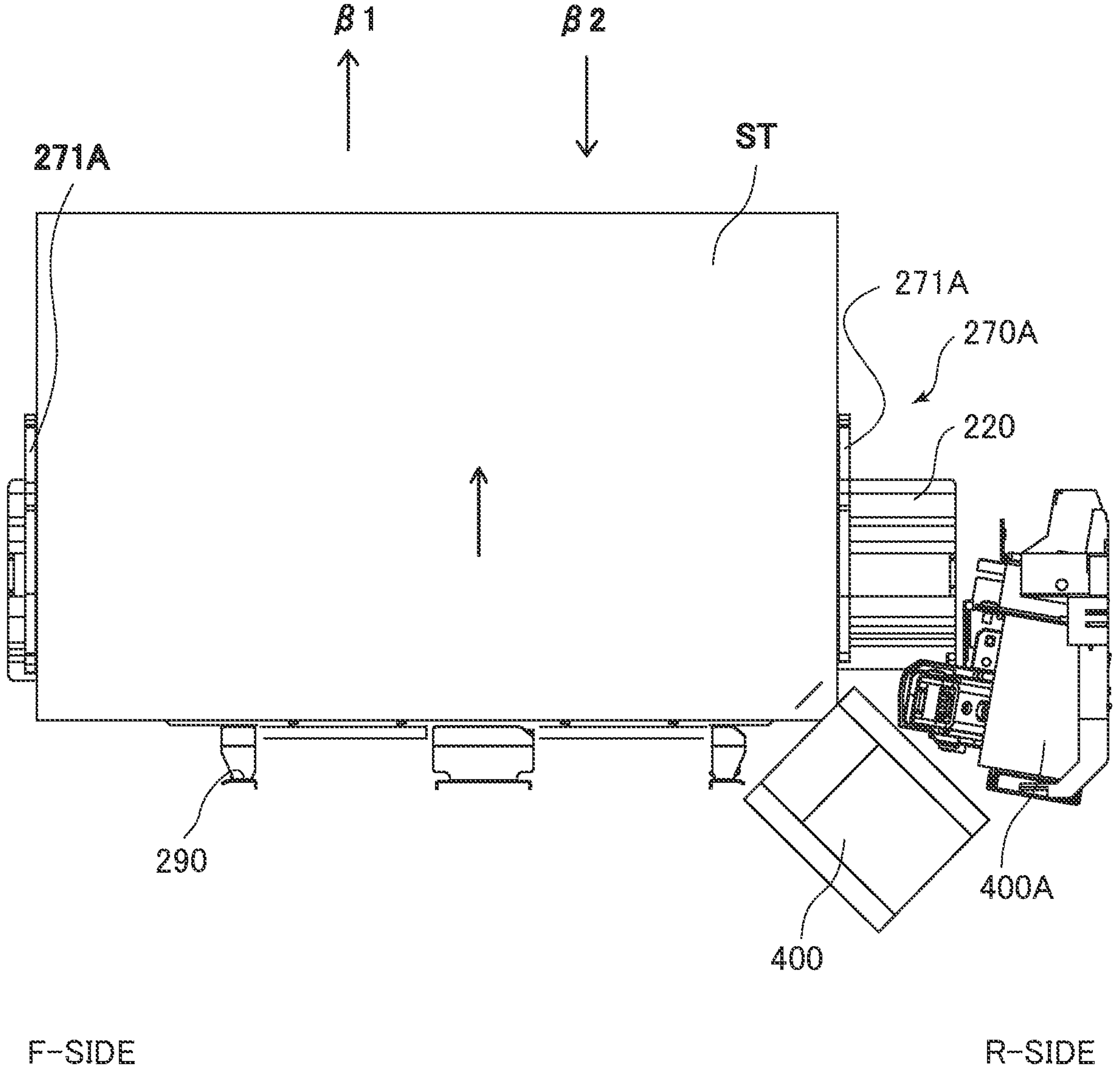
FIG. 35 is a plan view illustrating the main configuration around the processing tray according to another example of the embodiment, and is a view illustrating a state when the sheet bundle is discharged.

When the alignment of the final sheet of the sheet bundle ST to be formed, that is, the second sheet S2 in the present embodiment is completed, as illustrated in FIG. 34, the staple unit 400 in the second posture performs the oblique binding at the corner portion on the R side of the sheet bundle ST. Thereafter, as illustrated in FIG. 35, the sheet bundle ST subjected to the oblique binding is discharged to the stacking tray 300 by the upper discharge roller 230A and the lower discharge roller 230B.

As described above, in the present embodiment, when the oblique binding is performed on the corner portion of the sheet, the sheet is shifted in the direction opposite to the position where the oblique binding is performed before the sheet on the processing tray 220 abuts on the trailing edge regulation member 290 in the state where the staple unit 400 is in the second posture. Then, the sheet is brought into contact with the trailing edge regulation member 290 after the shift operation is completed. Therefore, even when the staple unit 400 is in the second posture, the sheet can be prevented from interfering with the staple unit 400. Therefore, also in the case of the present embodiment, it is possible to prevent interference between the staple unit 400 and the sheet at the time of performing oblique binding without increasing the amount of movement of the staple unit 400 to the oblique binding position. As a result, the apparatus can be made compact. In the above mentioned embodiments, the case where the movable turning unit 470 performs a movable turning operation of turning the staple unit 400, and then the shift operation and the abutment operation are performed has been described. However, an order of performing the movable turning operation and the shift operation may be reversed, or they may be performed simultaneously. In any case, the movable turning operation and the shift operation may be completed before the abutment operation is completed.

In the above-described embodiment, the sheet processing apparatus 200A is disposed in the internal space 130 of the image forming apparatus 100, but the configuration of the sheet processing apparatus of the present invention may be, for example, a configuration to be attached to a side surface of the image forming apparatus. Also, the sheet processing apparatus may be controlled by a control unit included in the image forming apparatus. The present invention is also applicable to a configuration in which the stapleless binding unit 400A is not provided.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-117884, filed on Jul. 25, 2022, and Japanese Patent Application No. 2023-113319, filed on Jul. 10, 2023, which are hereby incorporated by reference herein in their entirety.

What is claimed is:

1. A sheet processing apparatus comprising:

a tray configured to stack a sheet one by one for forming a sheet bundle;

a stopper against which an end edge of a respective sheet abuts on the tray;

a rotary device configured to convey a respective sheet on the tray toward the stopper;

a shift mechanism configured to shift a respective sheet in a width direction of the sheet;

stapler configured to perform a side stitch binding process and an oblique binding process on the sheet bundle with an edge of the sheet bundle being abutted against the stopper;

a turning mechanism configured to turn the stapler to a first posture for performing the side stitch binding process and a second posture for performing the oblique binding process, the second posture being inclined with respect to the first posture; and a controller configured to control the rotary device, the shift mechanism, the stapler, and the turning mechanism, wherein in a case where the stapler performs the oblique binding process at a corner on a first side in the width direction of the sheet bundle formed of sheets each of which is a sheet having a maximum size capable of being stapled in the width direction, the controller is configured to execute a sheet bundle forming operation of repeating a conveying operation of conveying a respective sheet until the sheet abuts the stopper by the rotary device and a shifting operation of shifting the sheet toward a second side opposite to the first side in the width direction by the shift mechanism, and execute an operation of turning the stapler to the second posture by the turning mechanism after the sheet bundle forming operation and performing the oblique binding process by the stapler.

2. The sheet processing apparatus according to claim 1, wherein the turning mechanism is configured to turn the stapler from the first posture to the second posture in a case where the stapler performs the oblique binding process on the first side of the sheet bundle.

3. The sheet processing apparatus according to claim 1, wherein the shift mechanism is configured to contact with an edge on the first side of the sheet to move the sheet on the tray toward the second side in the width direction.

4. A sheet processing apparatus comprising:

a tray configured to stack a sheet one by one for forming a sheet bundle;

a stopper against which an end edge of a respective sheet abuts on the tray;

a rotary device configured to convey a respective sheet on the tray toward the stopper;

a shift mechanism configured to shift a respective sheet in a width direction of the sheet;

a stapler configured to perform a side stitch binding process and an oblique binding process on the sheet bundle with an edge of the sheet bundle being abutted against the stopper;

a turning mechanism configured turn the stapler to a first posture for performing the side stitch binding process and a second posture for performing the oblique binding process, the second posture being inclined with respect to the first posture; and a controller configured to control the rotary device, the shift mechanism, the stapler, and the turning mechanism, wherein in a case where the stapler performs the oblique binding process at a corner on a first side in the width direction of the sheet bundle formed of sheets each of which is a sheet having a maximum size capable of being stapled in the width direction, the controller is configured to execute the oblique binding process at the corner on the first side of the sheet bundle by the stapler in the second posture after a sheet bundle forming operation, the sheet bundle forming operation being an operation of repeating a shifting operation of shifting a respective sheet toward a second side opposite to the first side in the width direction by the shift mechanism and a conveying operation of conveying the sheet until the sheet abuts the stopper by the rotary device, and wherein the conveying operation is executed after the shifting operation in the sheet bundle forming operation.

5. The sheet processing apparatus according to claim 4, wherein the shift mechanism is configured to contact with the edge on the first side of the sheet to move the sheet on the tray toward the second side in the width direction.

6. The sheet processing apparatus according to claim 4, wherein the controller is configured to execute a turning operation of the stapler before the sheet bundle forming operation, the turning operation being an operation of turning the stapler to the second posture by the turning mechanism.

7. An image forming system comprising:

an image forming unit configured to form an image on a sheet;

a tray configured to stack a respective sheet on which an image has been formed by the image forming unit one by one for forming a sheet bundle, a stopper against which an end edge of a respective sheet abuts on the tray;

a rotary device configured to convey a respective sheet on the tray toward the stopper;

a shift mechanism configured to shift a respective sheet in a width direction of the sheet;

a stapler configured to perform a side stitch binding process and an oblique binding process on the sheet bundle with an end edge of the sheet bundle being abutted against the stopper;

a turning mechanism configured to turn the stapler to a first posture for performing the side stitch binding process and a second posture for performing the oblique binding process, the second posture being inclined with respect to the first posture; and a controller configured to control the rotary device, the shift mechanism, the stapler, and the turning mechanism, wherein in a case where the stapler performs the oblique binding process at a corner on a first side in the width direction of the sheet bundle formed of sheets each of which is a sheet having a maximum size capable of being stapled in the width direction, the controller is configured to execute a sheet bundle forming operation of repeating a conveying operation of conveying a respective sheet until the sheet abuts the stopper by the rotary device and a shifting operation of shifting the sheet toward a second side opposite to the first side in the width direction by the shift mechanism, and execute an operation of turning the stapler to the second posture by the turning mechanism after the sheet bundle forming operation and performing the oblique binding process by the stapler.

8. An image forming system comprising:

an image forming unit configured to an image on a sheet;

a tray configured to stack a respective sheet on which an image has been formed by the image forming unit one by one for forming a sheet bundle;

a stopper against which an end edge of a respective sheet abuts on the tray;

a rotary device configured to convey a respective sheet on the tray toward the stopper;

a shift mechanism configured to shift a respective sheet on the tray in a width direction of the sheet;

a stapler configured to perform a side stitch binding process and an oblique binding process on the sheet bundle with an end edge of the sheet bundle being abutted against the stopper;

a turning mechanism configured to turn the stapler to a first posture for performing the side stitch binding process and a second posture for performing the oblique binding process, the second posture being inclined with respect to the first posture; and a controller configured to control the rotary device, the shift mechanism, the stapler and the turning mechanism, wherein in a case where the stapler performs the oblique binding process at a corner on a first side in the width direction of the sheet bundle formed of sheets each of which is a sheet having a maximum size capable of being stapled in the width direction, the controller is configured to execute the oblique binding process at the corner on the first side of the sheet bundle by the stapler in the second posture after a sheet bundle forming operation, the sheet bundle forming operation being an operation of repeating a shifting operation of shifting a respective sheet toward a second side opposite to the first side in the width direction by the shift mechanism and a conveying operation of conveying the sheet until the sheet abuts the stopper by the rotary device, and wherein the conveying operation is executed after the shifting operation in the sheet bundle forming operation.

* * * * *